United States Patent
Yang-Yen

(10) Patent No.: US 12,514,238 B2
(45) Date of Patent: Jan. 6, 2026

(54) ANIMAL MODELS OF LIPID METABOLISM AND METHODS OF TREATING HYPERLIPIDEMIA OR HYPERLIPIDEMIA-RELATED DISEASES

(71) Applicant: Academia Sinica, Taipei (TW)

(72) Inventor: Hsin-Fang Yang-Yen, Taipei (TW)

(73) Assignee: Academia Sinica, Taipei (TW)

( * ) Notice: Subject to any disclaimer, the term of this patent is extended or adjusted under 35 U.S.C. 154(b) by 700 days.

(21) Appl. No.: 17/798,322

(22) PCT Filed: Feb. 26, 2021

(86) PCT No.: PCT/US2021/019754
§ 371 (c)(1),
(2) Date: Aug. 9, 2022

(87) PCT Pub. No.: WO2021/173892
PCT Pub. Date: Sep. 2, 2021

(65) Prior Publication Data
US 2023/0069835 A1    Mar. 9, 2023

Related U.S. Application Data

(60) Provisional application No. 62/982,911, filed on Feb. 28, 2020.

(51) Int. Cl.
*A01K 67/027*        (2024.01)
*A01K 67/0276*       (2024.01)
*A61P 3/04*          (2006.01)
*C07K 14/47*         (2006.01)

(52) U.S. Cl.
CPC ............ *A01K 67/0276* (2013.01); *A61P 3/04* (2018.01); *C07K 14/47* (2013.01); *A01K 2217/072* (2013.01); *A01K 2217/075* (2013.01); *A01K 2227/105* (2013.01)

(58) Field of Classification Search
CPC .............................. A61K 38/1709; A61P 3/06
See application file for complete search history.

(56) References Cited

U.S. PATENT DOCUMENTS 7,253,258 B2 *   8/2007  Hooi ................. C07K 14/4703
                                                       435/320.1
2002/0115153 A1 * 8/2002  Lal .......................... C07K 14/47
                                                       435/325

* cited by examiner

Primary Examiner — James D Schultz
Assistant Examiner — Erin V Paulus
(74) Attorney, Agent, or Firm — NZ Carr Law Office

(57) ABSTRACT

The present invention is directed to genetically-modified non-human animal models with specific mutations in exon 3 of proline-rich acidic protein 1 (PRAP1) gene. Also disclosed herein are methods of treating hyperlipidemia or a hyperlipidemia-related disease by using a PRAP1 inhibitor or a modified PRAP1 polypeptide, as well as pharmaceutical compositions comprising the modified PRAP1 polypeptide.

3 Claims, 23 Drawing Sheets
Specification includes a Sequence Listing.

ANIMAL MODELS OF LIPID METABOLISM AND METHODS OF TREATING HYPERLIPIDEMIA OR HYPERLIPIDEMIA-RELATED DISEASES

CROSS-REFERENCE TO RELATED APPLICATION

This application is a U.S. National Stage Filing under 35 U.S.C. 371 from International Patent Application Serial No. PCT/US21/19754, entitled "ANIMAL MODELS OF LIPID METABOLISM AND METHODS OF TREATING HYPERLIPIDEMIA OR HYPERLIPIDEMIA-RELATED DISEASES," filed on Feb. 26, 2021, and published on Sep. 2, 2021, which claims the benefit of U.S. Provisional Application No. 62/982,911, filed on Feb. 28, 2020; the disclosure of which are incorporated by reference herein in their entireties.

BACKGROUND OF THE INVENTION

1. Field of the Invention

The present disclosure in general relates to the field of disease treatment. More particularly, the present disclosure relates to methods for treating hyperlipidemia or hyperlipidemia-related diseases, as well as non-human animal models of lipid metabolism.

2. Description of Related Art

Hyperlipidemia is a condition of lipid metabolism characterized by abnormally elevated levels of lipids in the blood. Hyperlipidemia may lead to clogged arteries known as atherosclerosis, which is a major cause of cardiovascular diseases (CVDs), e.g., heart attack, stroke, and peripheral vascular diseases. In addition, it is also a common cause for acute pancreatitis and plays a role in the development of hepatosteatosis (also known as fatty liver disease, FLD). Depending on the forms of lipids elevated in the blood, hyperlipidemia can be classified into different types, including hypertriglyceridemia (i.e., an elevated blood level of triglyceride (TG)), hypercholesterolemia (also known as high cholesterol; i.e., an elevated blood level of cholesterol), and combined hyperlipidemia (i.e., both the levels of TG and cholesterol are elevated in the blood).

Management of hyperlipidemia includes maintenance of a normal body weight, having a balanced diet, maintaining regular physical activity, and avoiding alcohol and cigarette smoking. Prescription drugs may be used to treat some people having significant risk factors, such as CVDs. Common lipid-lowering medications include, statins (such as atorvastatin, fluvastatin, lovastatin, pitavastatin, pravastatin, rosuvastatin and simvastatin), bile-acid-dingin resins (for example, cholestyramine, colesevelam and colestipol), niacin, cholesterol absorption inhibitors (such as asezetimibe), and fibrates (such as fenofibrate and gemfibrozil). However, none of these medications provides a satisfactory effect due to the limitations of low efficacy, intolerance, and various side-effects, including acute coronary syndrome, myopathy, rashes, gastrointestinal upset, skin vasodilation, flushing, bloating and diarrhea.

In view of the foregoing, there exists in the related art a need for a novel method for treating hyperlipidemia in a safer and more efficient manner.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

As embodied and broadly described herein, one aspect of the disclosure is directed to a method of treating hyperlipidemia or a hyperlipidemia-related disease in a subject. The method comprises administering to the subject an effective amount of a PRAP1 inhibitor, a modified PRAP1 polypeptide, or a nucleic acid encoding the modified PRAP1 polypeptide.

Depending on desired purposes, the PRAP1 inhibitor may be an antisense oligonucleotide or a small interfering RNA targeting PRAP1.

The modified PRAP1 polypeptide comprises an amino acid modification as compared to a wild-type PRAP1 polypeptide. According to some embodiments of the present disclosure, the subject is a human, in which the amino acid modification is a substitution of glutamic acid with valine at the amino acid position 94 (E94V) of a wild-type PRAP1 polypeptide of SEQ ID NO: 5, or a substitution of glutamic acid with valine at the amino acid position 85 (E85V) of a wild-type PRAP1 polypeptide of SEQ ID NO: 7. According to certain embodiments of the present disclosure, the subject is a mouse, in which the amino acid modification is a substitution of glutamic acid with valine at the amino acid position 88 (E88V) of a wild-type PRAP1 polypeptide of SEQ ID NO: 1, or a substitution of glutamic acid with valine at the amino acid position 85 (E85V) of a wild-type PRAP1 polypeptide of SEQ ID NO: 3.

The hyperlipidemia-related disease may be hepatosteatosis, atherosclerosis, cardiovascular disease, pancreatitis, or chylomicronemia syndrome.

Also disclosed herein is a transgenic mouse comprising an insertion of an exogenous nucleotide sequence of SEQ ID NO: 18 in exon 3 of proline-rich acidic protein 1 (PRAP1) gene. According to some embodiments of the present disclosure, the insertion of the exogenous nucleotide sequence confers a nonsense mutation of the PRAP1 gene.

According to some examples of the present disclosure, the exon 3 of the PRAP1 gene of the transgenic mouse comprises the nucleotide sequence of SEQ ID NO: 19.

Another aspect of the present disclosure is directed to a transgenic mouse comprising a modified PRAP1 gene encoding a modified PRAP1 polypeptide, which comprises an amino acid modification as compared to a wild-type PRAP1 polypeptide. According to some embodiments, the amino acid modification is a substitution of glutamic acid with valine at the amino acid position 88 (E88V) of a wild-type PRAP1 polypeptide of SEQ ID NO: 1. According to alternative embodiments, the amino acid modification is a substitution of glutamic acid with valine at the amino acid position 85 (E85V) of a wild-type PRAP1 polypeptide of SEQ ID NO: 3.

The present disclosure also provides a pharmaceutical composition comprising a modified PRAP1 polypeptide and a pharmaceutically acceptable excipient, in which the modified PRAP1 polypeptide comprises an amino acid modification as compared to a wild-type PRAP1 polypeptide. According to one embodiment, the amino acid modification is a substitution of glutamic acid with valine at the amino acid position 94 (E94V) of a wild-type PRAP1 polypeptide of SEQ ID NO: 5. According to another embodiment, the amino acid modification is a substitution of glutamic acid with valine at the amino acid position 85 (E85V) of a wild-type PRAP1 polypeptide of SEQ ID NO: 7. According to still another embodiment, the amino acid modification is a substitution of glutamic acid with valine at the amino acid position 88 (E88V) of a wild-type PRAP1 polypeptide of SEQ ID NO: 1. According to further another embodiment, the amino acid modification is a substitution of glutamic acid with valine at the amino acid position 85 (E85V) of a wild-type PRAP1 polypeptide of SEQ ID NO: 3.

Many of the attendant features and advantages of the present disclosure will become better understood with reference to the following detailed description considered in connection with the accompanying drawings.

BRIEF DESCRIPTION OF THE DRAWINGS

The present description will be better understood from the following detailed description read in light of the accompanying drawings, where:

FIG. 1A: Genomic structure and restriction map of PRAP1 gene locus of the wild-type (wt) mouse. Exons are numbered and represented by solid boxes. Shown below the genomic map are the structures of the targeting vector, and the mutant allele after homologous recombination. The DT gene and the lacZ-Neo cassette for negative and positive selection, respectively, and some relevant restriction sites are as indicated (A: ApaI; E: EcoRI; S: SalI; Ev: EcoRV; N: NdeI). The 5' and 3' probes and the predicted length of EcoRI restriction fragments in Southern blot analysis are as indicated. FIG. 1B: Immunoblotting analysis of small intestinal extracts from representative PRAP1$^{+/+}$ and PRAP1$^{+/+}$ mice. The small intestinal extracts from mice with the indicated genotype were immunoprecipitated with anti-PRAP1 antibody. The precipitated immune complexes were then analyzed by immunoblotting using the same antibody. The signal for PRAP1 and the light chain of the immunoglobulin are as indicated. FIG. 1C: Small intestinal length of control (PRAP1$^{+/+}$) and PRAP1$^{-/-}$ mice. SI: small intestine. *, $p<0.05$.

FIG. 2A: Total intestinal cell lysates from control (WT), PRAP1$^{-/-}$ (KO) or the E85V mutant mice (E85V) were immunoprecipitated with MTTP- or PRAP1-specific antibody, and the immune complexes (lanes 4-6) along with 1/50 input lysates as indicated were analyzed by immunoblotting using MTTP or PRAP1 antibodies. FIGS. 2B and 2C: Recombinant PRAP1 (rPRAR1, i.e., PRAP1ΔN20; designated as "rWT" in FIGS. 2B and 2C) stimulated the triglyceride (TG; FIG. 2B) and phospholipid (FIG. 2C) transfer activity of MTTP in the intestinal epithelial cells (IECs) purified from PRAP1$^{-/-}$ mice. FIG. 2D: Immunoblotting analysis of MTTP expression in the intestinal cell lysates of control (PRAP1$^{+/+}$) or PRAP1$^{-/-}$ mice. FIGS. 2E and 2F: MTTP-mediated transfer of TG (FIG. 2E) or phospholipid (FIG. 2F) was determined in PRAP1-deficient (PRAP1$^{-/-}$) IEC homogenates that had been pre-incubated with 10 μg of recombinant WT PRAP1 or the indicated mutant of PRAP1 (all without N-terminal 20 aa). FIGS. 2G and 2H: The E85V mutant of PRAP1 (rE85V) failed to stimulate the TG (FIG. 2G) or phospholipid (FIG. 2H) transfer activity of MTTP in IEC purified from PRAP1$^{-/-}$ mice at all doses tested. N=3-4 for each panel. *, $p<0.05$; , $p<0.01$; *, $p<0.001$; n.s., $p>0.05$. FIGS. 2B, 2C, 2G and 2H: compared to the activity of PRAP1$^{+/+}$ (bar 1). FIGS. 2E and 2F: compared to the activity in PRAP$^{-/-}$ (bar 2).

FIG. 3A: Lipid (3H-labeled TG, [$^3$H]-TG) binding curves of bacterially-produced glutathione S-transferase (GST) or GST fusion proteins containing WT or the indicated mutant of PRAP1 (about 0.7 μg each). FIG. 3B: Lipid binding ability of GST-fusion proteins containing WT or the truncated forms of PRAP1 (about 0.7 μg each, bottom). FIG. 3C: PRAP1 binds to phospholipid. Approximately 0.7 μg of the indicated proteins were incubated with 40 pmole of [$^3$H]-TG in the absence or presence of the indicated excess unlabeled lipids (10 nM). Date were presented as mean±SEM. All binding activity was normalized to those bound to GST in the absence of any competitor (bar 1), which was set as 100. FIGS. 3D and 3E: Flag-tagged MTTP immunoprecipitated from Hela cells was allowed to bind to recombinant WT or the indicated mutant protein preloaded without or with increasing doses of [$^3$H]-TG. After incubation for 4 hours, the immune complex was washed, eluted and half of the sample was subjected to isotope counting for [$^3$H]-TG (FIG. 3D), and the other half for immunoblotting analysis using Flag or GST antibody as indicated (FIG. 3E). *, $p<0.05$; , $p<0.01$; *, $p<0.001$; n.s., $p>0.05$. Except PRAP1-FL, all recombinant PRAP1 (WT or mutant) used in this example were without N-terminal signal peptides.

FIGS. 4A and 4B: Reduced lipid absorption in the small intestine of PRAP1$^{-/-}$ mice. Control (WT) or PRAP1$^{-/-}$ (KO) mice were deprived of food for 12 hours before receiving an intragastric bolus of 0.5 ml of core oil containing 5 μCi of [$^{14}$C]-Triolein and 1 μCi of [$^3$H]-β-sitostanol (n=5 for each group). Two hours (FIG. 4A) or 1-3 hours (FIG. 4B) after lipid administration, the amount of [$^{14}$C]-Triolein-derived radioactivity in the cell lysates from the middle part of the small intestine (as a ratio of [$^{14}$C]/[$^3$H] radioactivity, FIG. 4A) or in the blood sample (FIG. 4B) was measured and plotted. FIG. 4C: Mice with the indicated genotypes were fasted for 16 hours before receiving oral gavage of lipids. Four hours post-lipid administration, plasma was collected and photographed. FIG. 4D: PRAP1 deficiency (KO) or the E85V mutation reduced apoB lipoprotein secretion. Pulse chase experiments using primary enterocytes isolated from mice with the indicated genotypes were carried out and $^{35}$S-labeled apoB immunoprecipitated from media and lysates were subjected to sodium dodecyl sulfate polyacrylamide gel electrophoresis (SDS-PAGE) and fluorography. FIGS. 4E and 4F: PRAP1 deficiency (KO) or the E85V mutation reduced apoB lipoprotein secretion. Metabolic labelling experiments using primary hepatocytes isolated from mice with the indicated genotypes were performed and $^{35}$S-labeled apoB48 and apoB100 immunoprecipitated from media and lysates were subjected to SDS-PAGE, fluorography and specific signals were quantified. All signals were normalized to the mean of those triplicates in WT cells. *, $p<0.05$; ***, $p<0.001$.

FIGS. 5A and 5B: The apoB 100 (FIG. 5A) and apoB48 (FIG. 5B) protein signals in each fraction were quantitated and plotted as a relative percentage of total apoB from all 20 fractions from WT plasma. FIG. 5C: The TG levels in each fraction.

FIGS. 6A and 6B: The apoB100 (FIG. 6A) and apoB48 (FIG. 6B) protein signals in each fraction were quantitated and plotted as a relative percentage of total apoB from all 14 fractions from WT plasma. FIGS. 6C and 6D: The TG mass (FIG. 6C) or [$^3$H] radioactivity (FIG. 6D) in each fraction.

FIG. 7A: Body weight of control (WT) or PRAP1$^{-/-}$ mice (KO) fed a HFD for 12 weeks was measured and plotted against time. N=10 for each genotype. FIG. 7B: Time domain nuclear magnetic resonance (TD-NMR) analysis of the lean and fat mass of mice analyzed in FIG. 7A at the end of the experiment. FIG. 7C: The average weight of inguinal (iWAT) and epididymal (eWAT) adipose tissues from indicated mice. FIG. 7D: The average adipocyte numbers per high power field (HPF) in indicated mice. FIGS. 7E and 7F: Plasma levels of TG (FIG. 7E) and phospholipid (FIG. 7F) of indicated mice after 12 weeks on a HFD. Each data point denotes an individual mouse, and the bars denote mean±SEM. *, p<0.05; , p<0.01; *, p<0.001.

FIG. 8A: Fecal lipid content of indicated mice fed with a chow diet. FIG. 8B: Fecal lipid content of indicated mice fed with a HFD. FIG. 8C: A portion of feces collected from indicated mice fed with a HFD were homogenized and analyzed by calorimeter. Total fecal energy per day was plotted. Data were cumulative results from 3 independent experiments, each with 1-2 WT or KO mice from the same litter. *, p<0.05; , p<0.01; *, p<0.001.

FIG. 9A: The small intestine of chow diet-fed E85V mutant mice was longer than that of control (WT) mice. FIG. 9B: Body weight of control (WT) or E85V mutant mice fed a HFD for 12 weeks was measured and plotted against time. N=10 for each genotype. FIG. 9C: The average weight of iWAT and eWAT adipose tissues from indicated mice. FIG. 9D: Plasma level of TG of indicated mice after 12 weeks on a HFD. Each data point denotes an individual mouse, and the bars denote mean SEM. , p<0.01; *, p<0.001.

FIGS. 10A to 10C: Control (WT) and PRAP1$^{-/-}$ (KO) mice were fed with a HFD for 12 weeks. Representative hematoxylin and eosin (H&E)-stained sections of liver from indicated mice were depicted in FIG. 10A, and the liver/body weight ratios and liver TG contents in indicated mice were respectively depicted in FIGS. 10B and 10C. FIG. 10D: Quantification of lipid droplets in the livers of indicated mice. FIG. 10E: Liver TG content of indicated mice fed with a HFD for 8 weeks. Each data point denotes an individual mouse, and the bars denote mean±SEM. *, p<0.05; , p<0.01; *, p<0.001.

FIG. 11A) and total fecal lipid content (FIG. 11B) of mice fed a HFD and administered with vehicle alone (phosphate-buffered saline, PBS) or recombinant E85V polypeptide (rE85V; SEQ ID NO: 4) in accordance with Example 6 of the present disclosure. *, p<0.05.

DETAILED DESCRIPTION OF THE INVENTION

Figure 1A:
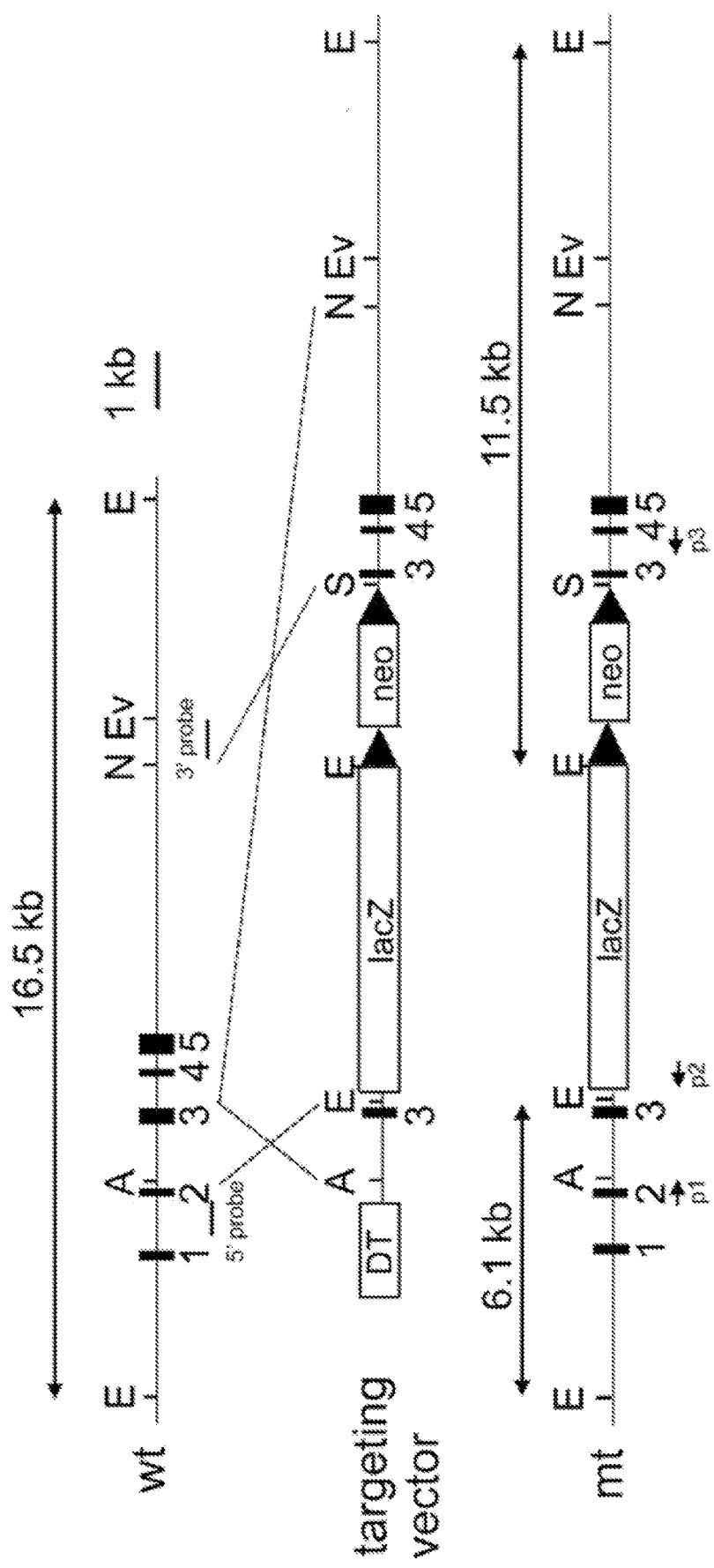
FIGS. 1A to 1C depict the construction and analytic results of PRAP1-deficient mice in accordance with Example 1 of the present disclosure.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

I. Definition

For convenience, certain terms employed in the specification, examples and appended claims are collected here. Unless otherwise defined herein, scientific and technical terminologies employed in the present disclosure shall have the meanings that are commonly understood and used by one of ordinary skill in the art. Also, unless otherwise required by context, it will be understood that singular terms shall include plural forms of the same and plural terms shall include the singular. Specifically, as used herein and in the claims, the singular forms "a" and "an" include the plural reference unless the context clearly indicates otherwise. Also, as used herein and in the claims, the terms "at least one" and "one or more" have the same meaning and include one, two, three, or more.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about". Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques.

As used herein, the term "transgene" refers to a nucleic acid sequence which is partly or entirely heterologous, i.e., foreign, to the transgenic animal or cell into which it is introduced, or is homologous to an endogenous gene of the transgenic animal or cell into which it is introduced, but which is designed to be inserted, or is inserted, into the animal's genome in such a way that the genome of the cell to which it is inserted is altered. A transgene can be operably linked to one or more transcriptional regulatory sequences and any other nucleic acid, such as introns, that may be necessary for optimal expression of a selected nucleic acid. Therefore, the term "transgenic" is used herein as an adjective to describe the property of an animal (e.g., a mouse) or a construct, of harboring a transgene. For example, "a transgenic animal" is a non-human animal, preferably a non-human mammal, more preferably, a rodent, in which one or more of the cells of the animal contain heterologous nucleic acid introduced by way of human intervention, such as by transgenic techniques well known in the art, including gene knock-in techniques. The nucleic acid is introduced into the cell, directly or indirectly by introduction into a precursor of the cell, via deliberate genetic manipulation, such as by microinjection or by infection with a recombinant virus. Transgenic animals include, but are not limited to, knock-in animals.

As used herein, the term "knock-out" (KO) is understood by a person having ordinary skill in the art, and refers to an alteration in the sequence of the gene that results in a decrease of function of the target gene, preferably such that target gene expression is undetectable or insignificant.

A "knock-in" is understood by a person having ordinary skill in the art, and refers to the targeted insertion of a transgene in a host cell genome that results in expression of the transgene. "Knock-in" transgenics can comprise a heterozygous knock-in of a transgene (e.g., an amino acid residue that is different from the endogenous residue of the transgenic animal or cell into which it is introduced). In certain embodiments, a "knock-in" results in the replacement of an endogenous gene (or portion thereof) with an exogenous gene (or portion thereof), e.g., resulting in the targeted mutation of one or both alleles. "Knock-in" also encompasses expression of a transgene by exposing the animal to a substance that promotes such expression, by introducing an enzyme that promotes recombination at the site of targeted insertion (e.g., Cre in Cre-lox system), or by some other method.

As is well known in the art, eukaryotic genes usually contain both exons and introns. The term "exon" refers to a nucleic acid sequence found in genomic DNA that is bioinformatically predicted and/or experimentally confirmed to contribute contiguous sequence to a mature mRNA transcript. By contrast, the term "intron" refers to a nucleic acid sequence found in genomic DNA that is predicted and/or confirmed to not contribute to a mature mRNA transcript, but rather to be "spliced out" during processing of the transcript. As the data depicted in FIG. 1A of the present disclosure, alternatively referring to the information published on the scientific database, National Center for Biotechnology Information (NCBI), the PRAP1 gene (GeneID: 22264; NCBI Reference Sequence: NM_009475.2) comprises 5 exons coding for the PRAP1 mRNA transcript, and the exogenous nucleotide sequence of SEQ ID NO: 18 is inserted into the exon 3 (from 5'-end terminus) of the PRAP1 gene.

As used herein, the term "nonsense mutation" refers to a mutation in DNA that changes a codon corresponding to an amino acid to a stop codon. Specifically, the term "nonsense mutation" refers to a mutation in DNA that leads to a premature stop codon or nonsense codon in the transcribed mRNA resulting in a truncated or incomplete, normally non-functional protein product.

The term "wild-type" refers to a gene or gene product that has the characteristics of that gene or gene product when isolated from a naturally-occurring source. A wild-type gene or gene product (e.g., a polypeptide) is that which is most frequently observed in a population and is thus arbitrarily designed the "normal" or "wild-type" form of the gene.

The term "polypeptide" refers to a polymer of amino acids without regard to the length of the polymer; thus, "peptides," "oligopeptides," and "proteins" are included within the definition of polypeptide and used interchangeably herein. This term also does not specify or exclude chemical or post-expression modifications of the polypeptides of the invention, although chemical or post-expression modifications of these polypeptides may be included or excluded as specific embodiments. Therefore, for example, modifications to polypeptides that include the covalent attachment of glycosyl groups, acetyl groups, phosphate groups, lipid groups and the like are expressly encompassed by the term polypeptide. Further, polypeptides with these modifications may be specified as individual species to be included or excluded from the present invention. Throughout the present disclosure, the positions of any specified amino acid residues within a polypeptide are numbered starting from the N terminus of the polypeptide. When amino acids are not designated as either D- or L-amino acids, the amino acid is either an L-amino acid or could be either a D- or L-amino acid, unless the context requires a particular isomer. Further, the notation used herein for the polypeptide amino acid residues are those abbreviations commonly used in the art.

The term "administered", "administering" or "administration" are used interchangeably herein to refer a mode of delivery, including, without limitation, intravenously, intramuscularly, intraperitoneally, intraarterially, intracranially, or subcutaneously administering an agent (e.g., a modified PRAP1 polypeptide or a nucleic acid encoding the modified RAP1 polypeptide) of the present invention. In some embodiments, the modified PRAP1 polypeptide or the nucleic acid encoding the modified PRAP1 polypeptide is formulated into powders for mixed with suitable carrier (e.g., buffer solution) before use, such as intraveneous injection.

As used herein, the term "treat," "treating" and "treatment" are interchangeable, and encompasses partially or completely preventing, ameliorating, mitigating and/or managing a symptom, a secondary disorder or a condition associated with hyperlipidemia, in which decreasing the blood level of lipids (e.g., TG and/or phospholipid) provides a benefit to the subject having or suspected of having such symptom, disorder or condition. The term "treating" as used herein refers to application or administration of one or more polypeptides of the present disclosure to a subject, who has a symptom, a secondary disorder or a condition associated with hyperlipidemia, with the purpose to partially or completely alleviate, ameliorate, relieve, delay onset of, inhibit progression of, reduce severity of, and/or reduce incidence of one or more symptoms, secondary disorders or features associated with hyperlipidemia. Symptoms, secondary disorders, and/or conditions associated with hyperlipidemia include, but are not limited to, hepatosteatosis, atherosclerosis, cardiovascular disease, pancreatitis, or chylomicronemia syndrome. Treatment may be administered to a subject who exhibits only early signs of such symptoms, disorder, and/or condition for the purpose of decreasing the risk of developing the symptoms, secondary disorders, and/or conditions associated with hyperlipidemia. Treatment is generally "effective" if one or more symptoms or clinical markers are reduced as that term is defined herein. Alternatively, a treatment is "effective" if the progression of a symptom, disorder or condition is reduced or halted.

The term "effective amount" as referred to herein designate the quantity of a component which is sufficient to yield a desired response. For therapeutic purposes, the effective amount is also one in which any toxic or detrimental effects of the component are outweighed by the therapeutically beneficial effects. An effective amount of an agent is not required to cure a disease or condition but will provide a treatment for a disease or condition such that the onset of the disease or condition is delayed, hindered or prevented, or the disease or condition symptoms are ameliorated. The effective amount may be divided into one, two, or more doses in a suitable form to be administered at one, two or more times throughout a designated time period. The specific effective or sufficient amount will vary with such factors as the particular condition being treated, the physical condition of the patient (e.g., the patient's body mass, age, or gender), the type of mammal or animal being treated, the duration of the treatment, the nature of concurrent therapy (if any), and the specific formulations employed and the structure of the compounds or its derivatives. Effective amount may be expressed, for example, in grams, milligrams or micrograms or as milligrams per kilogram of body weight (mg/Kg). Alternatively, the effective amount can be expressed in the concentration of the active component (e.g., the modified PRAP1 polypeptide of the present disclosure), such as molar concentration, mass concentration, volume concentration, molality, mole fraction, mass fraction and mixing ratio. Persons having ordinary skills could calculate the human equivalent dose (HED) for the medicament (such as the present modified PRAP1 polypeptide) based on the doses determined from animal models. For example, one may follow the guidance for industry published by US Food and Drug Administration (FDA) entitled "Estimating the Maximum Safe Starting Dose in Initial Clinical Trials for Therapeutics in Adult Healthy Volunteers" in estimating a maximum safe dosage for use in human subjects.

The phrase "pharmaceutically acceptable" refers to molecular entities and compositions that are "generally regarded as safe," e.g., that are physiologically tolerable and do not typically produce an allergic or similar untoward reaction, such as gastric upset, dizziness and the like, when administered to a human. Preferably, as used herein, the term "pharmaceutically acceptable" means approved by a regulatory agency of the Federal or a state government or listed in the U.S. Pharmacopeia or other generally recognized pharmacopeia for use in animals, and more particularly in humans.

The term "subject" refers to a mammal including the human species that is treatable with the modified PRAP1 polypeptide, the nucleic acid encoding the modified PRAP1 polypeptide, and/or the method of the present invention. The term "subject" is intended to refer to both the male and female gender unless one gender is specifically indicated.

II. Description of the Invention

PRAP1 is initially identified as a protein specifically expressed in the uterus during the mid to later stage of pregnancy, and accordingly named as pregnancy-specific uterine protein (PSUP). Later, PRAP1 is found to be also expressed in the intestinal epithelium, and is abundantly expressed in the proximal small intestine with a decreasing expression gradient along the duodenum-ileum axis and is nearly undetectable in cecum or colon. Overexpression of the human homolog of PRAP1 would cause cell growth inhibition in some epithelial and liver cancer cell lines. Further, it is reported that PRAP1 is involved in p53-dependent cell survival after DNA damage. However, the physiological function of PRAP1 is still not clear.

The present disclosure is based, at least in part, on the discovery that PRAP1 facilitates lipid absorption and apoB lipoprotein assembly and secretion via interacting with MTTP, and PRAP1 deletion or mutation would decrease the plasma levels of phospholipid and TG in the subject. Therefore, the introduction of the modified PRAP1 allele or polypeptide provides a potential means to treat a disease or a condition associated with and/or caused by hyperlipidemia.

Accordingly, described herein are genetically modified mouse models with reduced or ablated PRAP1 activity, uses of the genetically modified mouse models in selecting a drug candidate for treating hyperlipidemia, methods of treating hyperlipidemia or hyperlipidemia-related diseases by using modified PRAP1 polypeptides, and pharmaceutical compositions comprising the modified PRAP1 polypeptides.

II-1. PRAP1 Knock-Out (KO) Mice

The first aspect of the present disclosure is directed to a PRAP1 KO mouse (i.e., a PRAP1$^{-/-}$ mouse) that comprises an insertion of an exogenous gene in the exon 3 of proline-rich acidic protein 1 (PRAP1) gene.

The methods of generating a transgenic mouse are known by a person having ordinary skill in the art. According to some embodiments of the present disclosure, the PRAP1$^{-/-}$ mouse is generated by modifying the exon 3 of PRAP1 gene with a targeting vector via homologous recombination followed by transducing the modified PRAP1 gene into embryonic stem (ES) cells. After transferring the thus-produced ES cells into the blastocoel cavities of blastocyst embryos, the blastocyst embryos are transferred to surrogate mothers where gestation is completed thereby generating ES cell-derived founder mice (i.e., the chimeric PRAP$^{+/-}$ mice with a wild-type (WT) allele, and a mutant allele), which have inherited the new sequence variant (i.e., the knock-in mutation), generating a gain-of-function allele at this chosen genetic locus. The chimeric PRAP$^{+/-}$ mice are then intercrossed to generate the PRAP1$^{-/-}$ mice, which contain the exogenous gene in the exon 3 of both alleles of PRAP1 gene.

Exemplary targeting vectors for transducing the exogenous gene into exon 3 of PRAP1 gene include, but are not limited to, a plasmid vector, an artificial/mini-chromosome, a transposon, and a viral vector (e.g., an adenoviral vector, a lentiviral vector or sindbis viral vector). The targeting vector may comprise a gene encoding a positive selection marker in the nucleotide sequence thereof, for example, a neomycin resistance gene or a hygromycin resistance gene. The positive selection marker gene may optionally be framed by recognition sites for a recombinase, which allows for excision of the positive selection marker gene after selection of successful homologous recombination events. Thereby, any effect of the expression of the positive selection marker gene on the expression of the PRAP1 gene may be avoided. The recognition sites for a recombinase may be selected from the group consisting of frt sites for a flp recombinase and lox sites for a cre recombinase. According to one working example, the positive selection marker gene is a neomycin resistance gene, and the exogenous gene introduced into the exon 3 of PRAP1 gene is a lacZ/neomycin phosphotransferase gene cassette comprising the nucleotide sequence of SEQ ID NO: 18. Optionally, the targeting vector further comprises a gene encoding a negative selection marker in the nucleotide sequence thereof, for example, a diphtheria toxin (DT) gene or an HSV-thymidine kinase gene. According to one specific example, the targeting vector for transducing the exogenous gene into the exon 3 of PRAP1 gene comprises a DT gene as the negative selection marker gene.

According to the preferred embodiments of the present disclosure, the targeting vector for transducing the exogenous gene into the exon 3 of PRAP1 gene further comprises a first and a second nucleotide sequences respectively disposed at the 5'-end and the 3'-end of the exogenous gene, in which the first nucleotide sequence is homologous to the 5'-end sequence of the exon 3 of PRAP1 gene, and the second nucleotide sequence is homologous to the 3'-end sequence of the exon 3 of PRAP1 gene. In this way, when the targeting vector is introduced into the cells, they join together in the predesignated order via homologous recombination between the pairs of overlapping sequences, and they are inserted into the genome via homologous recombination at the exon 3 sequence of PRAP1 gene.

According to embodiments of the present disclosure, the insertion of the exogenous nucleotide sequence confers a nonsense mutation of the PRAP1 gene. According to one specific embodiment, the exon 3 of the PRAP1 gene of the present PRAP1$^{-/-}$ mouse comprises the nucleotide sequence of SEQ ID NO: 19.

In some embodiments, the PRAP1$^{-/-}$ mouse of the present disclosure expresses less PRAP1 protein as compared to the genetically unmodified mouse (i.e., the WT mouse); for example, the present PRAP1$^{-/-}$ mouse may express about 99% to about 50% (e.g., 99%, 98%, 97%, 96%, 95%, 94%, 93%, 92%, 91%, 90%, 89%, 88%, 87%, 86%, 85%, 84%, 83%, 82%, 81%, 80%, 79%, 78%, 77%, 76%, 75%, 74%, 73%, 72%, 71%, 70%, 69%, 68%, 67%, 66%, 65%, 64%, 63%, 62%, 61%, 60%, 59%, 58%, 57%, 56%, 55%, 54%, 53%, 52%, 51% or 50%) less PRAP1 protein as compared to the genetically unmodified mouse. In some preferred embodiments, the PRAP1$^{-/-}$ mouse of the present disclosure expresses no PRAP1 protein.

According to working examples of the present disclosure, the deficiency of PRAP1 reduces lipid absorption, and accordingly, compared with WT control mouse (i.e., PRAP1$^{+/+}$ mouse), the PRAP1$^{-/-}$ mouse has lower plasma levels of TG and phospholipid, and higher levels of lipids and calories in the feces thereof. According to some working examples of the present disclosure, the WT control mouse and the PRAP1$^{-/-}$ mouse are fed a high-fat diet.

II-2. PRAP1 Knock-In Mice

Another aspect of the present disclosure pertains to a PRAP1 knock-in mouse designated as "E85V knock-in mouse", which comprises a modified PRAP1 gene encoding a modified PRAP1 polypeptide. The modified PRAP1 polypeptide comprises the same amino acid sequence as a wild-type (WT) PRAP1 polypeptide, except for having an amino acid modification in the amino acid sequence thereof. Specifically, the amino acid modification of the modified PRAP1 polypeptide is a substitution of glutamic acid (E) with valine (V) as compared to the WT PRAP1 polypeptide, i.e., an "E" residue at a specific position in the WT PRAP1 polypeptide is changed to be a "V" residue at the corresponding position in the modified PRAP1 polypeptide.

It is known that mouse PRAP1 polypeptide exists in two isoforms due to alternative splicing, including isoform CRA a (GenBank accession number: EDL17907; SEQ ID NO: 1) and isoform CRA b (GenBank accession number: EDL17908; SEQ ID NO: 3), in which the amino acid sequence "GRV" is present at positions 45-47 of the amino acid sequence of isoform CRA a (having 152 amino acid residues in length), and is absent in the amino acid sequence of isoform CRA b (having 149 amino acid residues in length). The presence or absence of the "GRV" sequence affects the position of said "E" residue in the WT PRAP1 polypeptide (i.e., the "E" residue is at position 88 of the amino acid sequence of isoform CRA a, and is at position 85 of the amino acid sequence of isoform CRA b) and the corresponding position of said "V" residue substitution in the modified PRAP1 polypeptide.

As summarized in Table 1 below, the isoform CRA a has the amino acid sequence of SEQ ID NO: 1. In this case, the modified PRAP1 polypeptide has the amino acid sequence of SEQ ID NO: 1 with a substitution of E residue with V residue at residue 88 (E88V). The modified PRAP1 polypeptide with the E88V mutation is designated as "mouse E88V mutant PRAP1" in the present disclosure, and has the amino acid sequence of SEQ ID NO: 2.

Regarding the isoform CRA b, it has the amino acid sequence of SEQ ID NO: 3. In this case, the modified PRAP1 polypeptide has the amino acid sequence of SEQ ID NO: 3 with a substitution of E residue with V residue at residue 85 (E85V). The modified PRAP1 polypeptide with the E85V mutation is designated as "mouse E85V mutant PRAP1" in the present disclosure, and has the amino acid sequence of SEQ ID NO: 4.

TABLE 1

Amino acid sequences of mouse PRAP1

| Name | Amino acid sequence | SEQ ID NO |
|---|---|---|
| WT PRAP1 (isoform CRA a) | MKRFLLATCLVAALLWEAGAAPAHQVPVKTKGKHVFPEQETEKVG RVWDTRALEPLEKDNQLGPLLPEPKQKPAAAEEKRPDAMTWV<u>E</u>TE DILSHLRSPLQGPELDLDSIDHPMSDDVQDEEVPQSRPILYR<u>Q</u>VL QGPEEDLDHLAHSMEDS | 1 |
| Mouse E88V mutant PRAP1 | MKRFLLATCLVAALLWEAGAAPAHQVPVKTKGKHVFPEQETEKVG RVWDTRALEPLEKDNQLGPLLPEPKQKPAAAEEKRPDAMTWV<u>V</u>TE DILSHLRSPLQGPELDLDSIDHPMSDDVQDEEVPQSRPILYR<u>Q</u>VL QGPEEDLDHLAHSMEDS | 2 |
| WT PRAP1 (isoform CRA b) | MKRFLLATCLVAALLWEAGAAPAHQVPVKTKGKHVFPEQETEKVW DTRALEPLEKDNQLGPLLPEPKQKPAAAEEKRPDAMTWV<u>E</u>TEDIL SHLRSPLQGPELDLDSIDHPMSDDVQDEEVPQSRPILYRQVLQGP EEDLDHLAHSMEDS | 3 |

TABLE 1-continued

Amino acid sequences of mouse PRAP1

| Name | Amino acid sequence | SEQ ID NO |
|---|---|---|
| Mouse E85V mutant PRAP1 | MKRFLLATCLVAALLWEAGAAPAHQVPVKTKGKHVFPEQETEKVW DTRALEPLEKDNQLGPLLPEPKQKPAAAEEKRPDAMTWV<u>V</u>TEDIL SHLRSPLQGPELDLDSIDHPMSDDVQDEEVPQSRPILYRQVLQGP EEDLDHLAHSMEDS | 4 |

The substitution in modified PRAP1 polypeptides (i.e., mouse E88V mutant and mouse E85V mutant) and the corresponding residue in WT PRAP1 polypeptides (i.e., isoform CRA a and isoform CRA b) are identified in boldface and underlined.

According to some embodiments of the present disclosure, the E85V knock-in mouse comprises a modified PRAP1 gene, which encodes two isoforms of modified PRAP1 polypeptide during the process of alternative splicing, in which the first isoform of the modified PRAP1 comprises an amino acid sequence of SEQ ID NO: 2 that compared to the WT PRAP1 isoform CRA a, contains a E88V substitution; and the second isoform of the modified PRAP1 comprises an amino acid sequence of SEQ ID NO: 4 that compared to the WT PRAP1 isoform CRA b, contains a E85V substitution.

The methods of generating a gene knock-in mouse are known by a person having ordinary skill in the art. According to some embodiments of the present disclosure, the present E85V knock-in mouse is generated by CRISPR/Cas technology. Specifically, a nucleotide sequence containing the mutation is co-injected with PRAP1-targeting sgRNA and Cas9 mRNA into mouse embryo (e.g., pronuclear stage one-cell embryo) thereby generating the E85V knock-in mouse.

Alternatively, the genetic mutation in PRAP1 polypeptide as disclosed herein (E85V or equivalent thereof in isoforms) can be conditionally knocked-in in a genetically mutated mouse. As used herein, "conditional knock-in" means that the mutated PRAP1 gene is expressed in only specific organ or tissue. For examples, the mutated PRAP1 gene is specifically expressed in intestine (e.g., in intestinal epithelial cells, IECs) in the genetically modified mouse, while a functional PRAP1 is expressed in other organs and tissues. Conditional genetically modified mice can be inducible, for example, by constructing a tetracycline inducible promoter, or a development specific promoter to drive the PRAP1 gene expression. The use of the inducible promoter can allow for eliminating or suppressing expression of a gene/protein at any time or at a specific time. For example, with the case of a tetracycline inducible promoter, tetracycline can be given to a non-human animal any time after birth. If a non-human animal is a being that develops in a womb, then promoter can be induced by giving tetracycline to the mother during pregnancy. If a non-human animal develops in an egg, a promoter can be induced by injecting, or incubating in tetracycline. Once tetracycline is given to the non-human animal, the tetracycline results in the expression of cre, which then results in the excision of a gene of interest. A cre/lox system can also be under the control of a developmental specific promoter. For example, some promoters are turned on after birth, or even after the onset of puberty. These promoters can be used to control cre expression, and therefore can be used in developmental specific knockouts. It is also contemplated that any combinations of knock-out technology can be combined. For example, tissue specific knockout can be combined with inducible technology, creating a tissue specific, inducible knockout. Furthermore, other systems such developmental specific promoter, can be used in combination with tissues specific promoters, and/or inducible knockouts.

According to working examples of the present disclosure, the deficiency of PRAP1 reduces lipid absorption, and accordingly, compared with WT control mouse (i.e., PRAP1$^{+/+}$ mouse), the E85V knock-in mouse has lower plasma levels of TG and phospholipid, and higher levels of lipids and calories in the feces thereof. According to some examples, the WT control mouse and the E85V knock-in mouse are fed a high-fat diet.

II-3. Uses of the Present Transgenic Mice in Selecting Therapeutic Drugs

The transgenic mice of the present disclosure, including PRAP1$^{-/-}$ mouse and E85V knock-in mouse, can be used for various purposes. For example, the present transgenic mice can be used as disease models for studying dyslipidemia-associated disorders and/or for identifying drug candidates for treating dyslipidemia and/or dyslipidemia-associated disorders.

According to some embodiments, the present transgenic mice or the cells derived therefrom may be used to identify a drug for treating dyslipidemia and/or dyslipidemia-associated disorders. The method for selecting a drug candidate for treating a dyslipidemia-related disease by use of the transgenic mouse in accordance with any aspect or embodiment of the present disclosure comprises, (a) administering to the transgenic mouse one or more candidate drugs; and (b) selecting the drug candidate from the one or more candidate drugs, wherein the drug candidate improves a phenotype associated with the dyslipidemia-related disease in the transgenic mouse.

According to some embodiments, the dyslipidemia-related disease is atherosclerosis, hyperlipidemia, hypertriglyceridemia or hypercholesterolemia. In these embodiments, the transgenic mouse is fed a high-fat diet or a Western diet. A high-fat diet refers to a diet comprising 60% energy from fat, for example, TESTDIET®58Y1. A Western diet refers to a diet comprising protein of 17% kcal, fat of 40% kcal, carbohydrate of 43% kcal with energy density of 4.67 kcal/g; examples of a Western diet include Research Diets D12079B Formula. The food containing high energy and fat leads to the development of a dyslipidemia-related disease, e.g., hypercholesterolemia or atherosclerosis in the transgenic mouse. Then, the candidate drugs are administered to the transgenic mouse having the dyslipidemia-related disease. Development and change of a symptom associated with the disease can be monitored prior to, during, and/or after the administration. Alleviation or amelioration of one or more symptoms associated with the disease is indicative potential therapeutic effect of the candidate drug against the disease.

Alternatively, the dyslipidemia-related disease is hypolipidemia, hypotriglyceridemia or abetalipoproteinemia. As described above, compared with WT control mouse, the present transgenic mouse exhibits lower plasma levels TG and phospholipid, and accordingly may serve as an animal model to identity a candidate drug for enhancing the absorption of lipid and/or increasing the plasma levels TG and phospholipid thereby alleviating and/or ameliorating the symptoms associated with the dyslipidemia-related disease. Development and change of a symptom associated with the disease can be monitored prior to, during, and/or after the administration. Alleviation or amelioration of one or more symptoms associated with the disease is indicative potential therapeutic effect of the candidate drug against the disease. For example, a drug candidate may increase the adipose tissue of the transgenic mouse; increase the plasma level of lipid, phospholipid, TG, apoB48 and/or apoB100 in the transgenic mouse; and/or decrease the level of lipid or calories in the feces of the transgenic mouse.

Candidate drugs may be a molecule of any type, for example, a protein, polypeptide, peptide, nucleic acid, oligonucleotide, lipid, saccharide, polysaccharide, or small molecule. In some examples, the candidate agent is a small molecule compound, which may have a molecular weight of less than about 2,500 daltons.

Candidate drugs can be obtained from a wide variety of sources, including libraries of synthetic or natural compounds. For example, numerous means are available for random and directed synthesis of a wide variety of organic compounds and biomolecules, including the expression of randomized oligonucleotides and oligopeptides. Alternatively, libraries of natural compounds in the form of bacterial, fungal, plant and animal extracts are available or readily produced. Additionally, natural or synthetically produced libraries and compounds are readily modified through conventional chemical, physical and biochemical means, and may be used to produce combinatorial libraries.

Preferably, the screen will include a negative control (e.g., with no compound) and a positive control (e.g., with a compound known to have therapeutic effects against the disorder).

II-4. Methods of Treating Hyperlipidemia or Hyperlipidemia-Related Diseases

Also disclosed herein is a method of treating hyperlipidemia or a hyperlipidemia-related disease. The method comprises administering to the subject an effective amount of a PRAP1 inhibitor, a modified PRAP1 polypeptide, or a nucleic acid encoding the modified PRAP1 polypeptide.

Depending on desired purposes, the PRAP1 inhibitor may be an antisense oligonucleotide, a small interfering RNA targeting PRAP1, or any other molecules exhibiting an inhibitory or suppressing effect on the expression and/or activity of PRAP1.

In the present disclosure, the modified PRAP1 polypeptide comprises the same amino acid sequence as a WT PRAP1 polypeptide, except for having an amino acid modification in the amino acid sequence thereof. Specifically, the amino acid modification of the modified PRAP1 polypeptide is a substitution of glutamic acid (E) with valine (V) as compared to the WT PRAP1 polypeptide, i.e., an "E" residue at a specific position in the WT PRAP1 polypeptide is changed to be a "V" residue at the corresponding position in the modified PRAP1 polypeptide.

According to some embodiments, the subject is a mouse, in which a modified PRAP1 polypeptide having the amino acid sequence of SEQ ID NO: 1 with an E88V substitution (i.e., the mouse E88V mutant PRAP1 of SEQ ID NO: 2), or a modified PRAP1 polypeptide having the amino acid sequence of SEQ ID NO: 3 with an E85V substitution (i.e., the mouse E85V mutant PRAP1 of SEQ ID NO: 4) is administered to the subject thereby eliciting a therapeutic effect in the subject.

According to alternative embodiments, the subject is a human. Similar to the PRAP1 polypeptide in mouse as described in section II-2 of the present disclosure, two transcript variants of PRAP1 polypeptide are identified in human due to the process of alternative splicing, including human PRAP1 transcript variant 1 (GenBank accession number: NP_660203; SEQ ID NO: 5), and human PRAP1 transcript variant 2 (GenBank accession number: NP_001138673; SEQ ID NO: 7). As summarized in Table 2, the amino acid sequence "QGRGPILPG" (SEQ ID NO: 9) is present at positions 80-88 of the amino acid sequence of transcript variant 1 (having 151 amino acid residues in length), and is absent in the amino acid sequence of transcript variant 2 (having 142 amino acid residues in length). The presence or absence of the "QGRGPILPG" (SEQ ID NO: 9) sequence affects the position of said "E" residue in the WT PRAP1 polypeptide (i.e., the "E" residue is at position 94 of the amino acid sequence of transcript variant 1, and is at position 85 of the amino acid sequence of transcript variant 2) and the corresponding position of said "V" residue substitution in the modified PRAP1 polypeptide.

Specifically, the transcript variant 1 has the amino acid sequence of SEQ ID NO: 5. In this case, the modified PRAP1 polypeptide has the amino acid sequence of SEQ ID NO: 5 with a substitution of E residue with V residue at residue 94 (E94V). The modified PRAP1 polypeptide with the E94V mutation is designated as "human E94V mutant PRAP1" in the present disclosure, and has the amino acid sequence of SEQ ID NO: 6.

The transcript variant 2 has the amino acid sequence of SEQ ID NO: 7. In this case, the modified PRAP1 polypeptide has the amino acid sequence of SEQ ID NO: 7 with a substitution of E residue with V residue at residue 85 (E85V). The modified PRAP1 polypeptide with the E85V mutation is designated as "human E85V mutant PRAP1" in the present disclosure, and has the amino acid sequence of SEQ ID NO: 8.

TABLE 2

Amino acid sequences of human PRAP1

| Name | Amino acid sequence | SEQ ID NO |
|---|---|---|
| WT PRAP1 (variant 1) | MRRLLLVTSLVVVLLWEAGAVPAPKVPIKMQVKHWPSEQDPEKA WGARVVEPPEKDDQLVVLFPVQKPKLLTTEEKPRGQGRGPILPG TKAWMETEDTLGHVLSPEPDHDSLYHPPPEEDQGEERPRLWVMP NHQVLLGPEEDQDHIYHPQ | 5 |

TABLE 2-continued

Amino acid sequences of human PRAP1

| Name | Amino acid sequence | SEQ ID NO |
|---|---|---|
| Human E94V mutant PRAP1 | MRRLLLVTSLVVVLLWEAGAVPAPKVPIKMQVKHWPSEQDPEKA WGARVVEPPEKDDQLVVLFPVQKPKLLTTEEKPRGQGRGPILPG TKAWMVTEDTLGHVLSPEPDHDSLYHPPPEEDQGEERPRLWVMP NHQVLL̲GPEEDQDHIYHPQ | 6 |
| WT PRAP1 (variant 2) | MRRLLLVTSLVVVLLWEAGAVPAPKVPIKMQVKHWPSEQDPEKA WGARVVEPPEKDDQLVVLFPVQKPKLLTTEEKPRGTKAWMETED TLGHVLSPEPDHDSLYHPPPEEDQGEERPRLWVMPNHQVLL̲GPE EDQDHIYHPQ | 7 |
| Human E85V mutant PRAP1 | MRRLLLVTSLVVVLLWEAGAVPAPKVPIKMQVKHWPSEQDPEKA WGARVVEPPEKDDQLVVLFPVQKPKLLTTEEKPRGTKAWMVTED TLGHVLSPEPDHDSLYHPPPEEDQGEERPRLWVMPNHQVLL̲GPE EDQDHIYHPQ | 8 |

The substitution in modified PRAP1 polypeptides (i.e., human E94V mutant PRAP1 and human E85V mutant PRAP1) and the corresponding residue in WT PRAP1 polypeptides (i.e., transcript variant 1 and transcript variant 2) are identified in boldface and underlined.

In the embodiments where the subject is a human, a modified PRAP1 polypeptide having the amino acid sequence of SEQ ID NO: 6 or 8 is administered to the subject so as to decrease the level of lipids (e.g., total lipid contents, phospholipids and/or TG) in the blood of the subject, and/or alleviate or ameliorate the symptoms associated with the hyperlipidemia-related disease.

The present modified PRAP1 polypeptide may be administered to the subject via a suitable route in accordance with intended purposes, for example, oral, nasal or parenteral injection, e.g., subcutaneous, intravenous, intra-arterial, intramuscular or intraperitoneal injection. According to one working example, the modified PRAP1 polypeptide is orally administered to the subject.

The present modified PRAP1 polypeptide may be produced by conventional recombinant technology. For example, a nucleic acid comprising a coding sequence for the modified PRAP1 polypeptide may be prepared using PCR techniques, or any other method or procedure known to one skilled in the art. The nucleic acid molecules thus obtained may be inserted into a suitable expression vector to enable the expression of the encoded recombinant protein in a suitable host cell. In some embodiments, the expression vector may include additional sequences, which render this vector suitable for replication and integration in prokaryotes or eukaryotes. Alternatively or in addition, the expression vector may comprise transcription and translation initiation sequences (e.g., promoters or enhancers and transcription and translation terminators (e.g., polyadenylation signals). Exemplary expression vectors include, but are not limited to, bacterial expression vector, yeast expression vector, baculoviral expression vector, and mammalian expression vector. Any of the nucleic acids coding for the present modified PRAP1 polypeptide, a vector (such as an expression vector) comprising the nucleic acid, and host cells comprising the vector are also within the scope of the present disclosure.

A variety of prokaryotic or eukaryotic cells can be used as the host-expression system to express the present modified PRAP1 polypeptide. Examples of the expression systems include, but are not limited to, microorganisms, such as bacteria, yeast, plant cell, eukaryotic cell (e.g., mammalian cell or CHO cell), etc. Methods for transducing the expression vector into the host-expression system are known by a skilled artisan, e.g., stable or transient transfection, lipofection, electroporation and infection with recombinant viral vectors.

II-5. Pharmaceutical Compositions

The present disclosure also provides a pharmaceutical composition for treating diseases, e.g., dyslipidemia-related diseases. The present pharmaceutical composition comprises a first modified PRAP1 polypeptide and a pharmaceutically acceptable excipient, wherein the first modified PRAP1 polypeptide is any of mouse E88V mutant PRAP1 (SEQ ID NO: 2), mouse E85V mutant PRAP1 (SEQ ID NO: 4), human E94V mutant PRAP1 (SEQ ID NO: 6), or human E85V mutant PRAP1 (SEQ ID NO: 8) as described in sections II-2 and II-4 of the present disclosure.

For the purpose of improving the therapeutic effect, in addition to the first modified PRAP1 polypeptide, the present pharmaceutical composition may further comprise a second modified PRAP1 polypeptide selected from the group consisting of mouse E88V mutant PRAP1 (SEQ ID NO: 2), mouse E85V mutant PRAP1 (SEQ ID NO: 4), human E94V mutant PRAP1 (SEQ ID NO: 6), or human E85V mutant PRAP1 (SEQ ID NO: 8), wherein the first and second modified PRAP1 polypeptides are different. For example, the present pharmaceutical composition may comprise the mouse E88V mutant PRAP1 as the first PRAP1 polypeptide, and the mouse E85V mutant PRAP1 as the second PRAP1 polypeptide thereby improving the therapeutic effect in the mouse subject. Alternatively, the present pharmaceutical composition may comprise the human E94V mutant PRAP1 as the first PRAP1 polypeptide, and the human E85V mutant PRAP1 as the second PRAP1 polypeptide thereby improving the therapeutic effect in the human subject.

The present pharmaceutical composition may be formulated into solid, semi-solid, or liquid forms, such as tablets, capsules, powders, granules, ointments, solutions, suppositories, and injections. As such, administration of the present modified PRAP1 polypeptide can be achieved in various ways, including oral, buccal, rectal, parental, intraperitoneal, and etc. administration. One of skilled person in the art is familiar with the various dosage forms that are suitable for use in each route. It is to be noted that the most suitable route in any given case would depend on the nature or severity of the disease or condition being treated.

In some embodiments, the pharmaceutical compositions of this disclosure are solid dosage forms for oral administration. Such solid dosage forms may be capsules, sachets, tablets, pills, lozengens, powders or granules. In such forms, the active ingredient such as any of the compounds described above is mixed with at least one pharmaceutically acceptable excipient. Any of the described solid dosage forms may optionally contain coatings and shells, such as enteric coatings, and coatings for modifying the release rate of any of the ingredients. Examples of such coatings are well known in the art. Formulations for oral use may also be presented as hard gelatin capsules wherein the active ingredient is mixed with an inert solid diluent, for example, calcium carbonate, calcium phosphate or kaolin, or as soft gelatin capsules wherein the active ingredients is mixed with water-miscible solvents such as propylene glycol, PEGs and ethanol, or an oil medium, for example peanut oil, liquid paraffin, or olive oil.

In some embodiments, the pharmaceutical compositions of the present disclosure are liquid dosage forms for oral administration. The liquid formulation may further include a buffering agent to maintain a desired pH. The liquid dosage formulations may also be filled into soft gelatin capsules. For example, the liquid may include a solution, suspension, emulsion, micro-emulsion, precipitate or any desired liquid media carrying any of the compound as described above, or a pharmaceutically acceptable derivative, salt or solvate thereof, or a combination thereof. The liquid may be designed to improve the solubility of active compound as described above to form a drug-containing emulsion or disperse phase upon release.

In some embodiments, the pharmaceutical compositions of this disclosure are formulations suitable for parenteral administration, such as administration by injection, which includes, but is not limited to, subcutaneous, intramuscular, intraperitoneal and intravenous injection. The pharmaceutical compositions may be formulated as isotonic suspensions, solutions or emulsions in oily or aqueous vehicles, and may contain formulary agents such as suspending, stabilizing or dispersing agents. Alternatively, the compositions may be provided in dry form such as powders, crystallines or freeze-dried solids with sterile pyrogen-free water or isotonic saline before use. They may be presented in sterile ampoules or vials. When the present modified PRAP1 polypeptide is formulated to be administered by parenteral route, the polypeptide is in the form of a pyrogen-free, parenterally acceptable aqueous solution. The preparation of such parenterally acceptable polypeptide solutions, having due regard to pH, isotonicity, stability, and the like, is within the skill in the art. A preferred pharmaceutical composition for parenteral administration should contain, in addition to the present modified PRAP1 polypeptide, an isotonic vehicle such as Sodium Chloride Injection, Ringer's Injection, Dextrose Injection, Dextrose and Sodium Chloride Injection, Lactated Ringer's Injection, or other vehicle as known in the art. The pharmaceutical composition of the invention may also contain stabilizers, preservatives, buffers, antioxidants, or other additives known to those of skill in the art.

The subject treatable with the present modified PRAP1 polypeptide, pharmaceutical composition, and/or method is a mammal, for example, a human, mouse, monkey, rat, cat, dog, sheep, goat, or rabbit. Preferably, the subject is a human.

The following Examples are provided to elucidate certain aspects of the present invention and to aid those of skilled in the art in practicing this invention. These Examples are in no way to be considered to limit the scope of the invention in any manner. Without further elaboration, it is believed that one skilled in the art can, based on the description herein, utilize the present invention to its fullest extent. All publications cited herein are hereby incorporated by reference in their entirety.

Example

Materials and Methods

Generation of $PRAP1^{-/-}$ Knockout ($PRAP1^{-/-}$) and E85V Knock-In Mice

To generate $PRAP1^{-/-}$ mice, two overlapping genomic fragments harboring the Prap1 genomic locus were first isolated from a 129/Svj mouse genomic library and used to construct the targeting vector. This targeting vector was constructed by PCR assisted cloning in such a way that, after homologous recombination, a LacZ reporter linked to a floxed Neo marker (LacZ-Neo cassette; SEQ ID NO: 18) would be inserted into exon 3 of the PRAP1 locus (FIG. 1A). This targeting vector was then electroporated into R1 embryonic stem cells, and Southern blotting using appropriate probes was carried out to select clones that had undergone homologous recombination at the PRAP1 locus. Two positive clones, #159 and #318, harboring the mutant allele were microinjected into C57BL/6 blastocysts to generate chimeric mice.

The male chimeric mice were backcrossed with C57BL/6 females to generate $PRAP1^{+/-}$ mice. $PRAP1^{+/-}$ mice backcrossed to C57BL/6 background for more than 10 generations were intercrossed to generate $PRAP1^{+/+}$ (littermate controls) and $PRAP1^{-/-}$ (knockout) mice for this study. Genotyping was performed by PCR with genomic DNA isolated from the mouse tails. p1 (5'-TCCAGCACACCAGGTATGCAAGG-3'; SEQ ID NO: 10) and p3 (5'-AGGGTCCTCAAGGGCAAGGGAGT-3'; SEQ ID NO: 11) were used as the PCR primers for the wild-type allele, and p1 and p2 (5'-TCGA-TAGCTTGGCTGCAGGTCG-3'; SEQ ID NO: 12) were used as the PCR primers for the mutant allele. According to the sequence analysis, the LacZ-Neo cassette (SEQ ID NO: 18) was inserted between the nucleotide residue "G" at position 20 and the nucleotide residue "C" at position 21 of exon 3 (SEQ ID NO: 20) of PRAP1 gene; the exon 3 of the thus-obtained $PRAP1^{-/-}$ mice comprised the nucleotide sequence of SEQ ID NO: 19.

To generate the E85V knock-in mutant mice, the CRISPR/Cas-mediated genome engineering system was employed. Briefly, the E85V mutation was introduced into the PRAP1 gene through homology directed repair-mediated genome editing following co-injection of a single-stranded mutant DNA oligo (5'-GTGGGAAGGATCTTGT-GAGGGAGGCTATATCTACGTCTCCTTCTCCACAG-ATGCC ATGACATGGGTAGTGACTGAGGATATCCT-GAGCCATCTTCGCAGTCCTCTTCAGGGT CCAGAACTGGATCTTGA-3'; SEQ ID NO: 13; mutated sites were underlined), Prap1-targeting sgRNA (target site: 5'-GATATCCTCAGTCTCCACCC-3'; SEQ ID NO: 14) and Cas9 mRNA into the pronuclear stage one-cell C57BL/6 mouse embryos. By PCR genotyping and genomic sequencing of 23 mice generated, four (#6, #8, #15 and #19) and 5 (#2, #4, #13, #14 and #18) mice were found to harbor biallelic or monoallelic mutation, respectively. Mice #2 (monoallelic) and #19 (biallelic) were subsequently mated with C57BL/6 mice to generate $PRAP1^{+/E85V}$ mice. $PRAP1^{+/E85V}$ mice were then intercrossed to generate $PRAP1^{+/+}$ (littermate controls) and $PRAP1^{E85V/E85V}$ (termed as E85V mice) for this study. The E85V mice from both lines (#2 and #19) manifested very similar phenotypes and were analyzed together (about 50% from each line) in statistical analysis. PRAP1-I3-F (5'-TACCTACTCCCTTGCCCTTG-3'; SEQ ID NO: 15) and PRAP1-reverse (5'-CAGTCTC-CACCCAGGTCATG-3'; SEQ ID NO: 16) were used as the PCR primers for the wild-type allele, and PRAP1-I3-F and E85V-reverse (5'-CAGTCACTACCCATGTCATG-3'; SEQ ID NO: 17) were used as the PCR primers for the mutant allele.

Mice were housed in a room with a 12-hour light/dark cycle (lights on at 7:00 A.M.) with ad libitum access to food and water. 8-12 week old male mice were used for all studies unless otherwise indicated. All animal experiments were performed in accordance with the guidelines set by Academia Sinica Institutional Animal Care and Utilization Committee.

Mutagenesis, Production and Purification of Recombinant PRAP1 from Bacteria pGEX4T-1-PRAP1ΔN20 was a bacterial expression vector that directed the synthesis of PRAP1 without the N-terminal 20-aa signal peptide (PRAP1 Δ N20) C-terminally fused to the glutathione S-transferase (GST) protein. Other bacterial expression vectors (also in the pGEX4T-1 vector) expressing various mutants of PRAP1 (e.g., E38V; E51, 54V, etc) were constructed by standard PCR-assisted mutagenesis-coupled cloning methods using pGEX4T-1-PRAP1Δ N20 as a template. pGEX4T-1-PRAP1 21-40, pGEX4T-1-PRAP1 21-76 and pGEX4T-1-PRAP1 21-110 were additional bacterial expression vectors that directed the synthesis of N-terminally GST-tagged PRAP1 mutants covering amino acid residues of PRAP1 as indicated in their names.

To purify recombinant PRAP1Δ N20 (designated as WT rPRAP1 in the present example) and various other mutants described above, bacterially-produced GST-fusion proteins were purified with glutathione SEPHAROSE® 4B beads, digested with thrombin to remove the GST portion, followed by inactivation of thrombin by adding phenylmethylsulfonyl fluoride (PMSF) to a final concentration of 1 mM PMSF. Unless otherwise indicated, all recombinant PRAP1 (WT or mutants, with or without GST tag) mentioned in the present examples referred to proteins without the N-terminal 20-aa signal peptide.

Measurement of Lipid Absorption in the Small Intestines

Mice to be tested were provided with food only during 7 p.m. to 7 a.m. for three days. On the fourth day at 7 p.m., mice were i.v. injected with 500 mg/kg body weight Tyloxapol (to block hydrolysis of triglyceride (TG)-rich lipoproteins), followed by an intragastric bolus of 0.5 ml of corn oil containing 5 uCi of [$^{14}$C]-Triolein and 1 uCi of [$^{3}$H]-β-sitostanol (serve as a control in that it can hardly be absorbed by the small intestine). One to three hours later, the middle portion of the small intestine was collected, their radioactive contents in the cell lysates were measured, and the ratio of [$^{14}$C]/[$^{3}$H] radioactivity was determined and plotted. In some cases, blood samples were collected at 1-3 hours after lipid administration, and the amount of [$^{14}$C]-Triolein derived radioactivity in the whole blood was determined. For counting the radioactivity in either the small intestine or the blood sample, the tissue specimens were solubilized prior to the addition of the scintillation cocktail.

Lipid Binding Assays

Approximately 0.7 μg of GST or GST-PRAP1 proteins (WT or mutant, all without signal peptides unless otherwise indicated) bound to glutathione SEPHAROSE® 4B beads were washed with buffer A (50 mM Tris-HCl pH7.4 and 150 mM NaCl) three times and then re-suspended in 100 μL of buffer A containing the indicated amounts of [$^{3}$H]-TG. After incubating at room temperature (RT) for 4 hours, beads were washed three times with 800 μL of buffer A by centrifugation, and resuspended in 500 μL of buffer E (10 mM Tris-HCl pH 7.4, 150 mM NaCl, 1 mM EDTA, and 1% TRITON™ X-100), and assayed for retained radioactivity using a scintillation counter.

Density Gradient Ultracentrifugation

HeLa cells (6×10$^5$ cells in 6 cm plate) were cotransfected with ApoB48, MTTP along with PRAP1-WT or E85V expressing vector. After 24 hours, medium were aspirated and replaced with 4.5 ml lipid-rich medium (DMEM containing 1% fatty acid-free bovine serum albumin (BSA), 0.8 mM sodium oleate, 1 mM glycerol, and 0.05 mg/ml of cholesterol) for another 24 hours. After harvesting, media were adjusted to contain 1 mM PMSF, 0.02% EDTA, 0.02% NaN3 and protease inhibitors, and centrifuged for 5 minutes at 1200 rpm to remove cell debris. ApoB-containing lipoproteins in the conditioned medium were separated by density gradient ultracentrifugation. Briefly, 4 ml of the medium, adjusted to d=1.12 g/ml with solid KBr (0.565 g), was sequentially overlaid with 3 ml of d=1.063 g/ml, 3 ml of d=1.019 g/ml, and 2 ml of d=1.006 g/ml density solutions in a centrifuge tube. After centrifugation at 40,000 rpm for 33 minutes at 15° C., the top 1 ml of the gradient was collected as fraction 1. The gradients were then overlaid with 1 ml of d=1.006 g/ml density solutions. Following subsequent centrifugation at 40,000 rpm for 3 hours and 30 minutes at 15° C., the top 1 ml of the gradient was collected as fraction 2. The tubes were overlaid with 1 ml of d=1.006 g/ml density solutions and centrifuged at 40,000 rpm for 17 hours at 15° C. Other lipoproteins were collected from the top into 12 one-ml fractions. Proteins in individual fractions were processed to remove lipids by precipitation of proteins with cold acetone. The precipitated proteins were resuspended in a buffer containing 20 mM Tris, 1 mM EDTA, pH7.4 and 1% SDS, followed by SDS-PAGE and immunoblotting analysis using MTTP, apoB and PRAP1-specific antibodies.

Fractionation of Plasma Lipoproteins

Pooled plasma from three mice of the indicated genotypes (300 l) (actual injection volume 200 l) was fractionated by Fast Phase Liquid Chromatography (FPLC). Elution was performed in phosphate-buffered saline (PBS) containing 0.01% EDTA and 0.02% NaN3, and approximately 0.6 ml was collected for each fraction. Fractions 12-31 were collected for lipid and protein analysis. In some cases, pooled plasma (0.6-1 ml) from 3-5 mice of the indicted genotypes were fractionated by density gradient ultracentrifugation. Briefly, 1 ml of plasma was adjusted to d=1.10 g/ml with solid NaCl (140.4 mg) and mixed with 3 ml of 1.1 g/ml NaCl in a centrifuge tube. A density gradient consisting of 3 ml of d=1.065 g/ml NaCl, 3 ml of d=1.02 g/ml NaCl, and 2 ml of d=1.006 g/ml NaCl was then sequentially layered on top of the plasma. After centrifugation at 40,000 rpm for 33 minutes at 15° C., the top 1 ml of the gradient was collected as fraction 1 (large chylomicrons, d=about 0.96 g/ml). The gradient was then overlaid with 1 ml of 1.006 g/ml solution and centrifuged again at 40,000 rpm for 3 hours and 30 minutes (15° C.). The top 1 ml was collected as fraction 2 (small chylomicrons). The gradient was replenished with 1.006 g/ml solutions and centrifuged again (40,000 rpm, 15° C., 17 hours). The top 1 ml was collected as fraction 3 (VLDL size particles). The rest of the gradient was collected into 10 one-ml fractions.

Bomb Calorimetry

Feces collected from individually-housed mice over 48 hours were dried at 60° C. for two days, homogenized and subjected to analysis in triplicates (0.2 ug, each) using semimicro oxygen bomb calorimeter. Energy content per gram of dry weight was then calculated.

Determination of Fecal Lipid Content

Feces over 2-4 days were collected from individually-housed mice that had been fed a HFD for 2 weeks.

Animal Study

Wild type C57BL/6 mice (n=10 for each group) were orally administered with rE85V protein (SEQ ID NO: 4; 10 mg/Kg, once daily) or the vehicle alone (PBS) at the same time when they started HFD at the age of 8 weeks. One week later, body weight gain (% increase compared to initial body weight) was measured. On days 5-9 of the HFD, feces were collected, and total fecal lipid content was determined.

Statistics

Statistical analysis was performed with either t-tests for comparison between two groups or one-way analysis of variance (Tukey's post-test) for comparison among multiple experimental groups using software.

Example 1 PRAP1 Deficient Mice Manifest Increased Length of the Small Intestine

The mouse PRAP1 gene encodes a proline-rich, acidic polypeptide of 149 amino acids (aa) with a putative 20-aa signal peptide. Transient transfection assays using expression vectors encoding PRAP1 C-terminally tagged with HA or FLAG revealed that both tagged molecules were secreted into the culture medium of the transfected cells, suggesting that PRAP1 is a secreted protein (data not shown).

Figure 1B:
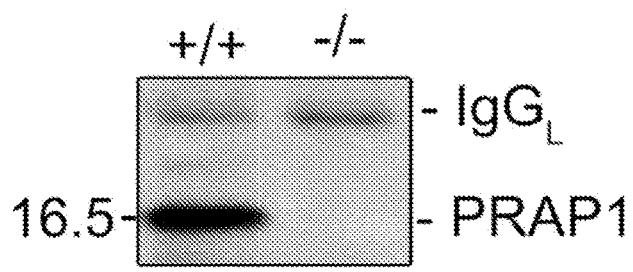
Figure 1C:
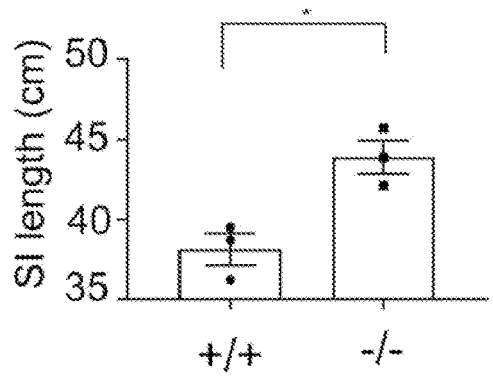

To delineate the physiological functions of PRAP1, the PRAP1 KO mice (PRAP1$^{-/-}$) were generated by conventional gene-targeting approach (FIG. 1A). The data of FIG. 1B confirmed that the PRAP1$^{-/-}$ mice do not express PRAP1 protein. Homozygous mutants were born with an expected Mendelian frequency, and appeared to be normal in their gross appearance (data not shown). On a normal chow diet, the body weight increase of the PRAP1$^{-/-}$ mice was quite similar to that of the control mice (data not shown). Immunohistochemical analysis of the small intestinal sections from the control mice with PRAP1-specific antibody revealed that the PRAP1 protein was expressed in nearly all epithelial cell lineages (data not shown). In the knockout mice, the epithelial-specific expression of PRAP1 was completely ablated (data not shown). Deficiency of PRAP1 did not significantly affect the overall morphology, proliferation or differentiation in the small intestinal epithelium as revealed by staining the tissue sections with the proliferation marker (Ki-67) (data not shown) or markers for various cell lineages (data not shown). Pulse-labeling of mice with bromodeoxyuridine (BrdU) also revealed no significant differences in the migration of intestinal epithelial cells (IEC) between control and PRAP1$^{-/-}$ mice (data not shown). However, interestingly, it was observed that the length of the small intestine in PRAP1$^{-/-}$ mice was significantly longer than that in control mice (FIG. 1C).

Figure 2A:
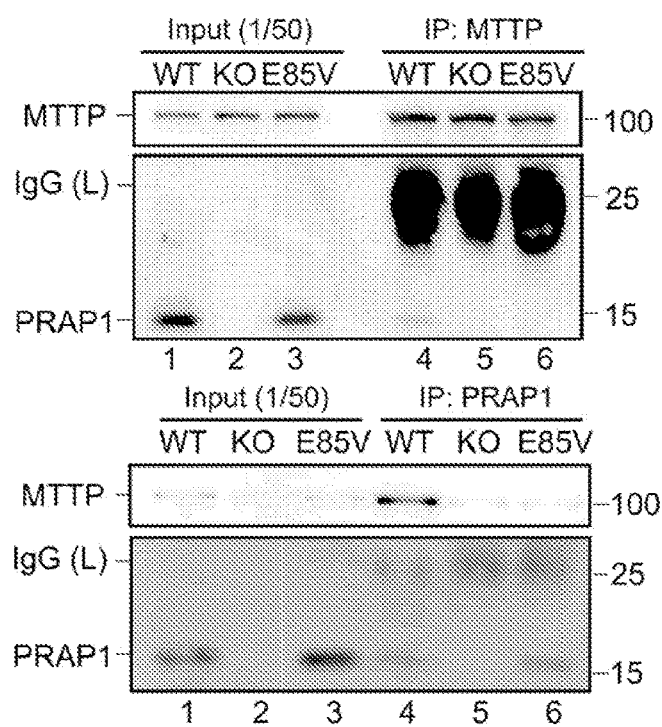
FIGS. 2A to 2H depict that PRAP1 formed a complex with microsomal triglyceride transfer protein (MTTP) and was involved in MTTP-mediated lipid transfer according to Example 2 of the present disclosure.
Figure 2B:
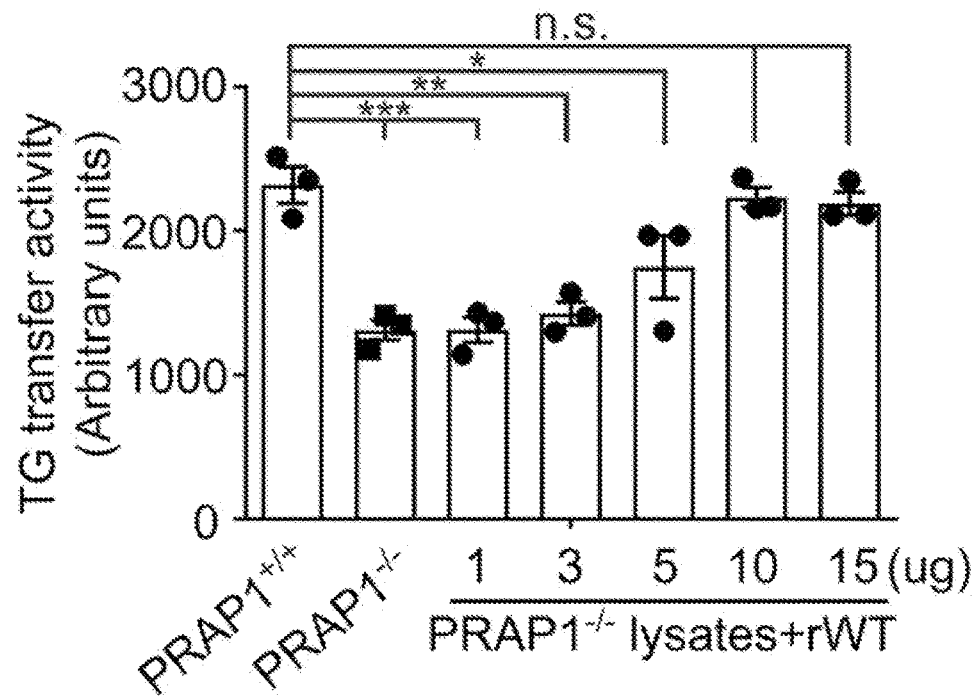
Figure 2C:
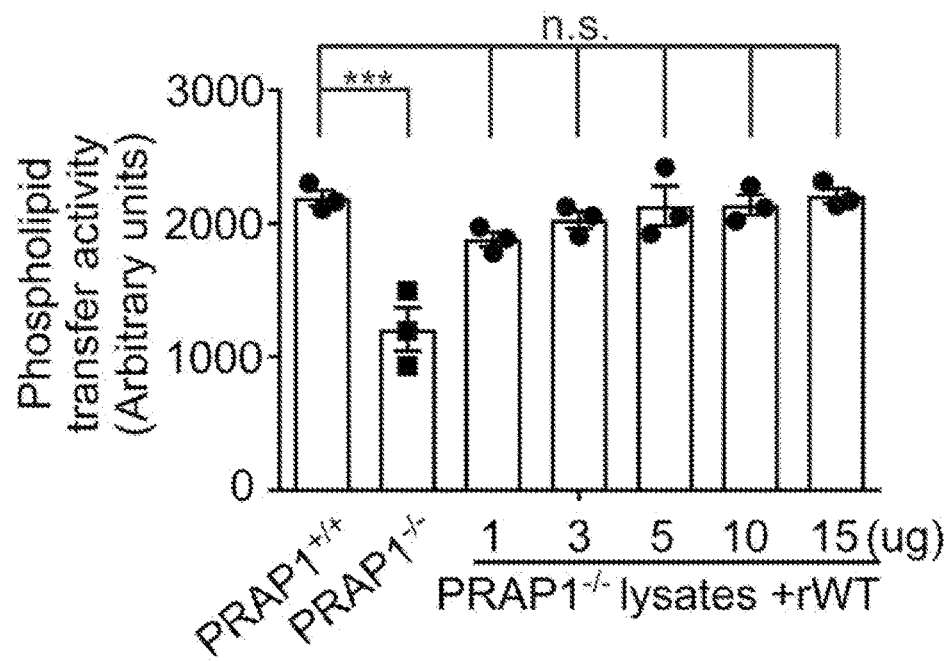
Figure 2D:
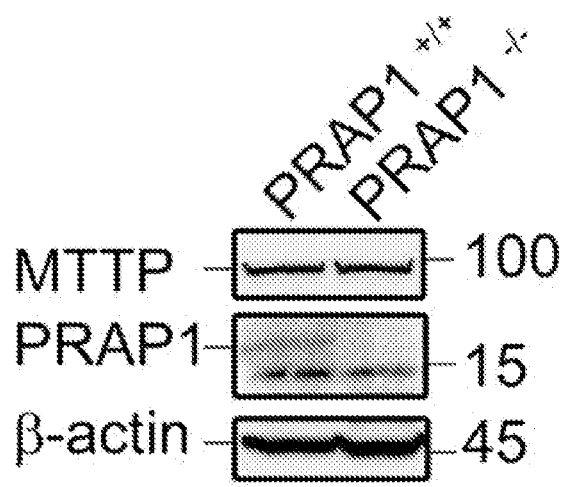
Figure 2E:
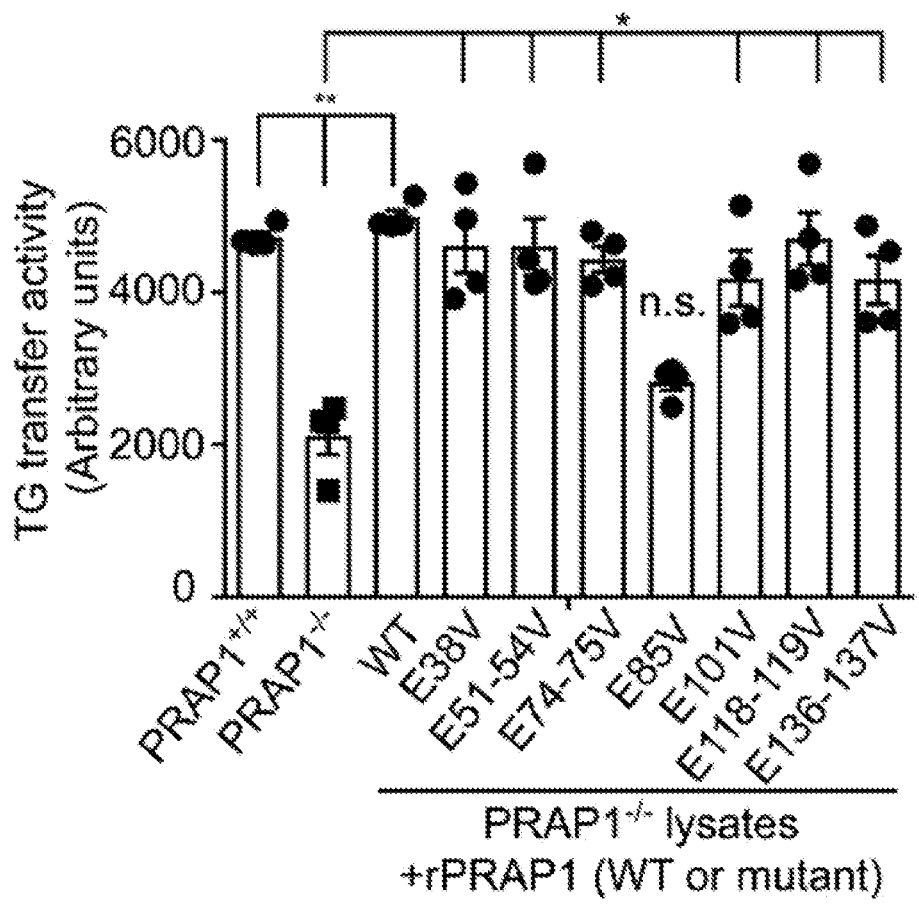
Figure 2F:
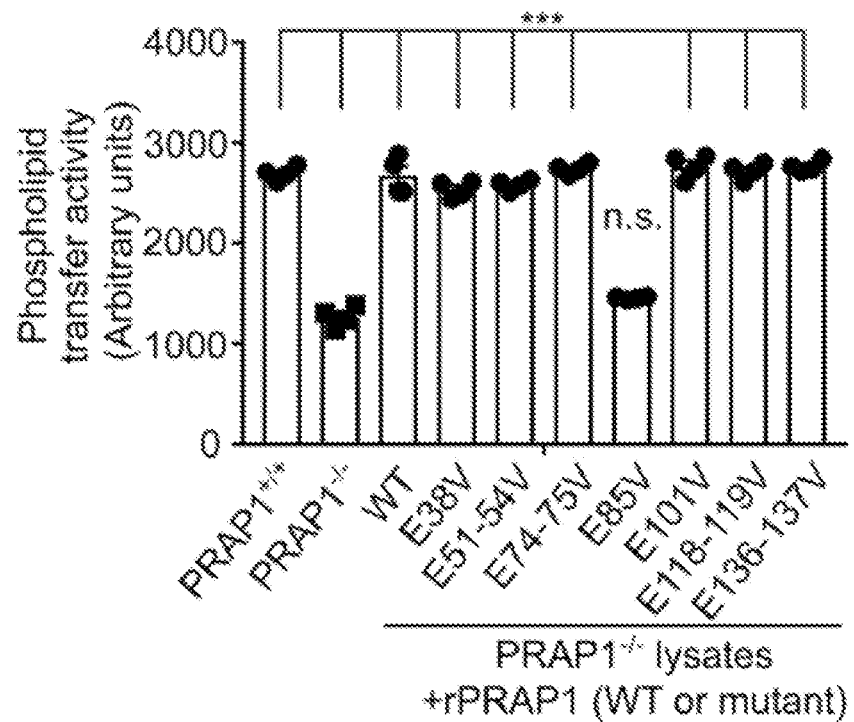
Figure 2G:
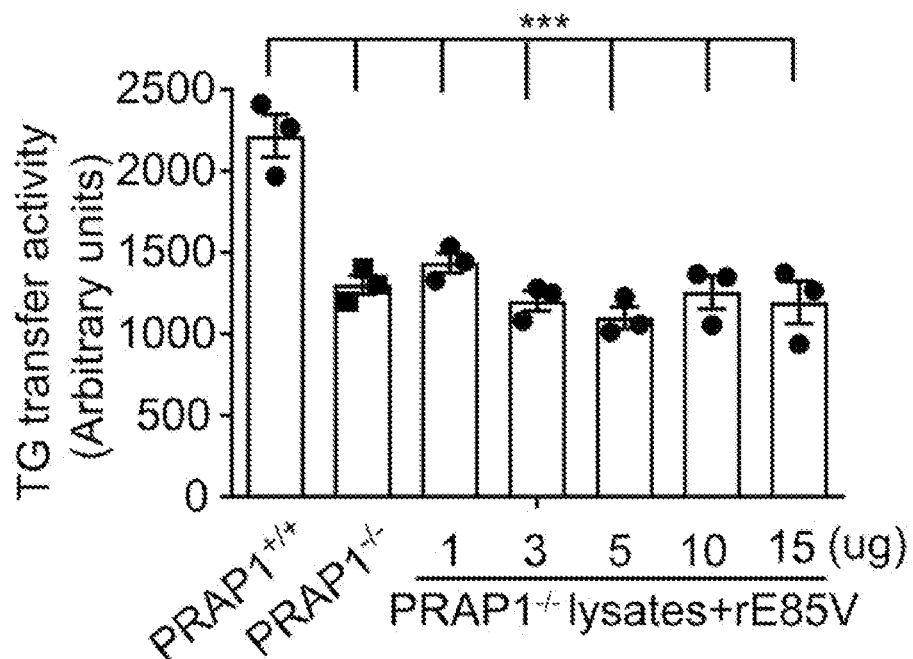
Figure 2H:
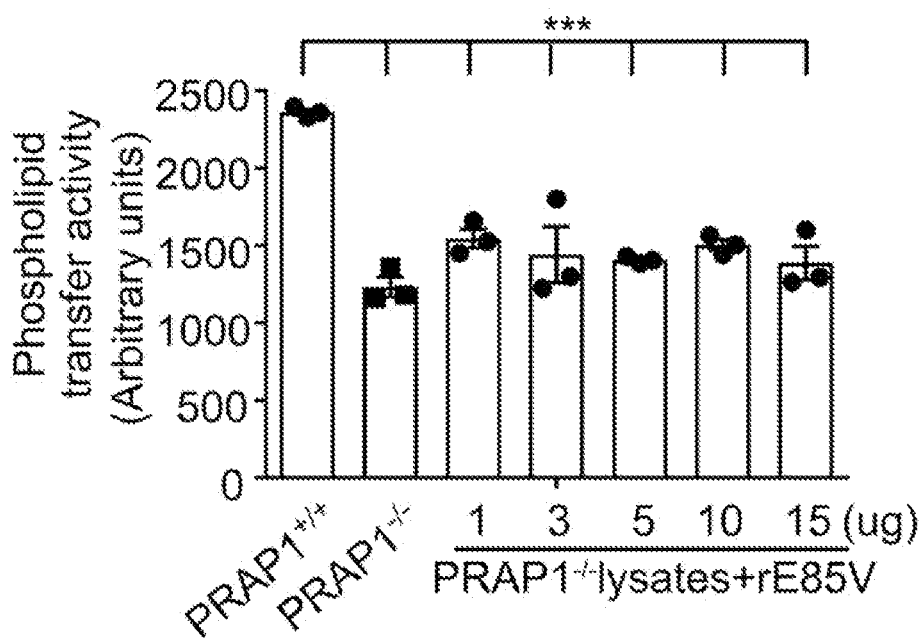

Example 2 PRAP1 Interacts with MTTP and Promotes MTTP-Mediated Lipid Transfer and apoB48 Lipoprotein Secretion To explore PRAP1 functions, a pull-down assay using a GST-tagged recombinant PRAP1 lacking N-terminal 20-aa signal peptide (GST-PRAP1Δ N20) and cell lysates prepared from IEC of PRAP1$^{-/-}$ mice was carried out. Mass-spectrometry analysis of proteins pull-downed by GST-PRAP1Δ N20 revealed that MTTP is the top candidate that interacts with PRAP1. Further co-immunoprecipitation (IP) analysis using either PRAP1 or MTTP-specific antibody confirmed that PRAP1 in IEC from control but not the E85V knock-in mutant mice could be co-immunoprecipitated with MTTP at the endogenous levels (FIG. 2A). Immunostaining confirmed that PRAP1 and MTTP are partially co-localized at the ER (using calnexin as a marker) in the intestinal epithelium (data not shown). This result prompted us to examine whether PRAP1 could modulate the lipid transfer activity of MTTP. The data of FIGS. 2B and 2C indicated that IEC from PRAP1$^{-/-}$ mice manifested significantly reduced TG and phospholipids transfer activity compared to cells from control mice (compare first and second bars in FIGS. 2B and 2C), albeit MTTP protein levels in intestinal cells from both genotypes were quite similar (FIG. 2D). Interestingly, recombinant PRAP1 (rPRAP1) lacking the N-terminal signal peptide (i.e., PRAP1Δ N20, henceforth referred to as WT rPRAP1) could rescue both TG and phospholipids transfer activity of MTTP in PRAP1$^{-/-}$ IEC, where maximal activity could reach to a level that was very similar to that observed using control IEC lysates (FIGS. 2B and 2C). By using such assay, the Glu residue at position 85 was identified to be very important for PRAP1 to promote the lipid transfer function of MTTP, as mutation of such residue to Val (E85V) in PRAP1Δ N20 markedly attenuated MTTP's activity to transfer both TG (FIGS. 2E and 2G) and phospholipid (FIGS. 2F and 2H) in vitro.

Next, HeLa cells which express endogenous PDI were used to examine the impact of PRAP1 on MTTP-mediated assembly and secretion of apoB48-lipoprotein. The results indicated that co-expression of PRAP1 indeed enhanced MTTP-mediated secretion of apoB48 into the culture medium (data not shown). Consistent with the in vitro assay, the E85V mutant of PRAP1 manifested a weaker activity in promoting apoB48 secretion in this cell-based assay (data not shown). Further fractionation of cultured medium by density gradient ultracentrifugation revealed that in this transient expression system apoB48 was secreted into the HDL-sized fraction when PRAP1 was co-expressed with apoB48 in the same cells (data no shown).

Example 3 PRAP1 Binds to TG and Interacts with MTTP as a Ternary Complex

Figure 3A:
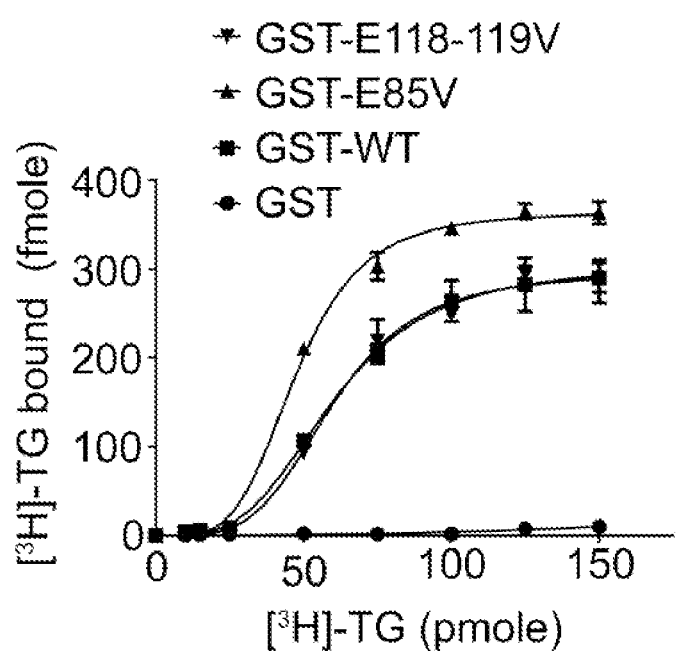
FIGS. 3A to 3E depict that PRAP1 directly bound to TG and formed a ternary complex with MTTP according to Example 3 of the present disclosure.
Figure 3B:
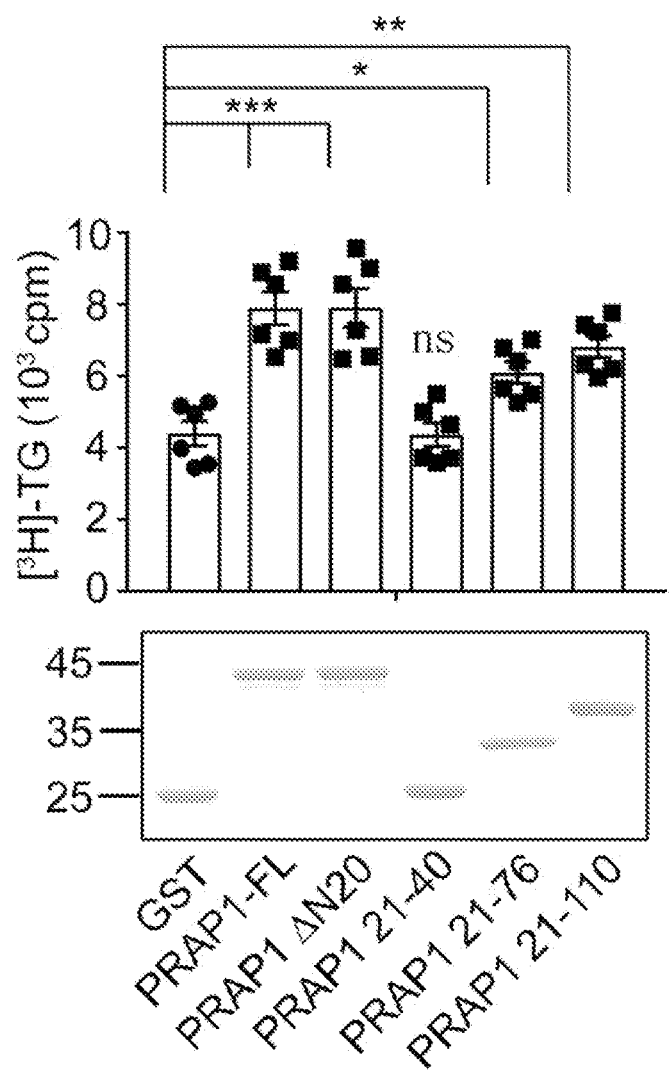

Next, the hypothesis that PRAP1 is a lipid-binding protein was tested in this example. The data of FIGS. 3A and 3B indicated that GST-PRAP1ΔN20 (labeled as GST-WT) indeed bound to $^3$H-labeled TG in a saturable manner (FIG. 3A), and the region between aa residues 40 to its C-terminal end appeared to be important for TG binding (FIG. 3B). Of note, the presence of the signal peptide in the full-length recombinant protein (labeled as PRAP1-FL) did not further increase the lipid binding activity of PRAP1Δ N20 (compare PRAP1-FL and PRAP1Δ N20 in FIG. 3B). Interestingly, whereas the PRAP1 mutant which retains wt-like activity (the E118-119V mutant) in promoting MTTP-mediated lipid transfer manifested a similar lipid binding property as the WT protein, the E85V mutant manifested a distinct property where its binding capacity to TG was markedly increased compared to the WT or the E118-119V mutant (FIG. 3A).

Figure 3C:
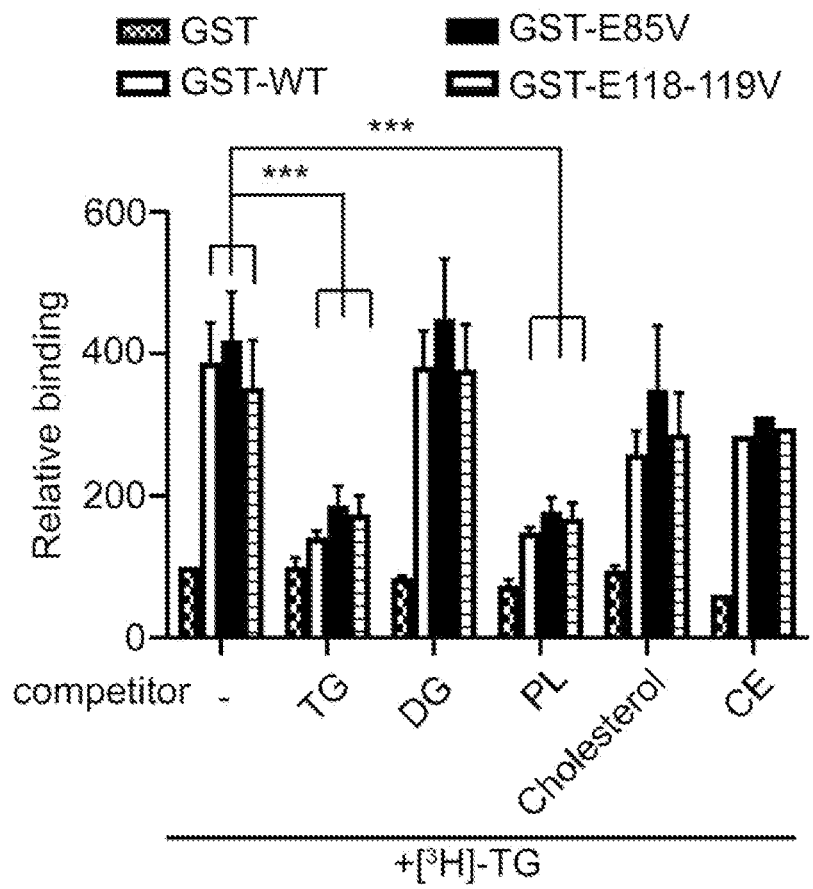

Further competition experiments using excess unlabeled lipids revealed that phopholipids (PL) could significantly compete with TG for binding to PRAP1 (FIG. 3C), suggesting that the binding sites of these two lipids to PRAP1 significantly overlap with each other. Of note, no significant or marginal competition could be observed for diacylgycerides (DG), cholesterol or cholesteryl oleate (CE) in this assay (FIG. 3C).

Figure 3D:
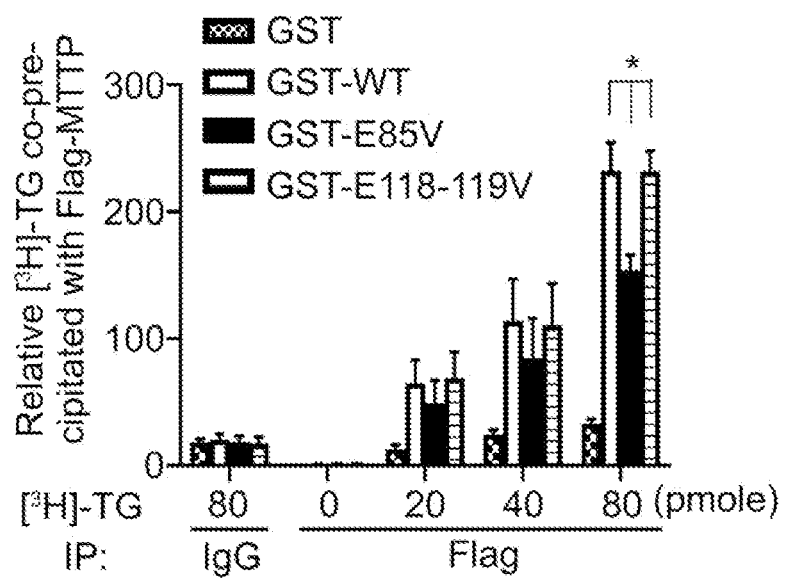
Figure 3E:
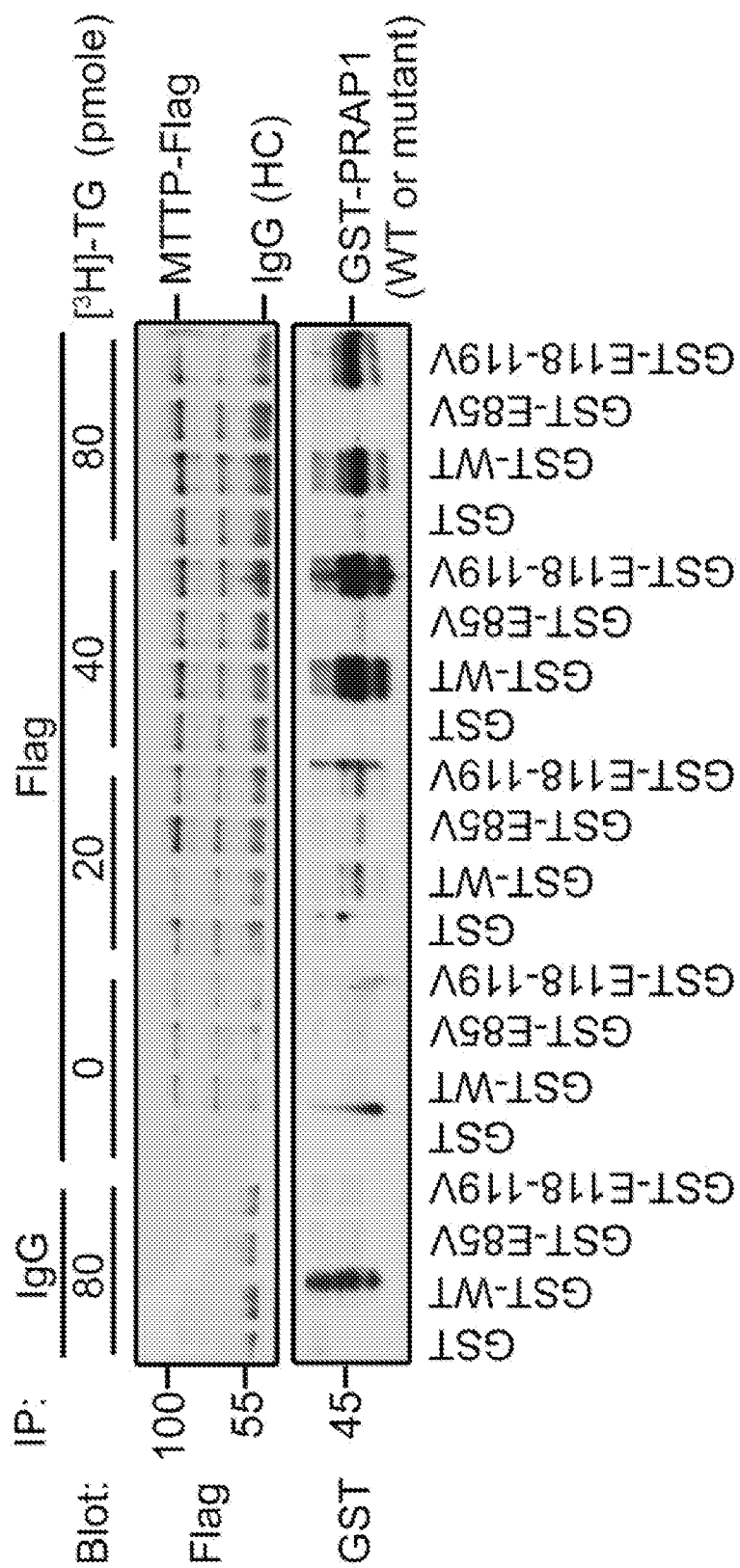

The E85V mutant binds to TG with a higher capacity than the WT control (compared to the GST-E85V and GST-WT depicted in FIG. 3A), but it fails to promote the lipid transfer activity of MTTP (FIGS. 2E to 2H). These results suggested a possibility that MTTP may recognize PRAP1-bound TG as a cargo and then transfer TG to the lipid acceptor like apoB, and that the E85V-bound lipids are not as accessible to MTTP as the WT protein-bound lipids. If such model is correct, one would expect to detect a ternary complex containing MTTP and the lipid-loaded PRAP1, but the E85V mutation would significantly impair the formation of such ternary complex. To test this hypothesis, Flag-tagged MTTP immunoprecipitated from HeLa cells was allowed to bind to recombinant WT (GST-WT) or the E85V mutant of PRAP1 (GST-E85V) preloaded without or with increasing doses of $^3$H-labeled TG. The E118-119V mutant of PRAP1, which behaved like WT protein in various assays mentioned above, was included in this assay. The data of FIG. 3D indicated that significantly more $^3$H-labeled TG was co-precipitated with Flag-tagged MTTP in a binding reaction containing GST-WT or GST-E118-119V than in a reaction containing GST-E85V. Moreover, significantly more GST-WT or GST-E118-119V was co-precipitated with Flag-tagged MTTP than GST-E85V in the presence (40-80 pmoles of $^3$H-TG under the assay conditions) but not in the absence of lipids (FIG. 3E). Consistent with this result, MTTP antibody could co-immunoprecipitate endogenous WT but not the E85V mutant of PRAP1 in IEC lysates (FIG. 2A).

Together, these results support a model that PRAP1 interacts with TG, which renders TG to be more accessible to MTTP during its lipid transfer reaction.

Figure 4A:
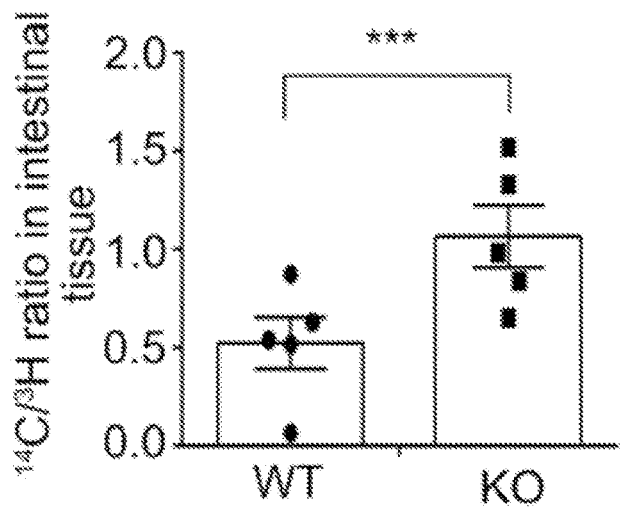
FIGS. 4A to 4F depict that PRAP1 facilitated lipid absorption and apoB lipoprotein assembly and secretion in mice according to Example 4 of the present disclosure.
Figure 4B:
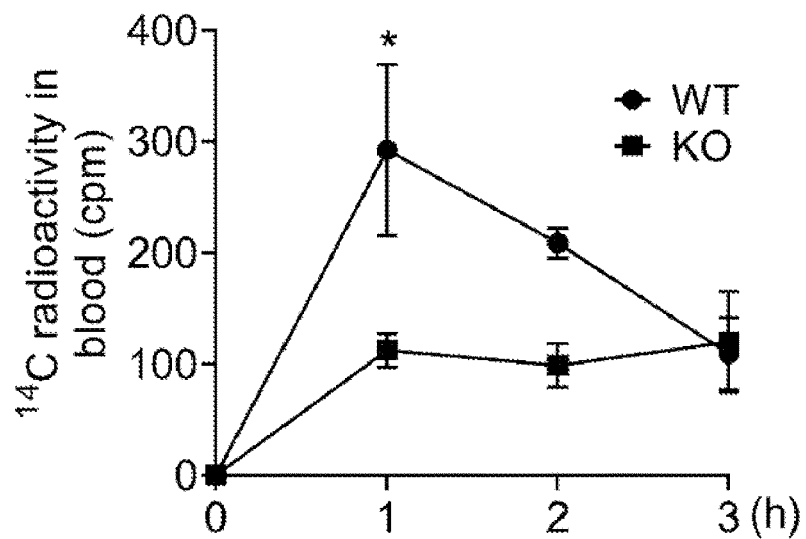
Figure 4C:
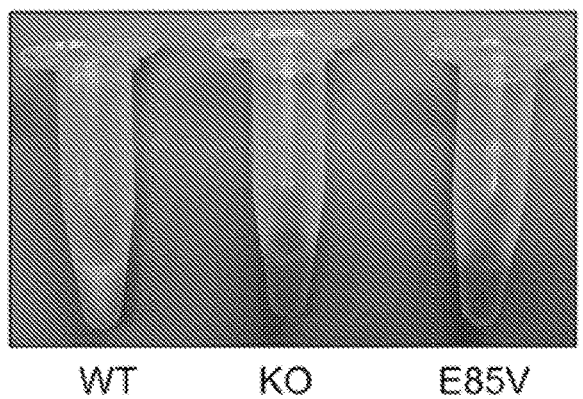

Example 4 PRAP1 Facilitates Lipid Absorption and apoB-Lipoprotein Assembly and Secretion in Mice Whether PRAP1 is involved in lipid absorption in mice was examined in this example. The data of FIGS. 4A and 4B demonstrated that, two hours following oral administration of a bolus of lipid, significantly more lipid was detected in the small intestinal tissue of the PRAP1$^{-/-}$ mice compared to that in the control mice (FIG. 4A), whereas the level of [$^{14}$C]-Triolein-derived radioactivity detectable in the bloodstream was much less in PRAP1$^{-/-}$ mice than in the control mice (FIG. 4B). Consistent with this result, the plasma collected from PRAP1$^{-/-}$ mice 4-hour post-lipid administration was not as creamy-white as that from control mice (FIG. 4C), suggesting that PRAP1 deficiency decreases lipid absorption.

Figure 4D:
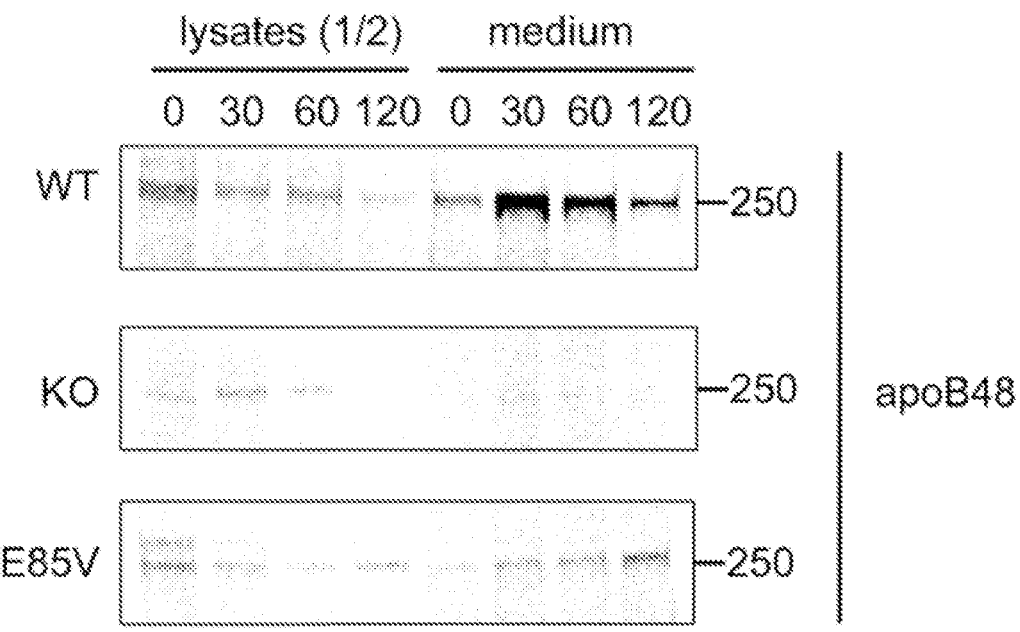
Figure 4E:
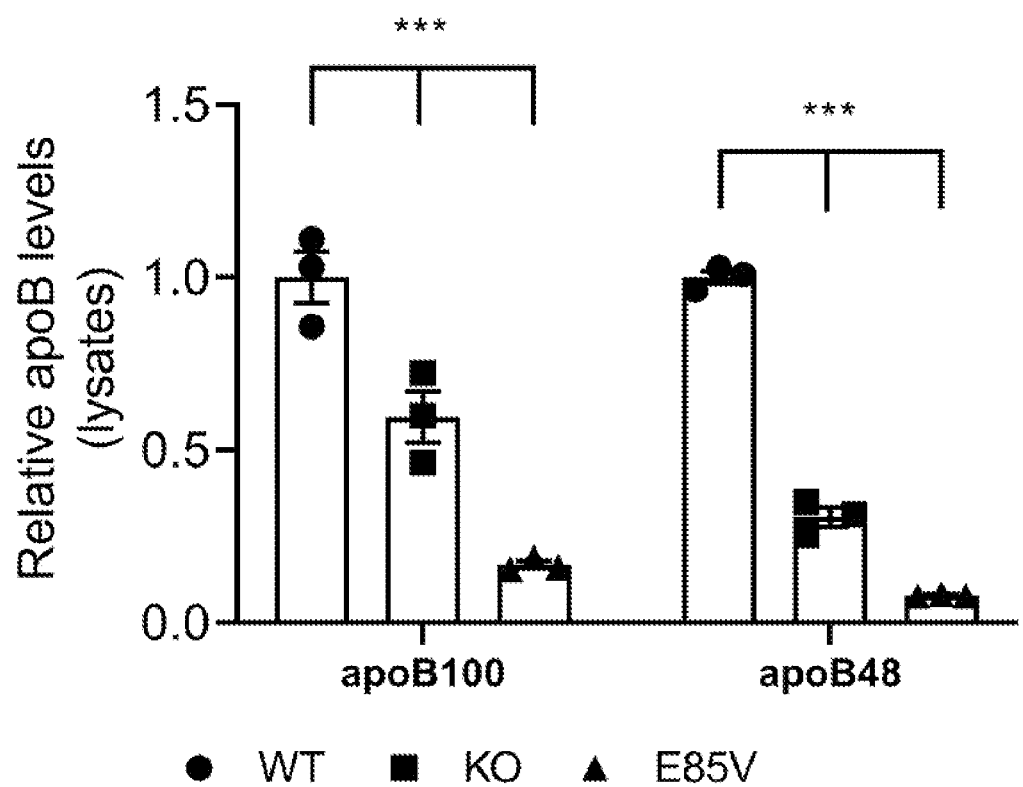
Figure 4F:
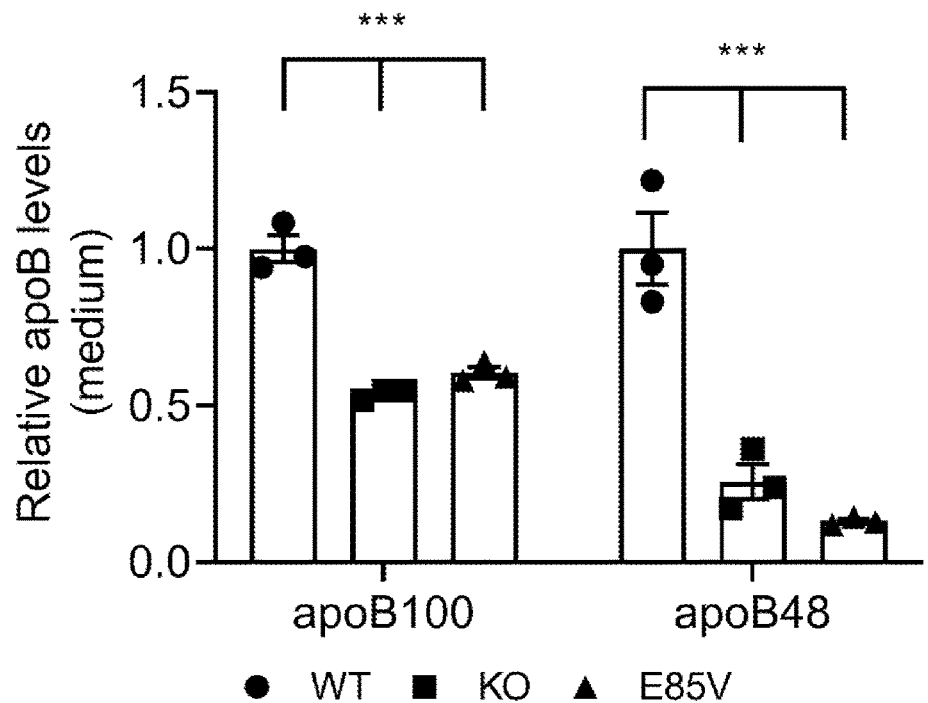

Next, since MTTP is essential for the biosynthesis of apoB-containing lipoproteins, whether PRAP1 would affect apoB-lipoprotein assembly and secretion from two major apoB-producing cell types was examined. Pulse chase and radiolabeling experiments revealed that the synthesis and secretion of newly synthesized apoB48 was significantly reduced from primary IEC purified from PRAP1$^{-/-}$ or the E85V mutant mice compared to that from the control mice (FIG. 4D), albeit PRAP1 deficiency or the E85V mutation did not significantly affect apoB mRNA expression (data not shown). Similar results were observed in experiments using primary hepatocytes where significantly less apoB48 and apoB100 were synthesized and secreted from both PRAP1$^{-/-}$ and the E85V mutant hepatocytes compared to control cells (FIGS. 4E and 4F).

Figure 5A:
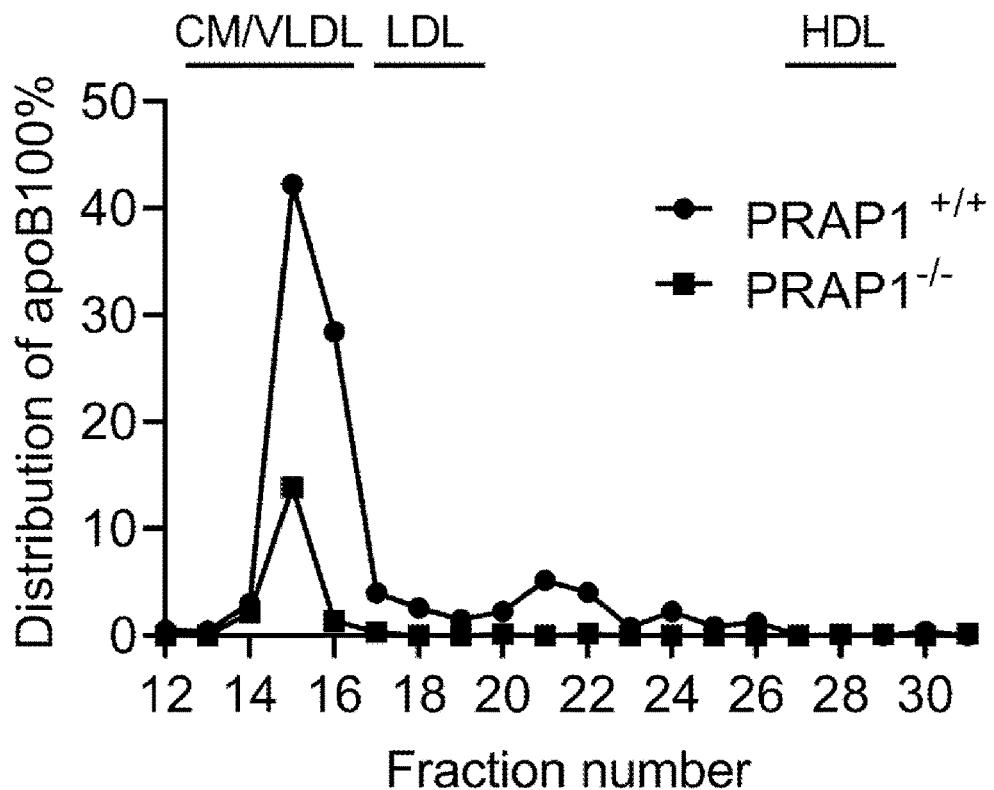
FIGS. 5A to 5C depict that PRAP1 deficiency reduced apoB-lipoprotein assembly and secretion into the chylomicron/very low-density lipoprotein (CM/VLDL)-rich fractions according to Example 4 of the present disclosure. Control (PRAP1$^{+/+}$) or PRAP1$^{-/-}$ mice were fasted for 16 hours before tyloxapol injection and receiving an oral lipid bolus. Four hours later, the plasma pooled from three mice of the same genotype was fractionated by fast protein liquid chromatography (FPLC), followed by immunoblotting analysis of each fraction.
Figure 5B:
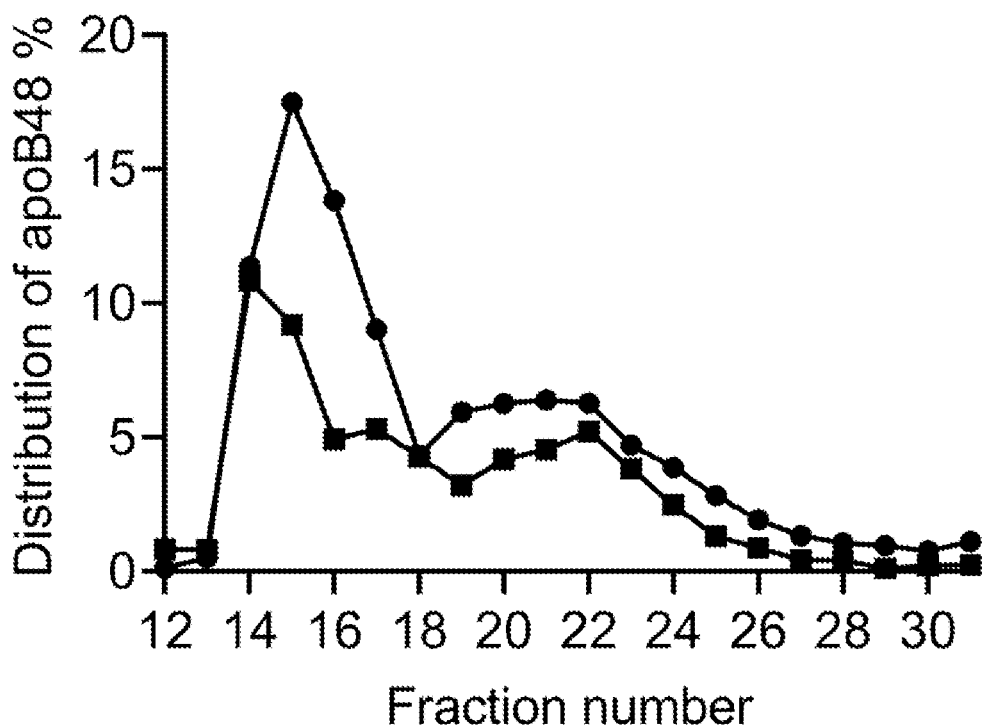
Figure 5C:
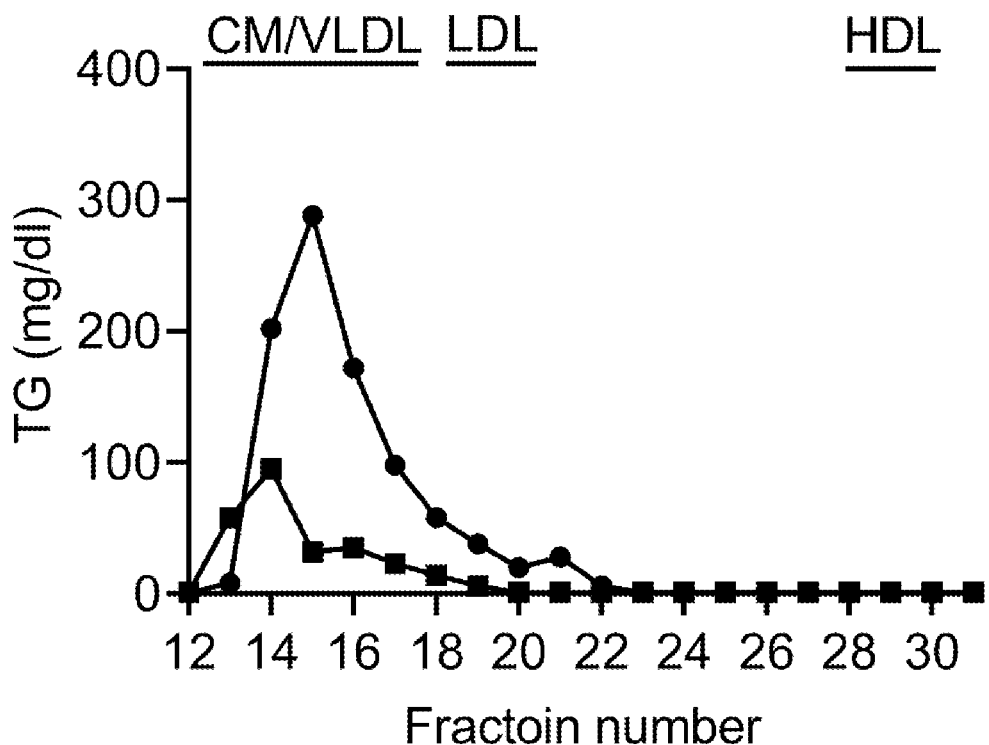
Figure 6A:
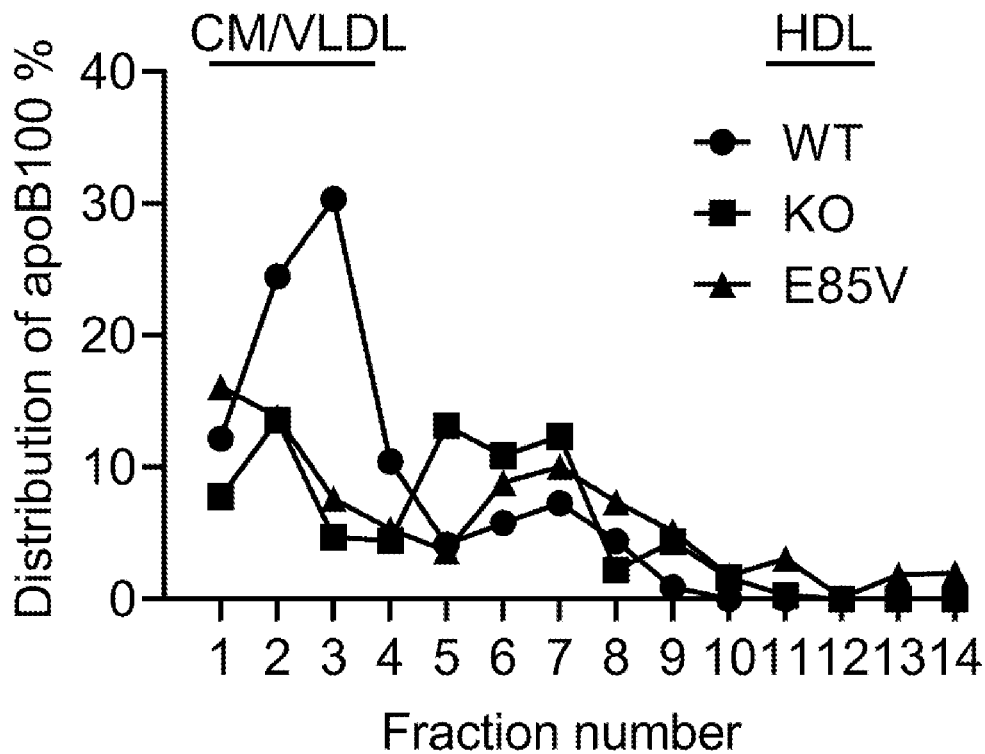
FIGS. 6A to 6D depict that the E85V mutation reduced apoB-lipoprotein assembly and secretion into the CM/VLDL-rich fractions according to Example 4 of the present disclosure. Mice with the indicated genotypes were fasted for 16 hours before tyloxapol injection and receiving an oral lipid bolus containing 10 μCi of [$^3$H]-triolein. Three hours later, plasma pooled from 3 mice of the same genotypes was fractioned by density gradient ultracentrifugation, followed by analysis of the apoB100 and apoB 48 by immunoblotting.
Figure 6B:
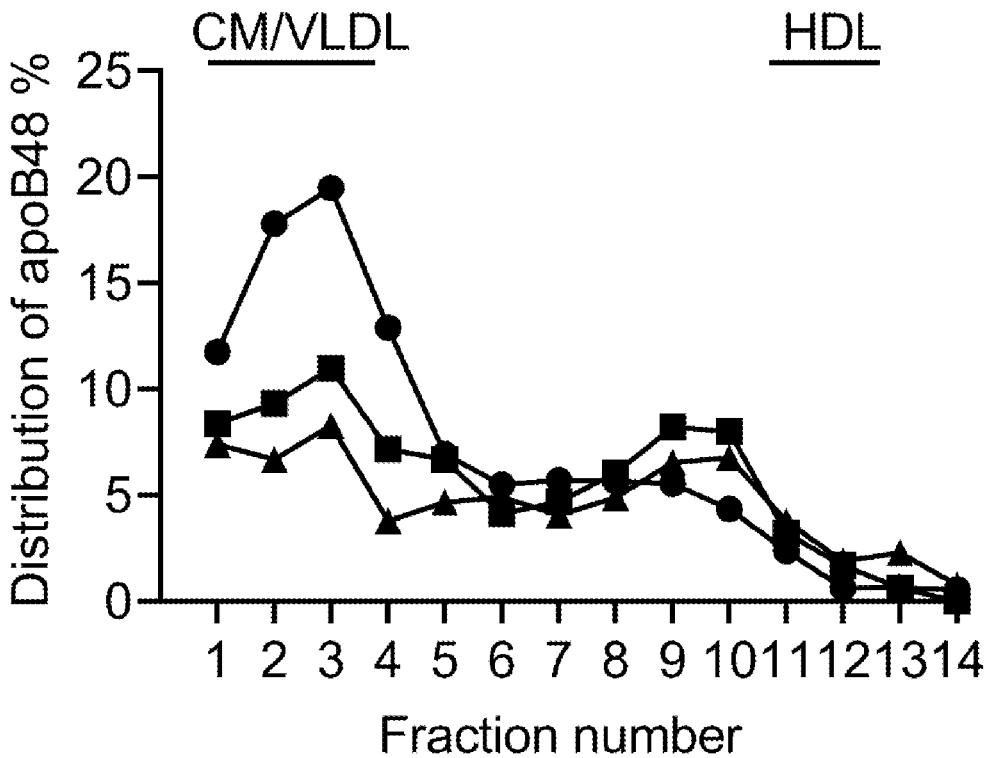
Figure 6C:
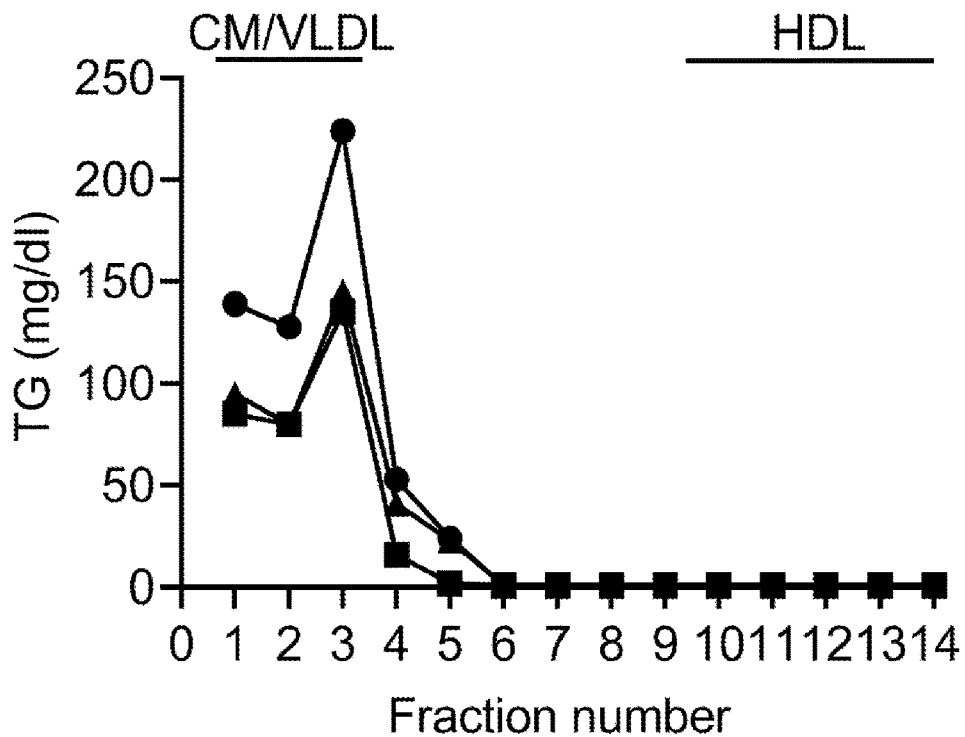
Figure 6D:
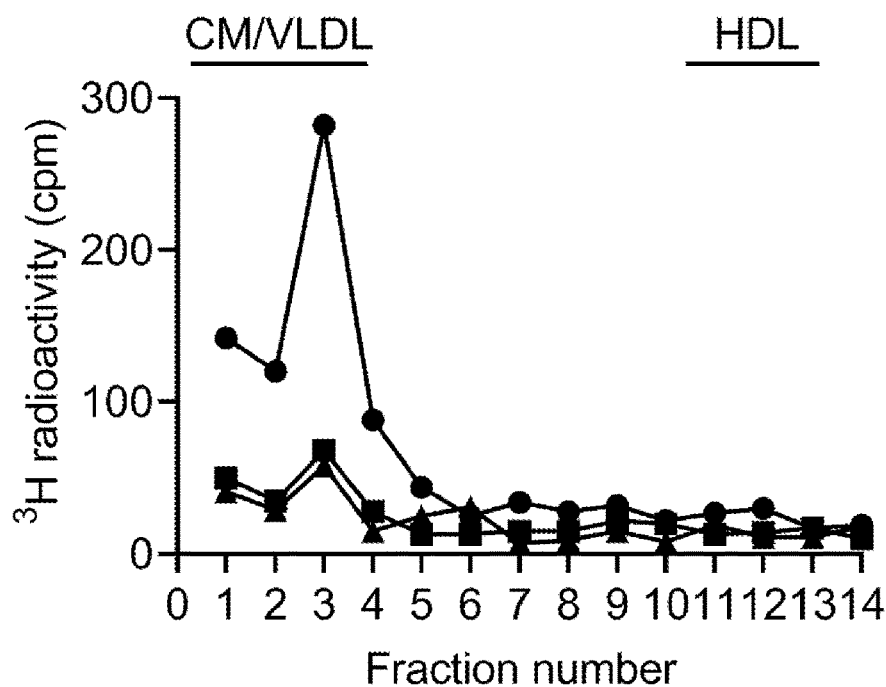

Next, the amount and lipidation of apoB in plasma of mice was examined, in which the mice had been fasted for 16 hours before they were intravenously injected with tyloxapol (a lipoprotein lipase inhibitor) and received an intragastric bolus of lipid emulsion containing Intralipid and corn oil. Fractionation of plasma from 4-hour post-lipid-administered mice using FPLC revealed that significantly less apoB48 and apoB100 and TG were distributed to the CM/VLDL-rich fraction of PRAP1$^{-/-}$ plasma (fraction numbers 14-16 in FIGS. 5A to 5C), compared to the same fraction from control mouse plasma (FIGS. 5A to 5C). Further fractionation of plasma from 16 hour-fasted mice by density gradient ultracentrifugation revealed that PRAP1 deficiency slightly reduced apoB lipidation and secretion into hepatic VLDL (data not shown), suggesting that very low level of PRAP1 in the liver still exerts some effects on MTTP-mediated apoB lipoprotein assembly and secretion. Additional similar fractionation experiments using plasma from 3-hour post-lipid-administered mice showed that the E85V mutant mice manifested very similar phenotype as the PRAP1$^{-/-}$ mice, i.e., significantly less apoB48 and apoB100 and TG were distributed into the CM/VLDL-rich fractions (fraction numbers 1-3) of PRAP1$^{-/-}$ and E85V mutant plasma compared to those of control plasma (FIGS. 6A to 6D).

Of note, in the experiment shown in FIGS. 5 and 6, PRAP1 was readily detectable in the plasma of 3-4 hour post lipid-administered mice. A basal level could be detected at 0 hour time point (after 4 hour fast) if more plasma was analyzed for the immunoblotting analysis (data not shown). Interestingly, although the E85V mutant protein could be readily detected in the intestinal epithelium by immunohistochemical analysis (data not shown), it was less secreted into bloodstream or with a slower secretion kinetics compared to WT protein (data not shown).

These data demonstrated that PRAP1 deficiency decreased lipid absorption, and accordingly, compared with control mice, lower levels of apoB48, apoB100 and TG were detected in the plasma of PRAP1$^{-/-}$ mice and E85V mutant mice.

Figure 7A:
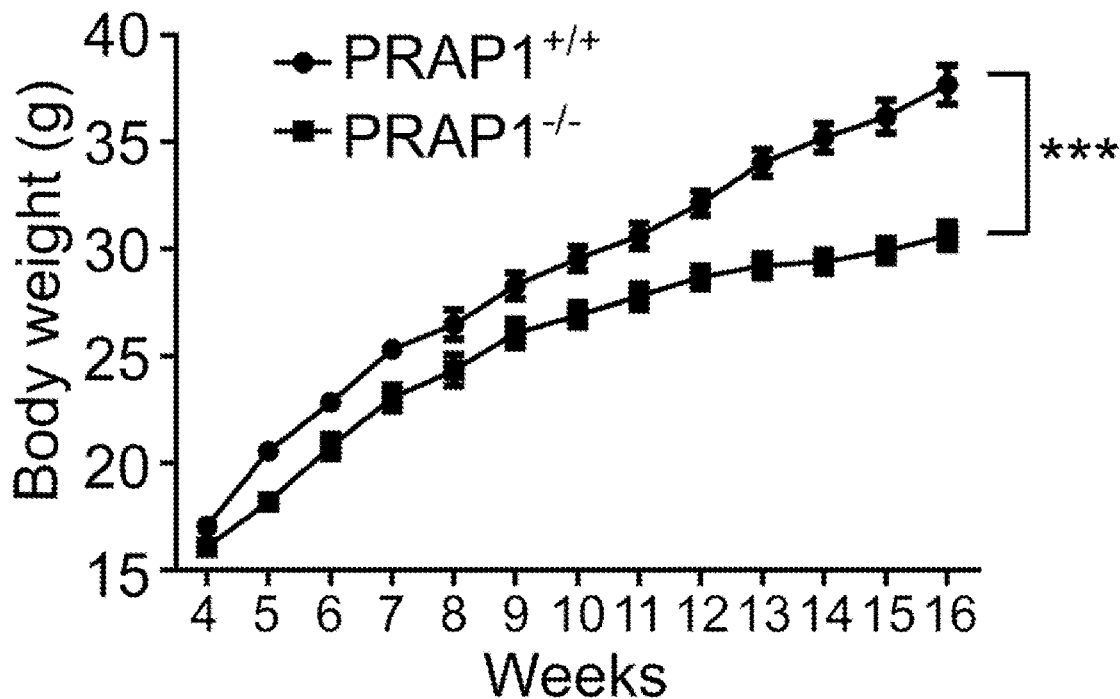
FIGS. 7A to 7F depict that PRAP1 deficient mice gained less body weight and fat mass on a high fat diet (HFD) according to Example 5 of the present disclosure.
Figure 7B:
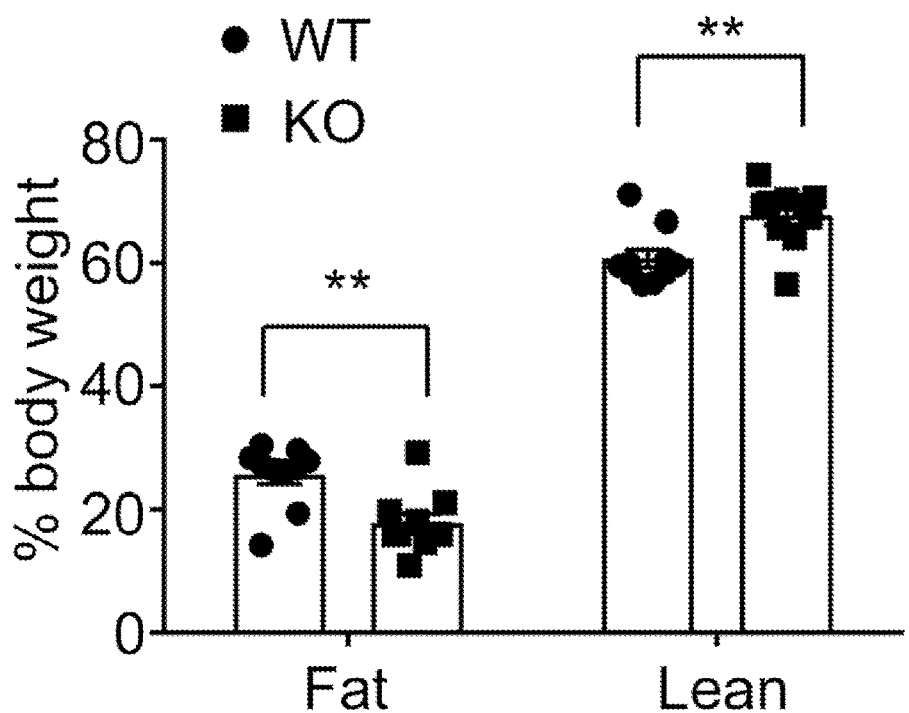
Figure 7C:
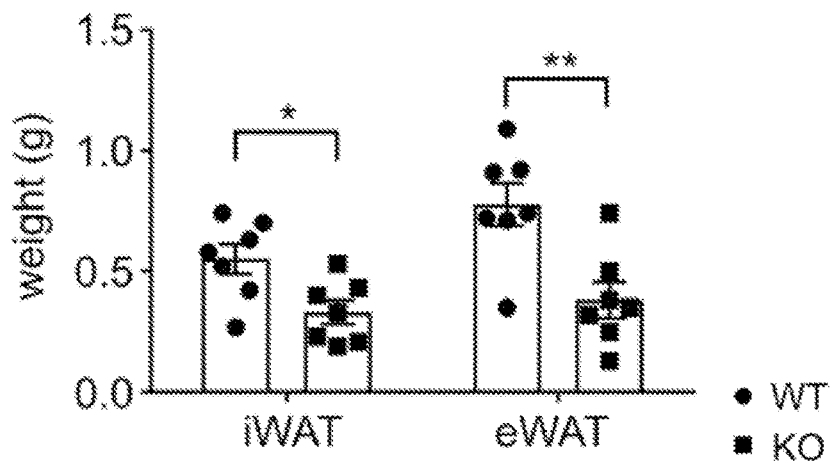
Figure 7D:
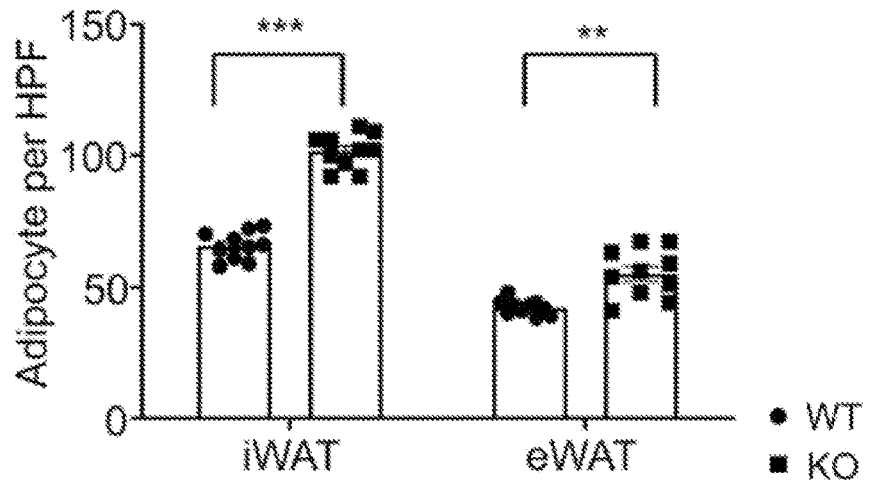
Figure 7E:
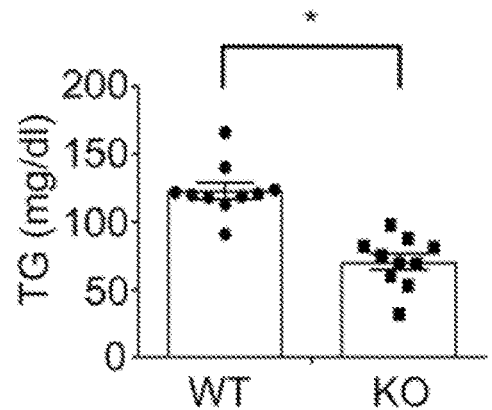
Figure 7F:
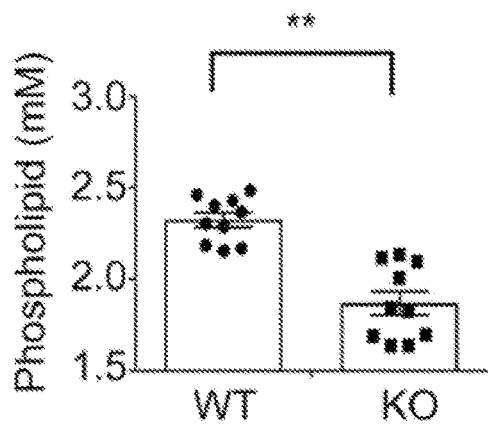

Example 5 Both PRAP1$^{-/-}$ and the E85V Mutant Mice Gain Less Body Weight and Fat Mass and are Prevented from Hepatosteatosis on High Fat Diets Although on chow diet the body weight increase of control and knockout mice were quite similar (data not shown), on high fat diet (HFD) (58Y1-60% energy from fat, Test Diet; the ingredients were summarized in Table 3) PRAP1$^{-/-}$ mice gained significantly less body weight compared to control mice (FIG. 7A). TD-NMR analysis confirmed that after 12 weeks on a HFD, the fat mass percentage of the knockout mice was significantly reduced compared to that of the control mice (FIG. 7B). Consistent with this result, both adipose tissues examined (iWAT, eWAT) were significantly smaller in size in PRAP1$^{-/-}$ mice compared to that in the corresponding tissue in the control mice (FIG. 7C), and PRAP1$^{-/-}$ adipocytes were significantly smaller than the control cells (FIG. 7D). Last, after 12 weeks on a HFD, a significant decrease in the steady state (with ad libitum access to food and water) plasma level of TG and phospholipids was observed in PRAP1$^{-/-}$ mice (FIGS. 7E and 7F), albeit total cholesterol (TCHO) or free fatty acid (FFA) levels in the plasma from both groups of mice appeared to be very similar (data not shown).

TABLE 3

Ingredients of HFD

| Ingredient | % weight/volume |
| --- | --- |
| lard | 31.66 |
| casein—vitamin tested | 25.85 |
| maltodextrin | 16.15 |
| sucrose | 8.85 |
| powdered cellulose | 6.46 |
| soybean oil | 3.23 |
| potassium citrate, tribasic monohydrate | 2.13 |
| calcium phosphate | 1.68 |
| dio mineral mix | 1.29 |
| AIN-76A vitamin mix* | 1.29 |
| calcium carbonate | 0.71 |
| l-cystine | 0.39 |
| choline bitartrate | 0.26 |

*AIN-76A vitamin mix included 0.6 gm of tiamine hydrochloride, 0.6 gm of riboflavin, 0.7 gm of pyridoxine hydrochloride, 3.0 gm of nicotinic acid, 1.6 gm of D-calcium pantothenate, 0.2 gm of folic acid, 0.02 gm of D-biotin, 0.001 gm of vitamin B12, 1.6 gm of vitamin A, 20.0 gm of DL-a-tocopherol acetate, 0.25 gm of cholecalciferol. 0.05 gm of menaquinone, and 971.38 gm of sucrose.

Figure 8A:
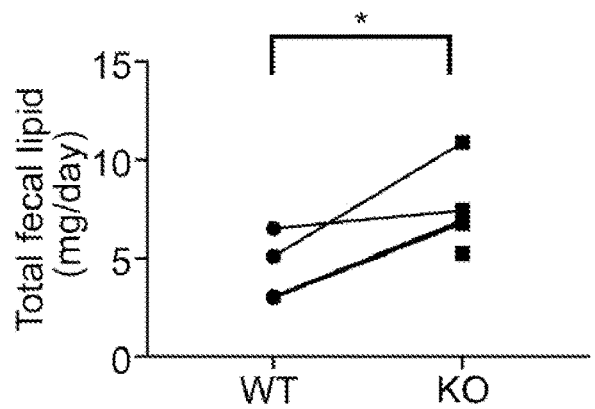
FIGS. 8A to 8C depict that PRAP1$^{-/-}$ mice had increased fecal lipid content and absorbed less calories from the diet according to Example 5 of the present disclosure.
Figure 8B:
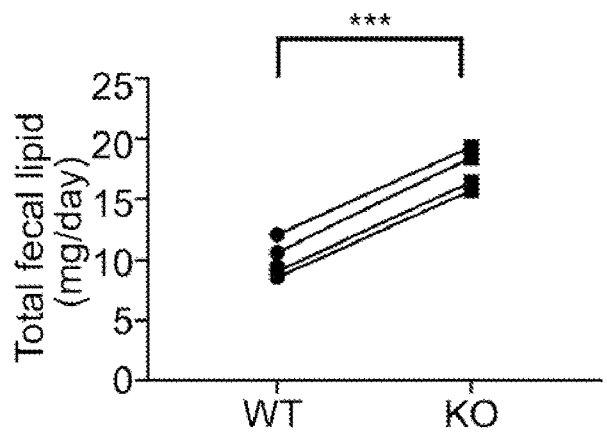
Figure 8C:
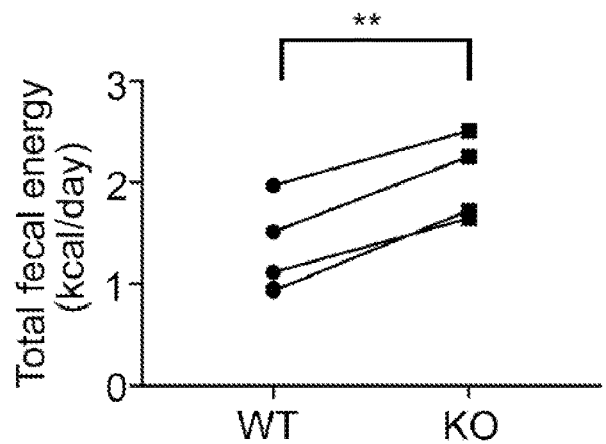

Given that both the control and PRAP1$^{-/-}$ mice had very similar food intake on a HFD (data not shown), their energy expenditure and fecal lipid content were then compared. Both groups of mice manifested very similar energy expenditure as revealed by the Comprehensive Laboratory Animal Monitoring System (CLAMS) (data not shown). However, the feces of PRAP1$^{-/-}$ mice contained more lipids than the feces of control mice (FIGS. 8A and 8B; FIG. 8A: mice fed with a chow diet; FIG. 8B: mice fed with a HFD). Bomb calorimetry also revealed that more calories were retained in PRAP1$^{-/-}$ feces than in control feces (FIG. 8C), suggesting that the leaner phenotype of PRAP1$^{-/-}$ mice on a HFD was mainly due to a defect in lipid absorption.

Figure 9A:
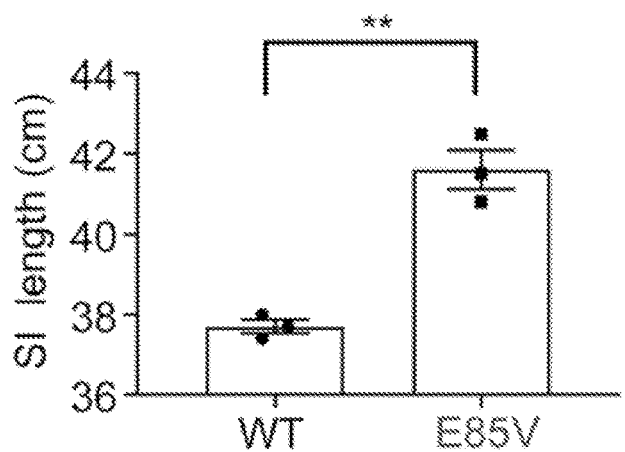
FIGS. 9A to 9D depict that the E85V mutant mice grained less body weight and fat mass on HFD according to Example 5 of the present disclosure.
Figure 9B:
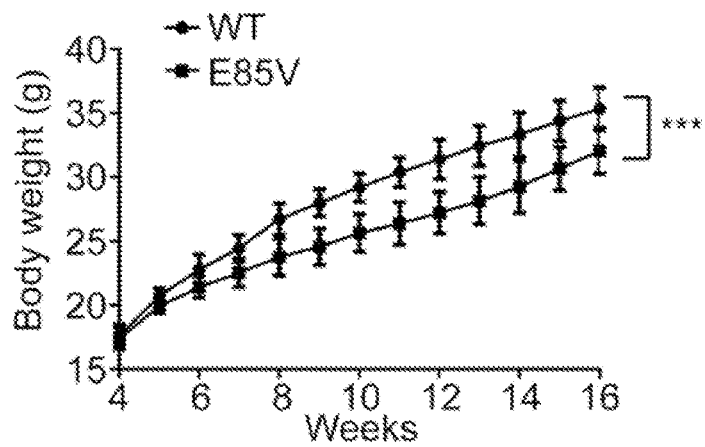
Figure 9C:
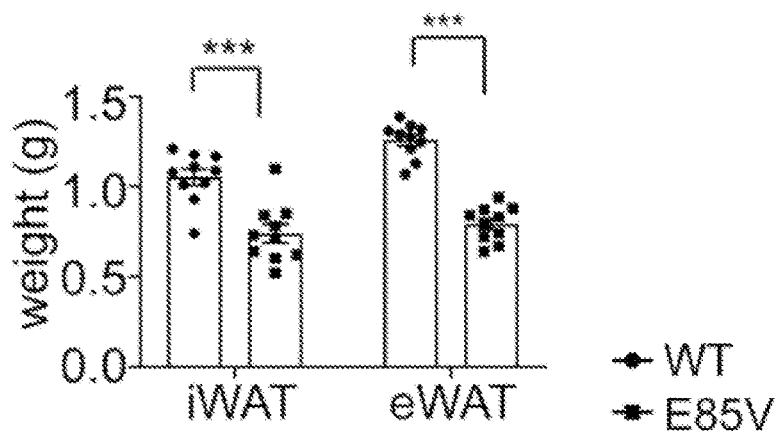
Figure 9D:
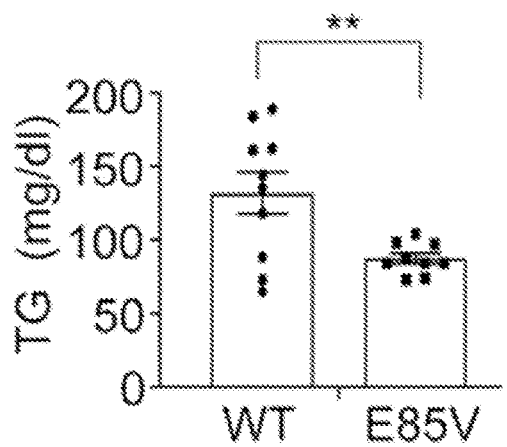

Interestingly, the E85V mutant mice manifested very similar phenotypes as the knockout mice in many aspects. For examples, the small intestine of the E85V mutant mice was consistently longer than that of littermate controls (FIG. 9A, fed on a chow diet). More lipids were accumulated in the small intestinal tissues of the E85V mutants compared to control mice after oral gavage of lipids (data not shown). In addition, on HFD for 12 weeks, compared to control mice, the E85V mutant mice gained significantly less body weight (FIG. 9B) and manifested smaller adipose tissues (iWAT and eWAT) (FIG. 9C) and lower plasma TG levels (FIG. 9D).

Figure 10A:
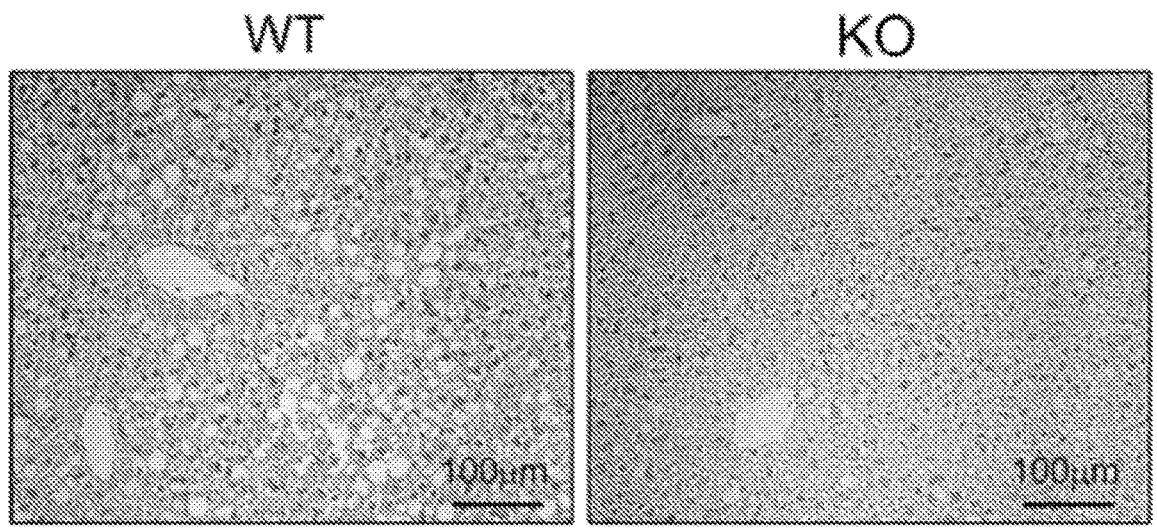
FIGS. 10A to 10E depict that PRAP1 deficiency or the E85V mutation diminished HFD-induced hepatosteatosis according to Example 5 of the present disclosure.
Figure 10B:
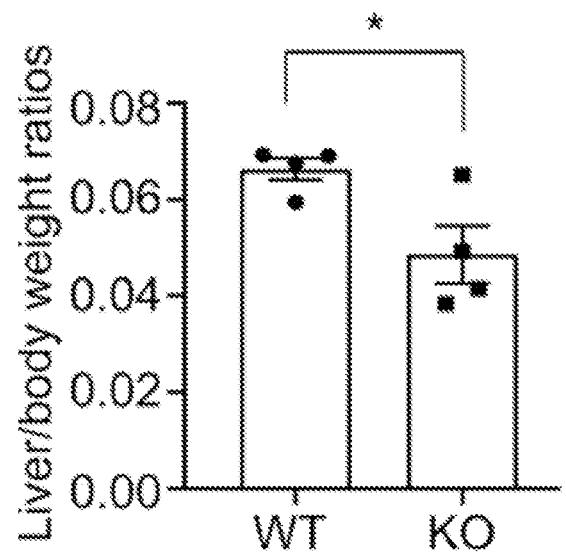
Figure 10C:
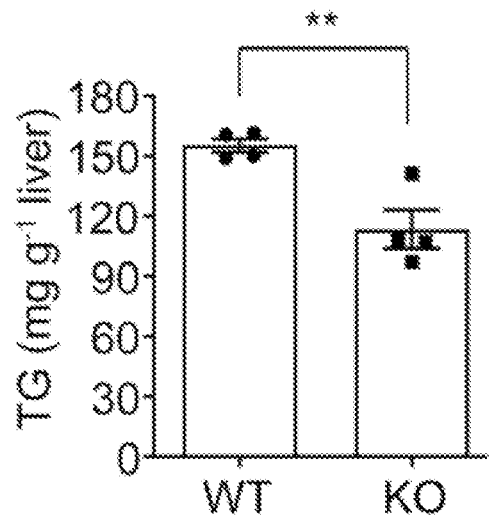
Figure 10D:
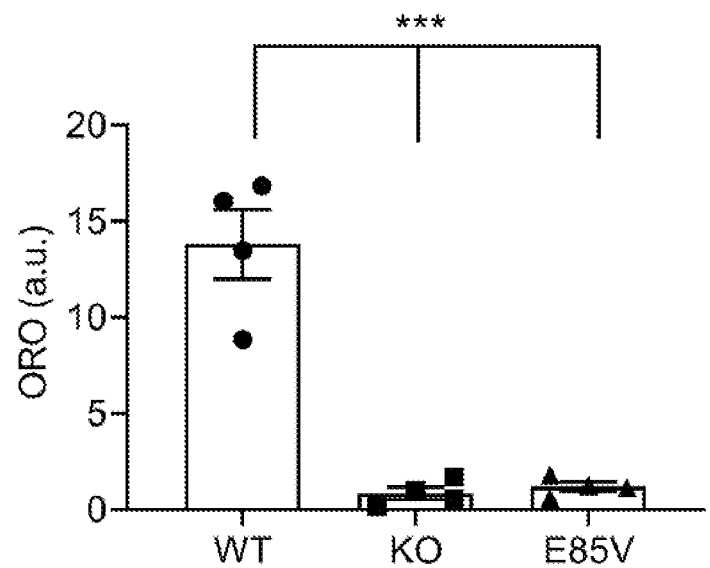
Figure 10E:
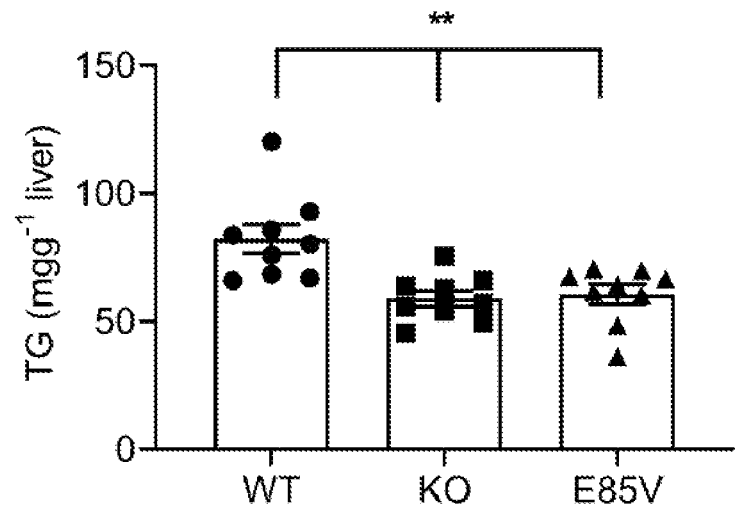

Last, the impact of PRAP1 deficiency or the E85V mutation on HFD-induced lipid accumulation in the liver (hepatosteatosis) was examined. For this experiment, mice were fed a HFD for 12 (FIGS. 10A to 10C) or 8 weeks (FIGS. 10D and 10E) before their livers were processed and analyzed for morphology and lipid contents. The results indicated that the lipid droplets (stained by Oil red O, FIG. 10D), hepatocytes with vacuolation (by H &E staining, FIG. 10A), ratio of liver to body weight (FIG. 10B) and hepatic TG contents (FIGS. 10C and 10E) were all significantly reduced in PRAP1$^{-/-}$ and the E85V mutant livers compared to controls, suggesting that PRAP1 deficiency or the E85V mutation diminishes HFD-induced hepatosteatosis.

Example 6 Effect of Recombinant E85V Polypeptide (rE85V) on Reducing Lipid Absorption Given that the E85V mutant mice manifested similar phenotype as the PRAP1 knockout mice in terms of lipid absorption, whether the administration of rE85V would affect body weight gain and lipid excretion of mice fed a HFD was examined in this example.

Figure 11A:
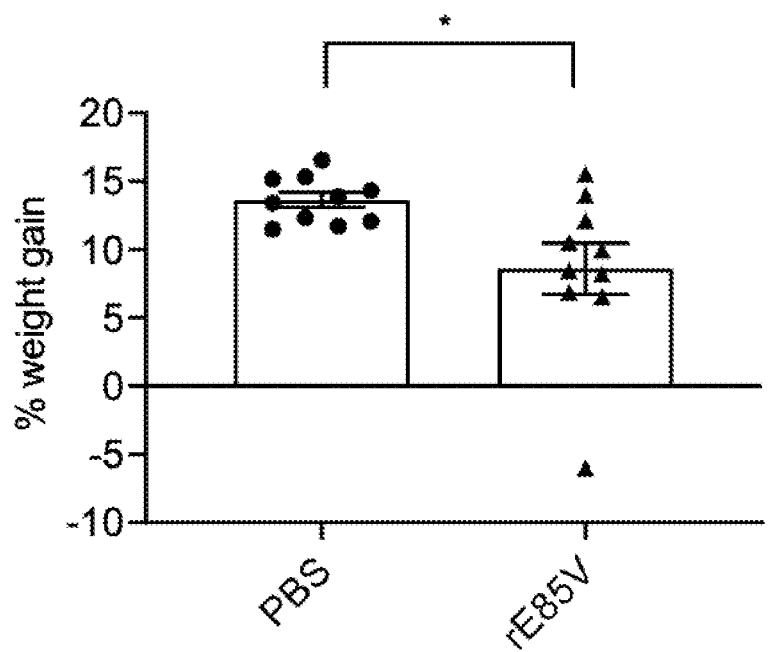
FIGS. 11A and 11B are histograms respectively depicting the body weight gain (% increase compared to initial body weight.
Figure 11B:
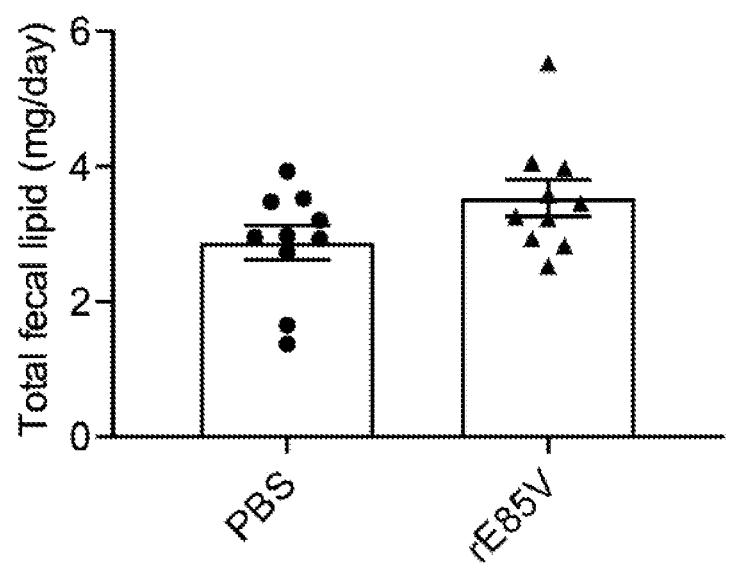

The data of FIGS. 11A and 11B indicated that, on a HFD, the mice orally administered of rE85V (10 mg/Kg/day) gained significantly less body weight, and tended to have increased lipid excretion in feces, compared with mice fed with vehicle (PBS) only. These results demonstrated that the administration of rE85V polypeptide significantly decreased lipid absorption, and accordingly, providing a potential means to treat hyperlipidemia or hyperlipidemia-related diseases.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A method of treating hyperlipidemia or a hyperlipidemia-related disease in a subject, comprising administering to the subject an effective amount a modified PRAP1 polypeptide, wherein the modified PRAP1 polypeptide comprises an amino acid modification as compared to a wild-type PRAP1 polypeptide, and the amino acid modification is,
 a substitution of glutamic acid with valine at the amino acid position 85 (E85V) of a wild-type PRAP1 polypeptide of SEQ ID NO: 7.

2. The method of claim 1, wherein the hyperlipidemia-related disease is hepatosteatosis, atherosclerosis, cardiovascular disease, pancreatitis, or chylomicronemia syndrome.

3. A pharmaceutical composition comprising a modified PRAP1 polypeptide and a pharmaceutically acceptable excipient, wherein the modified PRAP1 polypeptide comprises an amino acid modification as compared to a wild-type PRAP1 polypeptide, and the amino acid modification is,
 a substitution of glutamic acid with valine at the amino acid position 85 (E85V) of a wild-type PRAP1 polypeptide of SEQ ID NO: 7.

* * * * *

```
SEQUENCE LISTING

<160> NUMBER OF SEQ ID NOS: 20

<210> SEQ ID NO 1
<211> LENGTH: 152
<212> TYPE: PRT
<213> ORGANISM: Artificial Sequence
<220> FEATURE:
<223> OTHER INFORMATION: synthesized_WT PRAP1_isoform CRA a

<400> SEQUENCE: 1

Met Lys Arg Phe Leu Leu Ala Thr Cys Leu Val Ala Ala Leu Leu Trp
1               5                   10                  15

Glu Ala Gly Ala Ala Pro Ala His Gln Val Pro Val Lys Thr Lys Gly
            20                  25                  30

Lys His Val Phe Pro Glu Gln Glu Thr Glu Lys Val Gly Arg Val Trp
        35                  40                  45

Asp Thr Arg Ala Leu Glu Pro Leu Glu Lys Asp Asn Gln Leu Gly Pro
```

```
              50                  55                  60
Leu Leu Pro Glu Pro Lys Gln Lys Pro Ala Ala Glu Glu Lys Arg
 65                  70                  75                  80

Pro Asp Ala Met Thr Trp Val Glu Thr Glu Asp Ile Leu Ser His Leu
                 85                  90                  95

Arg Ser Pro Leu Gln Gly Pro Glu Leu Asp Leu Asp Ser Ile Asp His
                100                 105                 110

Pro Met Ser Asp Asp Val Gln Asp Glu Glu Val Pro Gln Ser Arg Pro
            115                 120                 125

Ile Leu Tyr Arg Gln Val Leu Gln Gly Pro Glu Glu Asp Leu Asp His
        130                 135                 140

Leu Ala His Ser Met Glu Asp Ser
145                 150

<210> SEQ ID NO 2
<211> LENGTH: 152
<212> TYPE: PRT
<213> ORGANISM: Artificial Sequence
<220> FEATURE:
<223> OTHER INFORMATION: synthesized_Mouse E88V mutant PRAP1

<400> SEQUENCE: 2

Met Lys Arg Phe Leu Leu Ala Thr Cys Leu Val Ala Ala Leu Leu Trp
 1               5                  10                  15

Glu Ala Gly Ala Ala Pro Ala His Gln Val Pro Val Lys Thr Lys Gly
                 20                  25                  30

Lys His Val Phe Pro Glu Gln Glu Thr Glu Lys Val Gly Arg Val Trp
             35                  40                  45

Asp Thr Arg Ala Leu Glu Pro Leu Glu Lys Asp Asn Gln Leu Gly Pro
 50                  55                  60

Leu Leu Pro Glu Pro Lys Gln Lys Pro Ala Ala Glu Glu Lys Arg
 65                  70                  75                  80

Pro Asp Ala Met Thr Trp Val Val Thr Glu Asp Ile Leu Ser His Leu
                 85                  90                  95

Arg Ser Pro Leu Gln Gly Pro Glu Leu Asp Leu Asp Ser Ile Asp His
                100                 105                 110

Pro Met Ser Asp Asp Val Gln Asp Glu Glu Val Pro Gln Ser Arg Pro
            115                 120                 125

Ile Leu Tyr Arg Gln Val Leu Gln Gly Pro Glu Glu Asp Leu Asp His
        130                 135                 140

Leu Ala His Ser Met Glu Asp Ser
145                 150

<210> SEQ ID NO 3
<211> LENGTH: 149
<212> TYPE: PRT
<213> ORGANISM: Artificial Sequence
<220> FEATURE:
<223> OTHER INFORMATION: synthesized_WT PRAP1_isoform CRA b

<400> SEQUENCE: 3

Met Lys Arg Phe Leu Leu Ala Thr Cys Leu Val Ala Ala Leu Leu Trp
 1               5                  10                  15

Glu Ala Gly Ala Ala Pro Ala His Gln Val Pro Val Lys Thr Lys Gly
                 20                  25                  30

Lys His Val Phe Pro Glu Gln Glu Thr Glu Lys Val Trp Asp Thr Arg
             35                  40                  45
```

```
Ala Leu Glu Pro Leu Glu Lys Asp Asn Gln Leu Gly Pro Leu Leu Pro
    50                  55                  60

Glu Pro Lys Gln Lys Pro Ala Ala Glu Glu Lys Arg Pro Asp Ala
65                  70                  75                  80

Met Thr Trp Val Glu Thr Glu Asp Ile Leu Ser His Leu Arg Ser Pro
                85                  90                  95

Leu Gln Gly Pro Glu Leu Asp Leu Asp Ser Ile Asp His Pro Met Ser
                100                 105                 110

Asp Asp Val Gln Asp Glu Glu Val Pro Gln Ser Arg Pro Ile Leu Tyr
                115                 120                 125

Arg Gln Val Leu Gln Gly Pro Glu Gly Asp Leu Asp His Leu Ala His
    130                 135                 140

Ser Met Glu Asp Ser
145
```

<210> SEQ ID NO 4
<211> LENGTH: 149
<212> TYPE: PRT
<213> ORGANISM: Artificial Sequence
<220> FEATURE:
<223> OTHER INFORMATION: synthesized_Mouse E85V mutant PRAP1

<400> SEQUENCE: 4

```
Met Lys Arg Phe Leu Leu Ala Thr Cys Leu Val Ala Ala Leu Leu Trp
1               5                   10                  15

Glu Ala Gly Ala Ala Pro Ala His Gln Val Pro Val Lys Thr Lys Gly
                20                  25                  30

Lys His Val Phe Pro Glu Gln Glu Thr Glu Lys Val Trp Asp Thr Arg
            35                  40                  45

Ala Leu Glu Pro Leu Glu Lys Asp Asn Gln Leu Gly Pro Leu Leu Pro
    50                  55                  60

Glu Pro Lys Gln Lys Pro Ala Ala Glu Glu Lys Arg Pro Asp Ala
65                  70                  75                  80

Met Thr Trp Val Val Thr Glu Asp Ile Leu Ser His Leu Arg Ser Pro
                85                  90                  95

Leu Gln Gly Pro Glu Leu Asp Leu Asp Ser Ile Asp His Pro Met Ser
                100                 105                 110

Asp Asp Val Gln Asp Glu Glu Val Pro Gln Ser Arg Pro Ile Leu Tyr
                115                 120                 125

Arg Gln Val Leu Gln Gly Pro Glu Gly Asp Leu Asp His Leu Ala His
    130                 135                 140

Ser Met Glu Asp Ser
145
```

<210> SEQ ID NO 5
<211> LENGTH: 151
<212> TYPE: PRT
<213> ORGANISM: Artificial Sequence
<220> FEATURE:
<223> OTHER INFORMATION: synthesized_WT PRAP1_variant 1

<400> SEQUENCE: 5

```
Met Arg Arg Leu Leu Leu Val Thr Ser Leu Val Val Leu Leu Trp
1               5                   10                  15

Glu Ala Gly Ala Val Pro Ala Pro Lys Val Pro Ile Lys Met Gln Val
                20                  25                  30

Lys His Trp Pro Ser Glu Gln Asp Pro Glu Lys Ala Trp Gly Ala Arg
            35                  40                  45
```

Val Val Glu Pro Pro Glu Lys Asp Asp Gln Leu Val Val Leu Phe Pro
            50                  55                  60

Val Gln Lys Pro Lys Leu Leu Thr Thr Glu Glu Lys Pro Arg Gly Gln
 65                  70                  75                  80

Gly Arg Gly Pro Ile Leu Pro Gly Thr Lys Ala Trp Met Glu Thr Glu
                 85                  90                  95

Asp Thr Leu Gly His Val Leu Ser Pro Glu Pro Asp His Asp Ser Leu
                100                 105                 110

Tyr His Pro Pro Pro Glu Glu Asp Gln Gly Glu Glu Arg Pro Arg Leu
                115                 120                 125

Trp Val Met Pro Asn His Gln Val Leu Leu Gly Pro Glu Glu Asp Gln
            130                 135                 140

Asp His Ile Tyr His Pro Gln
145                 150

<210> SEQ ID NO 6
<211> LENGTH: 151
<212> TYPE: PRT
<213> ORGANISM: Artificial Sequence
<220> FEATURE:
<223> OTHER INFORMATION: synthesized_Human E94V mutant PRAP1

<400> SEQUENCE: 6

Met Arg Arg Leu Leu Leu Val Thr Ser Leu Val Val Leu Leu Trp
 1               5                  10                  15

Glu Ala Gly Ala Val Pro Ala Pro Lys Val Pro Ile Lys Met Gln Val
                 20                  25                  30

Lys His Trp Pro Ser Glu Gln Asp Pro Glu Lys Ala Trp Gly Ala Arg
            35                  40                  45

Val Val Glu Pro Pro Glu Lys Asp Asp Gln Leu Val Val Leu Phe Pro
            50                  55                  60

Val Gln Lys Pro Lys Leu Leu Thr Thr Glu Glu Lys Pro Arg Gly Gln
 65                  70                  75                  80

Gly Arg Gly Pro Ile Leu Pro Gly Thr Lys Ala Trp Met Val Thr Glu
                 85                  90                  95

Asp Thr Leu Gly His Val Leu Ser Pro Glu Pro Asp His Asp Ser Leu
                100                 105                 110

Tyr His Pro Pro Pro Glu Glu Asp Gln Gly Glu Glu Arg Pro Arg Leu
                115                 120                 125

Trp Val Met Pro Asn His Gln Val Leu Leu Gly Pro Glu Glu Asp Gln
            130                 135                 140

Asp His Ile Tyr His Pro Gln
145                 150

<210> SEQ ID NO 7
<211> LENGTH: 142
<212> TYPE: PRT
<213> ORGANISM: Artificial Sequence
<220> FEATURE:
<223> OTHER INFORMATION: synthesized_WT PRAP1_variant 2

<400> SEQUENCE: 7

Met Arg Arg Leu Leu Leu Val Thr Ser Leu Val Val Leu Leu Trp
 1               5                  10                  15

Glu Ala Gly Ala Val Pro Ala Pro Lys Val Pro Ile Lys Met Gln Val
                 20                  25                  30

Lys His Trp Pro Ser Glu Gln Asp Pro Glu Lys Ala Trp Gly Ala Arg

```
                35                  40                  45
Val Val Glu Pro Pro Glu Lys Asp Asp Gln Leu Val Val Leu Phe Pro
 50                  55                  60

Val Gln Lys Pro Lys Leu Leu Thr Thr Glu Glu Lys Pro Arg Gly Thr
 65                  70                  75                  80

Lys Ala Trp Met Glu Thr Glu Asp Thr Leu Gly His Val Leu Ser Pro
                 85                  90                  95

Glu Pro Asp His Asp Ser Leu Tyr His Pro Pro Glu Glu Asp Gln
                100                 105                 110

Gly Glu Glu Arg Pro Arg Leu Trp Val Met Pro Asn His Gln Val Leu
                115                 120                 125

Leu Gly Pro Glu Glu Asp Gln Asp His Ile Tyr His Pro Gln
                130                 135                 140

<210> SEQ ID NO 8
<211> LENGTH: 142
<212> TYPE: PRT
<213> ORGANISM: Artificial Sequence
<220> FEATURE:
<223> OTHER INFORMATION: synthesized_Human E85V mutant PRAP1

<400> SEQUENCE: 8

Met Arg Arg Leu Leu Leu Val Thr Ser Leu Val Val Leu Leu Trp
 1               5                  10                  15

Glu Ala Gly Ala Val Pro Ala Pro Lys Val Pro Ile Lys Met Gln Val
                 20                  25                  30

Lys His Trp Pro Ser Glu Gln Asp Pro Glu Lys Ala Trp Gly Ala Arg
                 35                  40                  45

Val Val Glu Pro Pro Glu Lys Asp Asp Gln Leu Val Val Leu Phe Pro
 50                  55                  60

Val Gln Lys Pro Lys Leu Leu Thr Thr Glu Glu Lys Pro Arg Gly Thr
 65                  70                  75                  80

Lys Ala Trp Met Val Thr Glu Asp Thr Leu Gly His Val Leu Ser Pro
                 85                  90                  95

Glu Pro Asp His Asp Ser Leu Tyr His Pro Pro Glu Glu Asp Gln
                100                 105                 110

Gly Glu Glu Arg Pro Arg Leu Trp Val Met Pro Asn His Gln Val Leu
                115                 120                 125

Leu Gly Pro Glu Glu Asp Gln Asp His Ile Tyr His Pro Gln
                130                 135                 140

<210> SEQ ID NO 9
<211> LENGTH: 9
<212> TYPE: PRT
<213> ORGANISM: Artificial Sequence
<220> FEATURE:
<223> OTHER INFORMATION: synthesized_difference sequence between
      variants 1 and 2

<400> SEQUENCE: 9

Gln Gly Arg Gly Pro Ile Leu Pro Gly
 1               5

<210> SEQ ID NO 10
<211> LENGTH: 23
<212> TYPE: DNA
<213> ORGANISM: Artificial Sequence
<220> FEATURE:
<223> OTHER INFORMATION: synthesized_p1 primer
```

```
<400> SEQUENCE: 10
tccagcacac caggtatgca agg                                          23

<210> SEQ ID NO 11
<211> LENGTH: 23
<212> TYPE: DNA
<213> ORGANISM: Artificial Sequence
<220> FEATURE:
<223> OTHER INFORMATION: synthesized_p3 primer

<400> SEQUENCE: 11
agggtcctca agggcaaggg agt                                          23

<210> SEQ ID NO 12
<211> LENGTH: 22
<212> TYPE: DNA
<213> ORGANISM: Artificial Sequence
<220> FEATURE:
<223> OTHER INFORMATION: synthesized_p2 primer

<400> SEQUENCE: 12
tcgatagctt ggctgcaggt cg                                           22

<210> SEQ ID NO 13
<211> LENGTH: 129
<212> TYPE: DNA
<213> ORGANISM: Artificial Sequence
<220> FEATURE:
<223> OTHER INFORMATION: synthesized_mutant DNA oligo

<400> SEQUENCE: 13
gtgggaagga tcttgtgagg gaggctatat ctacgtctcc ttctccacag atgccatgac    60
atgggtagtg actgaggata tcctgagcca tcttcgcagt cctcttcagg gtccagaact   120
ggatcttga                                                          129

<210> SEQ ID NO 14
<211> LENGTH: 20
<212> TYPE: DNA
<213> ORGANISM: Artificial Sequence
<220> FEATURE:
<223> OTHER INFORMATION: synthesized_sgRNA

<400> SEQUENCE: 14
gatatcctca gtctccaccc                                              20

<210> SEQ ID NO 15
<211> LENGTH: 20
<212> TYPE: DNA
<213> ORGANISM: Artificial Sequence
<220> FEATURE:
<223> OTHER INFORMATION: synthesized_PRAP1-I3-F

<400> SEQUENCE: 15
tacctactcc cttgcccttg                                              20

<210> SEQ ID NO 16
<211> LENGTH: 20
<212> TYPE: DNA
<213> ORGANISM: Artificial Sequence
<220> FEATURE:
<223> OTHER INFORMATION: synthesized_PRAP1-reverse

<400> SEQUENCE: 16
cagtctccac ccaggtcatg                                              20
```

<210> SEQ ID NO 17
<211> LENGTH: 20
<212> TYPE: DNA
<213> ORGANISM: Artificial Sequence
<220> FEATURE:
<223> OTHER INFORMATION: synthesized_E85V-reverse

<400> SEQUENCE: 17
cagtcactac ccatgtcatg					20

<210> SEQ ID NO 18
<211> LENGTH: 6636
<212> TYPE: DNA
<213> ORGANISM: Artificial Sequence
<220> FEATURE:
<223> OTHER INFORMATION: synthesized_LacZ-Neo cassette

<400> SEQUENCE: 18

```
gtcgacctgc agccaagcta tcgaattccg cccctctccc tccccccccc ctaacgttac      60
tggccgaagc cgcttggaat aaggccggtg agcgtttgtc tatatgttat tttccaccat     120
attgccgtct tttggcaatg tgagggcccg aaacctggcc ctgtcttctt gacgacgatt     180
cctagggctc tttcccctct cgccaaagga atgcaaggtc tgttgaatgt cgtgaaggaa     240
gcagttcctc tggaagcttc ttgaagacaa caacgtctgt agcgacccct tgcaggcagc     300
ggaaccccc  acctggcgac atggatagtt gtggaaagag tcaaatggct ctcctcaagc     360
gtattcaaca agggggctgaa ggatgcccag aaggtacccc attgtatggg atctgatctg     420
gggcctcggt gcacatgctt tacatgtgtt tagtcgaggt taaaaaacgt ctaggccccc     480
cgaaccacgg ggacgtggtt ttggtttgaa aaacacgatg ataatatggc cacaaccatg     540
gaacagggg  atgagcttac catggccaag atccctccta agaagaagcg caaagtcgag     600
gatcccgtcg ttttacaacg tcgtgactgg gaaaaccctg gcgttaccca acttaatcgc     660
cttgcagcac atccccccttt cgccagctgg cgtaatagcg aagaggcccg caccgatcgc     720
ccttcccaac agttgcgcag cctgaatggc gaatggcgct ttgcctggtt tccggcacca     780
gaagcggtgc cggaaagctg gctggagtgc gatcttcctg aggccgatac tgtcgtcgtc     840
ccctcaaact ggcagatgca cggttacgat gcgcccatct acaccaacgt aacctatccc     900
attacggtca atccgccgtt tgttcccacg gagaatccga cgggttgtta ctcgctcaca     960
tttaatgttg atgaaagctg gctacaggaa ggccagacgc gaattatttt tgatggcgtt    1020
aactcggcgt ttcatctgtg gtgcaacggg cgctgggtcg ttacggcca  ggacagtcgt    1080
ttgccgtctg aatttgacct gagcgcattt ttacgcgccg gagaaaaccg cctcgcggtg    1140
atggtgctgc gttggagtga cggcagttat ctggaagatc aggatatgtg gcggatgagc    1200
ggcattttcc gtgacgtctc gttgctgcat aaaccgacta cacaaatcag cgatttccat    1260
gttgccactc gctttaatga tgatttcagc cgcgctgtac tggaggctga agttcagatg    1320
tgcggcgagt tgcgtgacta cctacgggta acagtttctt tatggcaggg tgaaacgcag    1380
gtcgccagcg gcaccgcgcc tttcggcggt gaaattatcg atgagcgtgg tggttatgcc    1440
gatcgcgtca cactacgtct gaacgtcgaa acccgaaac  tgtggagcgc cgaaatcccg    1500
aatctctatc gtgcggtggt tgaactgcac accgccgacg gcacgctgat tgaagcagaa    1560
gcctgcgatg tcggtttccg cgaggtgcgg attgaaaatg gtctgctgct gctgaacggc    1620
aagccgttgc tgattcgagg cgttaaccgt cacgagcatc atcctctgca tggtcaggtc    1680
```

```
atggatgagc agacgatggt gcaggatatc ctgctgatga agcagaacaa ctttaacgcc   1740
gtgcgctgtt cgcattatcc gaaccatccg ctgtggtaca cgctgtgcga ccgctacggc   1800
ctgtatgtgg tggatgaagc caatattgaa acccacggca tggtgccaat gaatcgtctg   1860
accgatgatc cgcgctggct accggcgatg agcgaacgcg taacgcgaat ggtgcagcgc   1920
gatcgtaatc acccgagtgt gatcatctgg tcgctgggga atgaatcagg ccacggcgct   1980
aatcacgacg cgctgtatcg ctggatcaaa tctgtcgatc cttcccgccc ggtgcagtat   2040
gaaggcggcg gagccgacac cacggccacc gatattattt gcccgatgta cgcgcgcgtg   2100
gatgaagacc agcccttccc ggctgtgccg aaatggtcca tcaaaaaatg cctttcgcta   2160
cctggagaga cgcgcccgct gatcctttgc gaatacgccc acgcgatggg taacagtctt   2220
ggcggtttcg ctaaatactg gcaggcgttt cgtcagtatc cccgtttaca gggcggcttc   2280
gtctgggact gggtggatca gtcgctgatt aaatatgatg aaaacggcaa cccgtggtcg   2340
gcttacggcg gtgattttgg cgatacgccc aacgatcgcc agttctgtat gaacggtctg   2400
gtctttgccg accgcacgcc gcatccagcg ctgacgaaag caaaacacca gcagcagttt   2460
ttccagttcc gtttatccgg caaaccatc gaagtgacca gcgaatacct gttccgtcat   2520
agcgataacg agctcctgca ctggatggtg gcgctgatg taagccgct ggcaagcggt   2580 gaagtgcctc tggatgtcgc tccacaaggt aaacagttga ttgaactgcc tgaactaccg   2640
cagccggaga gcgccgggca actctggctc acagtacgcg tagtgcaacc gaacgcgacc   2700
gcatggtcag aagccgggca catcagcgcc tggcagcagt ggcgtctggc ggaaaacctc   2760
agtgtgacgc tccccgccgc gtcccacgcc atcccgcatc tgaccaccag cgaaatggat   2820
ttttgcatcg agctgggtaa taagcgttgg caatttaacc gccagtcagg cttcttcca   2880 cagatgtgga ttggcgataa aaacaactg ctgacgccgc tgcgcgatca gttcacccgt   2940
gcaccgctgg ataacgacat tggcgtaagt gaagcgaccc gcattgaccc taacgcctgg   3000
gtcgaacgct ggaaggcggc gggccattac caggccgaag cagcgttgtt gcagtgcacg   3060
gcagatacac ttgctgatgc ggtgctgatt acgaccgctc acgcgtggca gcatcagggg   3120
aaaaccttat ttatcagccg gaaaacctac cggattgatg gtagtggtca aatggcgatt   3180
accgttgatg ttgaagtggc gagcgataca ccgcatccgg cgcggattgg cctgaactgc   3240
cagctggcgc aggtagcaga gcgggtaaac tggctcggat tagggccgca agaaaaactat   3300 cccgaccgcc ttactgccgc ctgttttgac cgctgggatc tgccattgtc agacatgtat   3360
accccgtacg tcttcccgag cgaaaacggt ctgcgctgcg ggacgcgcga attgaattat   3420
ggcccacacc agtggcgcgg cgacttccag ttcaacatca gccgctacag tcaacagcaa   3480
ctgatggaaa ccagccatcg ccatctgctg cacgcggaag aaggcacatg gctgaatatc   3540
gacggtttcc atatggggat tggtggcgac gactcctgga gcccgtcagt atcggcggaa   3600
ttccagctga gcgccggtcg ctaccattac cagttggtct ggtgtcaaaa atattgtgaa   3660
ggaaccttac ttctgtggtg tgacataatt ggacaaacta cctacagaga tttaaagctc   3720
taaggtaaat ataaaatttt taagtgtata atgtgttaaa ctactgattc taattgtttg   3780
tgtattttag attccaacct atggaactga tgaatgggag cagtggtgga atgcctttaa   3840
tgaggaaaac ctgttttgct cagaagaaat gccatctagt gatgatgagg ctactgctga   3900
ctctcaacat tctactcctc caaaaaagaa gagaaaggta gaagacccca aggactttcc   3960
ttcagaattg ctaagttttt tgagtcatgc tgtgtttagt aatagaactc ttgcttgctt   4020
tgctatttac accacaaagg aaaaagctgc actgctatac aagaaaatta tggaaaaata   4080
```

```
ttctgtaacc tttataagta ggcataacag ttataatcat aacatactgt tttttcttac    4140
tccacacagg catagagtgt ctgctattaa taactatgct caaaaattgt gtacctttag    4200 cttttaatt tgtaaagggg ttaataagga atatttgatg tatagtgcct tgactagaga    4260
tcataatcag ccataccaca tttgtagagg ttttacttgc tttaaaaaac ctcccacacc    4320 tcccctgaa cctgaaacat aaatgaatg caattgttgt tgttaacttg tttattgcag    4380
cttataatgg ttacaaataa agcaatagca tcacaaattt cacaaataaa gcatttttt    4440 cactgcattc tagttgtggt ttgtccaaac tcatcaatgt atcttatcat gtctggatcc    4500
ccaggaagct cctctgtgtc ctcataaacc ctaacctcct ctacttgaga ggacattcca    4560
atcataggct gcccatccac cctctgtgtc ctcctgttaa ttaggtcact taacaaaaag    4620
gaaattgggt aggggttttt cacagaccgc tttctaaggg taatttaaa atatctggga    4680 agtcccttcc actgctgtgt tccagaagtg ttggtaaaca gcccacaaat gtcaacagca    4740
gaaacataca agctgtcagc tttgcacaag ggcccggtac ccatcgaatt cctgcagccc    4800
aattccgatc atattcaata acccttaata taacttcgta taatgtatgc tatacgaagt    4860
tattaggtct gaagaggagt ttacgtccag ccaagctagc ttggctgcag gtcgtcgaat    4920
tctaccgggt aggggaggcg cttttcccaa ggcagtctgg agcatgcgct ttagcagccc    4980
cgctgggcac ttggcgctac acaagtggcc tctggcctcg cacacattcc acatccaccg    5040
gtaggcgcca accggctccg ttctttggtg gccccttcgc gccaccttct actcctcccc    5100
tagtcaggaa gttcccccc gccccgcagc tcgcgtcgtg caggacgtga caaatggaag    5160
tagcacgtct cactagtctc gtgcagatgg acagcaccgc tgagcaatgg aagcgggtag    5220
gcctttgggg cagcggccaa tagcagcttt gctccttcgc tttctgggct cagaggctgg    5280
gaaggggtgg gtccggggggc gggctcaggg gcgggctcag gggcggggcg ggcgcccgaa    5340
ggtcctccgg aggcccggca ttctgcacgc ttcaaaagcg cacgtctgcc gcgctgttct    5400
cctcttcctc atctccgggc ctttcgacct gcagccaata tgggatcggc cattgaacaa    5460
gatggattgc acgcaggttc tccggccgct tgggtggaga ggctattcgg ctatgactgg    5520
gcacaacaga caatcggctg ctctgatgcc gccgtgttcc ggctgtcagc gcaggggcgc    5580
ccggttcttt tgtcaagac cgacctgtcc ggtgccctga atgaactgca ggacgaggca    5640
gcgcggctat cgtggctggc cacgacgggc gttccttgcg cagctgtgct cgacgttgtc    5700
actgaagcgg gaagggactg gctgctattg ggcgaagtgc cggggcagga tctcctgtca    5760
tctcaccttg ctcctgccga gaaagtatcc atcatggctg atgcaatgcg gcggctgcat    5820
acgcttgatc cggctacctg cccattcgac caccaagcga aacatcgcat cgagcgagca    5880
cgtactcgga tggaagccgg tcttgtcgat caggatgatc tggacgaaga gcatcagggg    5940
ctcgcgccag ccgaactgtt cgccaggctc aaggcgcgca tgcccgacgg cgatgatctc    6000
gtcgtgaccc atggcgatgc ctgcttgccg aatatcatgg tggaaaatgg ccgcttttct    6060
ggattcatcg actgtggccg ctgggtgtg gcggaccgct atcaggacat agcgttggct    6120
acccgtgata ttgctgaaga gcttggcggc gaatgggctg accgcttcct cgtgctttac    6180
ggtatcgccg ctcccgattc gcagcgcatc gccttctatc gccttcttga cgagttcttc    6240 tgagggggatc aattctctag agctcgctga tcagcctcga ctgtgccttc tagttgccag    6300
ccatctgttg tttgccctc cccgtgcct tccttgaccc tggaaggtgc cactcccact    6360 gtccttcct aataaaatga ggaaattgca tcgcattgtc tgagtaggtg tcattctatt    6420
```

```
ctggggggtg gggtggggca ggacagcaag ggggaggatt gggaagacaa tagcaggcat   6480
gctggggatg cggtgggctc tatggcttct gaggcggaaa gaaccagctg ggctcgact    6540 agagcttgcg gaacccttaa tataacttcg tataatgtat gctatacgaa gttattaggt   6600
ccctcgaggg gatccactag ttctagagcg ccggg                              6636

<210> SEQ ID NO 19
<211> LENGTH: 6689
<212> TYPE: DNA
<213> ORGANISM: Artificial Sequence
<220> FEATURE:
<223> OTHER INFORMATION: synthesized_E3-LacZ-neo-E3

<400> SEQUENCE: 19
gtccctgtca agaccaaagg gtcgacctgc agccaagcta tcgaattccg ccctctccc     60 tccccccccc ctaacgttac tggccgaagc cgcttggaat aaggccggtg agcgtttgtc   120
tatatgttat tttccaccat attgccgtct tttggcaatg tgagggcccg aaacctggcc   180
ctgtcttctt gacgacgatt cctagggggtc tttcccctct cgccaaagga atgcaaggtc  240
tgttgaatgt cgtgaaggaa gcagttcctc tggaagcttc ttgaagacaa caacgtctgt   300
agcgaccctt tgcaggcagc ggaaccccc accctggcgac atggatagtt gtggaaagag   360
tcaaatggct ctcctcaagc gtattcaaca aggggctgaa ggatgcccag aaggtacccc   420
attgtatggg atctgatctg gggcctcggt gcacatgctt tacatgtgtt tagtcgaggt   480
taaaaaacgt ctaggcccc cgaaccacgg ggacgtggtt ttggtttgaa aaacacgatg    540
ataatatggc cacaaccatg gaacaggggg atgagcttac catggccaag atccctccta   600
agaagaagcg caaagtcgag gatcccgtcg ttttacaacg tcgtgactgg gaaaaccctg   660
gcgttaccca acttaatcgc cttgcagcac atccccctt cgccagctgg cgtaatagcg    720
aagaggcccg caccgatcgc ccttcccaac agttgcgcag cctgaatggc gaatggcgct   780
ttgcctggtt tccggcacca gaagcggtgc cggaaagctg gctggagtgc gatcttcctg   840
aggccgatac tgtcgtcgtc ccctcaaact ggcagatgca cggttacgat gcgcccatct   900
acaccaacgt aacctatccc attacggtca atccgccgtt tgttcccacg gagaatccga   960
cgggttgtta ctcgctcaca tttaatgttg atgaaagctg gctacaggaa ggccagacgc  1020
gaattatttt tgatggcgtt aactcggcgt ttcatctgtg gtgcaacggg cgctgggtcg  1080
gttacggcca ggacagtcgt ttgccgtctg aatttgacct gagcgcattt ttacgcgccg  1140
gagaaaaccg cctcgcggtg atggtgctgc gttgagtga cggcagttat ctggaagatc   1200
aggatatgtg gcggatgagc ggcattttcc gtgacgtctc gttgctgcat aaaccgacta   1260
cacaaatcag cgatttccat gttgccactc gctttaatga tgatttcagc cgcgctgtac   1320
tggaggctga agttcagatg tgcggcgagt tgcgtgacta cctacgggta acagtttctt   1380
tatggcaggg tgaaacgcag gtcgccagcg gcaccgcgcc tttcggcggt gaaattatcg   1440
atgagcgtgg tggttatgcc gatcgcgtca cactacgtct gaacgtcgaa acccgaaac   1500 tgtggagcgc cgaaatcccg aatctctatc gtgcggtggt tgaactgcac accgccgacg  1560
gcacgctgat tgaagcagaa gcctgcgatg tcggtttccg cgaggtgcgg attgaaaatg   1620
gtctgctgct gctgaacggc aagccgttgc tgattcgagg cgttaaccgt cacgagcatc   1680
atcctctgca tggtcaggtc atggatgagc agacgatggt gcaggatatc ctgctgatga   1740
agcagaacaa ctttaacgcc gtgcgctgtt cgcattatcc gaaccatccg ctgtggtaca   1800
cgctgtgcga ccgctacggc ctgtatgtgg tggatgaagc caatattgaa acccacggca   1860
```

```
tggtgccaat gaatcgtctg accgatgatc cgcgctggct accggcgatg agcgaacgcg 1920
taacgcgaat ggtgcagcgc gatcgtaatc acccgagtgt gatcatctgg tcgctgggga 1980
atgaatcagg ccacggcgct aatcacgacg cgctgtatcg ctggatcaaa tctgtcgatc 2040
cttcccgccc ggtgcagtat gaaggcggcg gagccgacac cacggccacc gatattattt 2100
gcccgatgta cgcgcgcgtg gatgaagacc agcccttccc ggctgtgccg aaatggtcca 2160
tcaaaaaatg gctttcgcta cctggagaga cgcgcccgct gatcctttgc gaatacgccc 2220
acgcgatggg taacagtctt ggcggtttcg ctaaatactg gcaggcgttt cgtcagtatc 2280
cccgtttaca gggcggcttc gtctgggact gggtggatca gtcgctgatt aaatatgatg 2340
aaaacggcaa cccgtggtcg gcttacggcg gtgattttgg cgatacgccg aacgatcgcc 2400
agttctgtat gaacggtctg gtctttgccg accgcacgcc gcatccagcg ctgacggaag 2460
caaaacacca gcagcagttt ttccagttcc gtttatccgg gcaaaccatc gaagtgacca 2520
gcgaatacct gttccgtcat agcgataacg agctcctgca ctggatggtg gcgctggatg 2580
gtaagccgct ggcaagcggt gaagtgcctc tggatgtcgc tccacaaggt aaacagttga 2640
ttgaactgcc tgaactaccg cagccggaga gcgccgggca actctggctc acagtacgcg 2700
tagtgcaacc gaacgcgacc gcatggtcag aagccgggca catcagcgcc tggcagcagt 2760
ggcgtctggc ggaaaacctc agtgtgacgc tccccgccgc gtcccacgcc atcccgcatc 2820
```
tgaccaccag cgaaatggat ttttgcatcg agctgggtaa taagcgttgg caatttaacc 2880
gccagtcagg ctttctttca cagatgtgga ttggcgataa aaaacaactg ctgacgccgc 2940
tgcgcgatca gttcacccgt gcaccgctgg ataacgacat tggcgtaagt gaagcgaccc 3000
gcattgaccc taacgcctgg gtcgaacgct ggaaggcggc gggccattac caggccgaag 3060
cagcgttgtt gcagtgcacg gcagatacac ttgctgatgc ggtgctgatt acgaccgctc 3120
acgcgtggca gcatcagggg aaaaccttat ttatcagccg gaaaacctac cggattgatg 3180
gtagtggtca aatggcgatt accgttgatg ttgaagtggc gagcgataca ccgcatccgg 3240
cgcggattgg cctgaactgc cagctggcgc aggtagcaga gcgggtaaac tggctcggat 3300
tagggccgca agaaaactat cccgaccgcc ttactgccgc ctgttttgac cgctgggatc 3360
tgccattgtc agacatgtat accccgtacg tcttcccgag cgaaaacggt ctgcgctgcg 3420
ggacgcgcga attgaattat ggcccacacc agtggcgcgg cgacttccag ttcaacatca 3480
gccgctacag tcaacagcaa ctgatggaaa ccagccatcg ccatctgctg cacgcggaag 3540
aaggcacatg gctgaatatc gacggtttcc atatggggat tggtggcgac gactcctgga 3600
gcccgtcagt atcggcggaa ttccagctga gcgccggtcg ctaccattac cagttggtct 3660
ggtgtcaaaa atattgtgaa ggaaccttac ttctgtggtg tgacataatt ggacaaacta 3720
cctacagaga tttaaagctc taaggtaaat ataaaatttt taagtgtata atgtgttaaa 3780
ctactgattc taattgtttg tgtattttag attccaacct atggaactga tgaatgggag 3840
cagtggtgga atgcctttaa tgaggaaaac ctgttttgct cagaagaaat gccatctagt 3900
gatgatgagg ctactgctga ctctcaacat tctactcctc caaaaaagaa gagaaaggta 3960
gaagacccca aggactttcc ttcagaattg ctaagttttt tgagtcatgc tgtgtttagt 4020
aatagaactc ttgcttgctt tgctatttac accacaaagg aaaaagctgc actgctatac 4080
aagaaaatta tggaaaaata ttctgtaacc tttataagta ggcataacag ttataatcat 4140
aacatactgt tttttcttac tccacacagg catagagtgt ctgctattaa taactatgct 4200

-continued

```
caaaaattgt gtacctttag cttttttaatt tgtaaaggggg ttaataagga atatttgatg    4260
tatagtgcct tgactagaga tcataatcag ccataccaca tttgtagagg ttttacttgc    4320
tttaaaaaac ctcccacacc tcccctgaa cctgaaacat aaaatgaatg caattgttgt    4380
tgttaacttg tttattgcag cttataatgg ttacaaataa agcaatagca tcacaaattt    4440
cacaaataaa gcattttttt cactgcattc tagttgtggt ttgtccaaac tcatcaatgt    4500
atcttatcat gtctggatcc ccaggaagct cctctgtgtc ctcataaacc ctaacctcct    4560
ctacttgaga ggacattcca atcataggct gcccatccac cctctgtgtc ctcctgttaa    4620
ttaggtcact taacaaaaag gaaattgggt aggggttttt cacagaccgc tttctaaggg    4680
taattttaaa atatctggga agtcccttcc actgctgtgt tccagaagtg ttggtaaaca    4740
gcccacaaat gtcaacagca gaaacataca agctgtcagc tttgcacaag gcccggtac    4800 ccatcgaatt cctgcagccc aattccgatc atattcaata acccttaata taacttcgta    4860
taatgtatgc tatacgaagt tattaggtct gaagaggagt ttacgtccag ccaagctagc    4920
ttggctgcag gtcgtcgaat tctaccgggt aggggaggcg cttttcccaa ggcagtctgg    4980
agcatgcgct ttagcagccc cgctgggcac ttggcgctac acaagtggcc tctggcctcg    5040
cacacattcc acatccaccg gtaggcgcca accggctccg ttctttggtg gccccttcgc    5100
gccaccttct actcctcccc tagtcaggaa gttcccccccc gccccgcagc tcgcgtcgtg    5160
caggacgtga caaatggaag tagcacgtct cactagtctc gtgcagatgg acagcaccgc    5220
tgagcaatgg aagcgggtag gccttttgggg cagcggccaa tagcagcttt gctccttcgc    5280
tttctgggct cagaggctgg gaaggggtgg gtccggggggc gggctcaggg gcgggctcag    5340 ggcggggcg ggcgcccgaa ggtcctccgg aggcccggca ttctgcacgc ttcaaaagcg    5400
cacgtctgcc gcgctgttct cctcttcctc atctccgggc cttttcgacct gcagccaata    5460 tgggatcggc cattgaacaa gatggattgc acgcaggttc tccggccgct gggtggaga    5520 ggctattcgg ctatgactgg gcacaacaga caatcggctg ctctgatgcc gccgtgttcc    5580
ggctgtcagc gcaggggcgc ccggttcttt ttgtcaagac cgacctgtcc ggtgccctga    5640
atgaactgca ggacgaggca gcgcggctat cgtggctggc cacgacgggc gttccttgcg    5700
cagctgtgct cgacgttgtc actgaagcgg gaagggactg gctgctattg ggcgaagtgc    5760
cggggcagga tctcctgtca tctcaccttg ctcctgccga aaagtatcc atcatggctg    5820 atgcaatgcg gcggctgcat acgcttgatc cggctacctg cccattcgac caccaagcga    5880
aacatcgcat cgagcgagca cgtactcgga tggaagccgg tcttgtcgat caggatgatc    5940
tggacgaaga gcatcagggg ctcgcgccag ccgaactgtt cgccaggctc aaggcgcgca    6000
tgcccgacgg cgatgatctc gtcgtgaccc atggcgatgc ctgcttgccg aatatcatgg    6060
tggaaaatgg ccgcttttct ggattcatcg actgtggccg ctgggtgtg gcggaccgct    6120 atcaggacat agcgttggct acccgtgata ttgctgaaga gcttggcggc gaatgggctg    6180
accgcttcct cgtgctttac ggtatcgccg ctcccgattc gcagcgcatc gccttctatc    6240
gccttcttga cgagttcttc tgagggggatc aattctctag agctcgctga tcagcctcga    6300
ctgtgccttc tagttgccag ccatctgttg tttgcccctc cccgtgcct tccttgaccc    6360 tggaaggtgc cactcccact gtccttttcct aataaaatga ggaaattgca tcgcattgtc    6420
tgagtaggtg tcattctatt ctgggggggtg gggtggggca ggacagcaag ggggaggatt    6480
gggaagacaa tagcaggcat gctgggggatg cggtgggctc tatggcttct gaggcggaaa    6540
gaaccagctg gggctcgact agagcttgcg gaacccttaa tataacttcg tataatgtat    6600
```

```
gctatacgaa gttattaggt ccctcgaggg gatccactag ttctagagcg gccgggcaaa    6660
catgtgttcc ctgaacagga aacagagaa                                      6689
```

<210> SEQ ID NO 20
<211> LENGTH: 53
<212> TYPE: DNA
<213> ORGANISM: Artificial Sequence
<220> FEATURE:
<223> OTHER INFORMATION: synthesized_exon 3

<400> SEQUENCE: 20

```
gtccctgtca agaccaaagg caaacatgtg ttccctgaac aggaaacaga gaa             53
```